US005984174A

United States Patent [19]

Kato et al.

[11] Patent Number: 5,984,174

[45] Date of Patent: Nov. 16, 1999

[54] METHOD OF PRINTING BAR CODES ON PIECES TO DELIVER, AND METHOD AND SYSTEM FOR ENCODING AND DECODING BAR CODES

[75] Inventors: Takehisa Kato, Yokohama; Naoki Endoh, Chiba-ken, both of Japan

[73] Assignee: Kabushiki Kaisha Toshiba, Kawasaki, Japan

[21] Appl. No.: 08/733,640

[22] Filed: Oct. 17, 1996

[30] Foreign Application Priority Data

| | | | |
|---|---|---|---|
| Oct. 20, 1995 | [JP] | Japan | 7-273220 |
| Mar. 21, 1996 | [JP] | Japan | 8-064218 |
| Mar. 21, 1996 | [JP] | Japan | 8-064863 |

[51] Int. Cl.$^{6}$ ...... G06F 15/20

[52] U.S. Cl. ...... 235/375; 235/487

[58] Field of Search ...... 235/384, 385, 235/487, 462.3, 380, 381, 375; 209/584, 583, 900; 283/81

[56] References Cited

U.S. PATENT DOCUMENTS

| | | | |
|---|---|---|---|
| 4,891,088 | 1/1990 | Svyatsky | 209/900 X |
| 5,510,608 | 4/1996 | Williams | 235/494 |
| 5,520,990 | 5/1996 | Rotermund | 283/81 X |
| 5,548,110 | 8/1996 | Storch et al. | 235/494 |

FOREIGN PATENT DOCUMENTS

| | | |
|---|---|---|
| 6-94026 | 11/1994 | Japan . |

*Primary Examiner*—Donald Hajec
*Assistant Examiner*—Karl Frech
*Attorney, Agent, or Firm*—Oblon, Spivak, McClelland, Maier & Neustadt, P.C.

[57] ABSTRACT

A method of printing bar codes, comprising the steps of reading destination data from a piece to be delivered, on which the destination data is provided and which has at least first to third regions, printing a bar code representing the destination data on the piece, and printing on the piece a bar code representing sender's data when the piece is found to be a destination-unknown one.

58 Claims, 29 Drawing Sheets

| | | | | | | | | | | | | | | | | | | | | |
|---|---|---|---|---|---|---|---|---|---|---|---|---|---|---|---|---|---|---|---|---|
| Ai 0 | Ai 1 | Ai 2 | Ai 3 | Ai 4 | Ai 5 | Ai 6 | Ai 7 | Ai 8 | Ai 9 | Ai 10 | Ai 11 | Ai 12 | Ap 0 | Ap 1 | Ap 2 | Ap 3 | Ap 4 | Ap 5 | Ap 6 | Ap 7 |

| | | | | | | | | | | | | |
|---|---|---|---|---|---|---|---|---|---|---|---|---|
| Zi 0 | Zi 1 | Zi 2 | Zi 3 | Zi 4 | Zi 5 | Zi 6 | Zp 0 | Zp 1 | Zp 2 | Zp 3 | Zp 4 | Zp 5 |

| | | | | | | | | | | | | | | | | | | |
|---|---|---|---|---|---|---|---|---|---|---|---|---|---|---|---|---|---|---|
| Ii 0 | Ii 1 | Ii 2 | Ii 3 | Ii 4 | Ii 5 | Ii 6 | Ii 7 | Ii 8 | Ii 9 | Ii 10 | Ip 0 | Ip 1 | Ip 2 | Ip 3 | Ip 4 | Ip 5 | Ip 6 | Ip 7 |

METHOD OF PRINTING BAR CODES ON PIECES TO DELIVER, AND METHOD AND SYSTEM FOR ENCODING AND DECODING BAR CODES

BACKGROUND OF THE INVENTION

1. Field of the Invention

The present invention relates to a method of printing bar codes on pieces to deliver, such as mail pieces, and a method of reading bar codes printed on pieces to deliver, which help enhance efficiency of delivering the pieces. The invention also relates to a method and system for encoding and decoding bar codes, which are fit for use in bar-code encoding/decoding system designed to increase the efficiency of delivering pieces.

2. Description of the Related Art

In Japan a postal zoning system has long been adopted to enhance mail-delivering efficiency. In the postal code system, a sender writes on the mail piece (i.e., the letter) a postal code. The postal code consists of either three figures or five figures, designating the zone in which the receiver lives. The sender mails the mail piece, which is transported to the nearest post office, along with other mail pieces. In the post office, the postal codes written on the mail pieces are optically read. The mail pieces are sorted in accordance with the codes thus read, more efficiently than otherwise.

Recently, a new postal zoning system has been proposed in which the conventional postal code be replaced by a novel postal code consists of seven figures. The sender writes on a mail piece the novel postal code designating the receiver's town and the address number designating the receiver's lot number. In the central post office, an optical character reader (OCR) reads the postal code and address number written on the mail piece, both codes thus read are converted into a bar code, and the bar code is printed by a bar-code printer on the mail piece, i.e., an envelope or a post card. The mail piece with the bar code printed on it is sent to the local post office. In the local post office, a bar code reader reads the bar code on the mail piece and outputs the data representing the postal code and address number. In accordance with this data, the mail piece is sorted automatically, thereby increasing mail-delivering efficiency even more.

It is proposed that a so-called "VCS (Video Coding System)" be used if the OCR fails to read the bar code (i.e., novel postal code and address number). The VCS prints a bar code on the mail piece, which represents an ID number indicating the date of reading the bar code, the serial number of the bar-code printer and the lot number for the mail piece. The image data of any mail piece on which the ID number is printed is displayed to an operator. The operator reads the postal code and the address number written on the mail piece and inputs both codes, which are converted into a bar code.

The bar code representing the postal and address codes and the bar code representing the ID number are printed at a prescribed position on that side of the mail piece on which the sender has written the receiver's name and address. The bar codes may overlap the receiver's name or address, because the sender can write the receiver's name and address at any position he or she choose on said side of the mail piece. In this case, the bar codes are not read at all or read incorrectly. If the bar codes are not read at all, the receiver's name and address written by the sender must be read and input by the operator, making it difficult to increase the mail-delivering efficiency and inevitably increase the cost of delivering mail. If the bar code are read but incorrectly, the mail piece will be delivered to a wrong person and be eventually reach the receiver much later.

The bar code representing the ID number can be far smaller than the bar code representing the postal and address codes, and is less likely to overlap the receiver's name or address than the bar code representing the postal and address codes. Hence, the probability that it is not read at all or is read incorrectly is low. Nonetheless, it may not be read at all or may be read incorrectly, just like the bar code which represents the postal and address codes.

As indicated above, the bar code printed on a mail piece, which represents the destination data (e.g., a postal code and an address number), is not read at all or is read but incorrectly if it overlaps the receiver's name or address written on the mail piece. As a consequence, the receiver's name and address must be read and input by the operator, which inevitably reduce the mail-delivering efficiency, or the mail piece is delivered to a wrong person.

Representing the destination data, the bar code printed on a mail piece does indeed helps to improve mail-delivering efficiency. If the bar code cannot be read or is read but incorrectly, however, the operator needs to pick out the mail piece so that a postman may return the mail piece to the sender. Inevitably, the efficiency of returning mail pieces to the senders cannot be raised.

Accordingly a first object of the invention is to provide a method of printing bar codes on mail pieces such that address-unknown pieces can be automatically picked out, thereby to enhance the efficiency of returning the mail pieces to the senders.

A second object of the present invention is to provide a method of printing bar codes on mail pieces, which can increase the reliability of the bar codes which represent destination data items.

A third object of the invention is to provide a method and system which can encode and decode bar codes representing numerical data such as ID numbers, with high reliability.

SUMMARY OF THE INVENTION

To attain the first object, there is provided a method of printing bar codes, which comprises the steps of: reading destination data from a piece to be delivered, on which the destination data is provided and which has at least first to third regions; printing a bar code representing the destination data on the piece; and printing on the piece a bar code representing sender's data when the piece is found to be one whose destination is unknown.

The bar code representing the destination data is printed in the first region. When the destination data cannot be read, a bar code representing an ID number identifying the piece is printed in the second region. The bar code representing sender's data is printed in at least one of the first to third regions when the piece is one whose destination is unknown. In this case, a bar code representing a part of the sender's data and a bar code representing the remaining part of the sender's data may be printed in the first region and the third region, respectively.

In the case where the bar code representing the sender's data in at least one region, it is desired that data, such as an address-unknown mark, be printed in a prescribed region of the piece, thus indicating that the bar code printed in the first region represents the sender's data.

After the bar code representing the destination data is printed in the first region, the bar code representing the sender's data is printed in at least the first region in ink different in color from the ink in which the bar code representing the destination data is printed on the piece.

Hence, the bar codes can be distinguished from each other, though they are printed in the same region.

To achieve the first object, another method of printing bar codes is provided. In this method, the postal code and address number of the destination of a piece to deliver, such as a mail piece, are read from the piece and converted to a bar code representing the postal and address codes. The bar code is printed in a first region of the piece. When the postal code and the address number cannot be read from the piece, a bar code representing the ID number of the piece in a second region of the piece. The method is characterized in that a bar code representing the sender's postal code and address number is printed on the piece when the piece is found to be a destination-unknown one.

It suffices to print the bar code representing the sender's postal code and address number in at least one of the first to third regions provided on the piece which is regard as a destination-unknown one. A bar code representing one of the sender's postal code may be printed in the first region, while the bar code representing the sender's address number may be printed in the third region, or vice versa.

In the case where the bar code representing the sender's postal code and address number is printed in at least the first region, it is desired that a mark be printed in a specified region of the piece, which indicates that the bar code represents the sender's postal code and address number.

After the bar code representing the destination data is printed in the first region, the bar code representing the sender's postal code and address number is printed in at least the first region in ink different in color from the ink in which the bar code representing the destination data is printed on the piece.

Since a bar code representing the sender's data, i.e., the postal code and the address number, is printed on any piece whose destination is unknown, the piece can be sorted automatically in accordance with the bar code. This greatly helps to efficiency of returning destination-unknown pieces to the respective senders.

In order to achieve the second object, there is provided a method of printing bar codes, in which a bar code representing the destination of a piece, e.g., the receiver's postal code and address number, is printed on the piece, when an OCR reads the postal code and the address number written on the piece.

In the method, the bar code representing the destination data written on a piece to deliver is read, and a bar code representing the data thus read is printed in a first region provided on the piece. If the destination data cannot be read, a bar code representing the ID number of the piece is printed in a second region provided on the piece. The bar code representing the destination data is printed not only in the first region but also in the second region, when the destination data is successfully read.

More specifically, if the piece to deliver is a mail piece, the postal code and address number written on the mail piece are read, corrected and encoded into a bar code. The bar code is printed in the first region of the mail piece. If the postal code and the address number cannot be read at all, the ID number of the mail piece is printed in the second region. The method is characterized in that when the destination data is successfully read, the destination-data bar code is printed not only in the first region but also in the second region, in the following manner.

(a) A parity-symbol bar code is printed which has been obtained by correcting and encoding the postal code and the address number, both read from the mail piece.

(b) A bar code representing the postal code read is printed, and a parity-symbol bar code is printed which has been obtained by correcting and encoding the postal code and the address number.

(c) A bar code representing the address number read is printed, and a parity-symbol bar code is printed which has been obtained by correcting and encoding the postal code and the address number.

(d) A bar code representing the parity code obtained by correcting and encoding the postal code read is printed as a bar code different from a post-office bar code.

(e) A bar code representing the parity code obtained by correcting and encoding the address number read is printed as a bar code different from a post-office bar code.

(f) A bar code representing the address number read is printed as a bar code different from a post-office bar code.

The post-office bar code representing the destination data is printed in the second region in which the ID-number bar code is not printed, when the postal code and the address number are read from the piece. Hence, even if the post-office bar code overlaps the receiver's name or address (or printed advertisement), or is stained or erased, and can no longer be read at all or correctly, the post-office bar code which is printed in the second region can be read. This serves to reduce the number of mail pieces from which an operator needs to read the postal code and the address number to sort them into various destination bins.

Another method of printing bar codes is provide to attain the second object of the invention. In this method, a bar code representing the post code and the address number and a bar code representing the ID number are printed in the same region, if the postal code and the address number are read by an OCR or if the ID-number bar code is printed when the postal code and the address number cannot be read.

That is, the destination data is read and a bar code representing the destination data is printed in the first region of the piece. If the data cannot be read, a bar code representing the ID number of the piece is printed in the second region. The method is characterized in that when the destination data is successfully read, the ID-number bar code and the destination-data bar code are printed in the second region when the destination data is successfully read.

Still another method of printing bar codes is provide to achieve the second object of the invention. In this method, the destination data written on a piece to deliver is read and converted into a bar code, and the bar code is printed in the first region provided on the piece. If the destination data cannot be read, a bar code representing the ID number of the piece is printed in the second region provided on the piece. The method is characterized in that the destination-data bar code is printed also in a blank region included in the second region.

Further there is provided a another method of printing bar codes in order to accomplish the second object of the invention. In this method, the destination data written on a piece to deliver is read and converted into a bar code, which is printed in the first region provided on the piece. If the destination data cannot be read, a bar code representing the ID number of the piece is printed in the second region provided on the piece and is read and decoded. If the ID-number bar code cannot be decoded correctly, it will be printed in a blank region included in the second region.

Another method of printing bar codes is provided to accomplish the second object of the invention. In the method, the destination data written on a piece to deliver is read and converted into a bar code, which is printed in the first region provided on the piece. If the destination data cannot be read, a bar code representing the ID number of the piece is printed in the second region provided on the piece and is read and decoded. If the ID-number bar code cannot be decoded correctly, it will be printed in a blank region included in the second region. If the ID-number bar code is read correctly, the destination-data bar code is printed in the blank region.

In this method, the destination-data bar code is printed in the blank region included in the second region if the ID-number bar code printed in the second region is decoded correctly. Therefore, even if the destination-data bar code overlaps the receiver's name or address (or printed advertisement), or is stained or erased, and can no longer be read at all or correctly, the destination-data bar code which is printed in the second region can be read. This serves to reduce the number of mail pieces from which an operator needs to read the postal code and the address number to sort them into various destination bins.

Moreover, if the ID-number bar code printed in the second region cannot be decoded correctly, it is printed in the blank region included in the second region. The ID-number bar code printed in the blank region can be decoded correctly. As a result, it is possible to reduce the number of mail pieces from which an operator needs to read the postal code and the address number to sort them into various destination bins.

In order to attain the third object of the present invention, there is provided a bar-code encoding method, in which an ID number of a piece to deliver is corrected and encoded into a bar code and the bar code thus obtained is printed on the piece. To encode the ID number, the data symbols of each train, which contain the same ID-number data, are corrected and encoded, thereby generating trains of parity symbols and trains of data symbols. The parity-symbol trains and the data-symbol trains are converted into bar codes, which are printed on the piece to deliver.

The bar-code encoding system used in the bar-code encoding method comprises correcting/encoding means and converting/printing means. The correcting/encoding means corrects and encodes the data symbols of each train, which contain the same ID-number data, thereby generating parity-symbol trains and data-symbol trains. The converting/printing means converts the parity-symbol trains and the data-symbol trains into bar codes and prints the bar codes on the piece to deliver.

The correcting/encoding means corrects and encodes the data-symbol trains in any one of the following alternative methods:

(a) The first data symbols contained in the data-symbol trains, which contains the same number data, are corrected and encoded into a train of second data symbols each consisting of a first parity symbol and a first data symbol. Then, the second data symbols are corrected and encoded, thereby generating second parity symbols and second data symbols.

(b) The first data symbols contained in the data-symbol trains, which contain the same number data, are corrected and encoded into first parity symbols and first data symbols. Then, each first parity symbol is corrected and encoded into a second parity symbol.

(c) The first data symbols contained in the data-symbol trains, which contain the same number data, are corrected and encoded by a first method, into first parity symbols and first data symbols. Then, each first data symbol is corrected and encoded by a second method, into a second parity symbol.

The data symbol of each train, which contain the same number data, may be corrected and decoded by the same method or by different methods.

According to the present invention, there is provided a bar-code decoding method. In the bar-code decoding method, the bar code printed on an object is read, obtaining data-symbol trains and parity-symbol trains. Each data symbol is decoded by using the corresponding parity symbol and the parity symbols corresponding to the other data symbols, thereby generating a plurality of number data candidates. If the most reliable of these number data candidates is an element of a set of numbers that can be used as the number data, the data symbol corresponding to the most reliable number data is output as the result of decoding.

The bar-code decoding system used in this bar-code decoding method. The system comprises: first decoding means for decoding the data symbols of each train obtained by reading a bar code, by using the parity symbols corresponding to the data symbols, thereby generating a plurality of number data candidates; second decoding means for decoding the data symbols of each train obtained by reading a bar code, by using the parity symbols corresponding to other data symbols, thereby generating a plurality of number data candidates; and means for outputting the data symbol which corresponds to the most reliable of these number data candidates generated by the first and second decoding means when the most reliable number data candidate is an element of a set of numbers that can be used as the number data.

In the present invention, after number data such as an ID number of an object has been corrected and decoded, the data symbols of each train, which contain the same number data, are corrected and decoded, thereby generating a parity-symbol train and a data-symbol train. The parity-symbol train and the data-symbol train are converted into a bar code, which is printed on the object.

The bar code thus obtained and representing the number data can be therefore be decoded with high reliability. Namely, the data symbols of each train obtained by reading the bar code, which contain the same number data, are decoded by using not only the parity symbols which correspond to the data symbols, but also the parity symbols which correspond to the other data symbols.

In this case, since the data symbols of each train contain the same number data, all or most of the number data candidates obtained by the above-mentioned decoding are identical. The candidate which is identical to more other candidates than any other candidate is most similar to the number data. It is then determined whether the candidate most similar to the number data is an element of a set of numbers which are used as the number data. If this candidate is an element of that set, it is regarded as the number data, or the result of the decoding.

Thus, the number data obtained by encoding and decoding a bar code is adequately reliable, even if the bar code cannot be read at all or is read but not correctly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Some embodiments of the present invention, which achieve the first object described above, will be described with reference to the accompanying drawings.

Figure 1A:
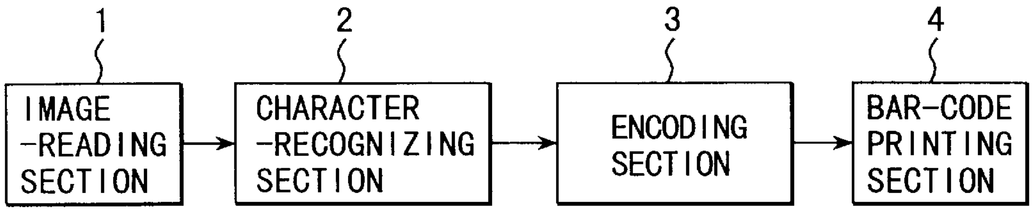
FIGS 1A and 1B are a block diagram of a bar-code encoding/decoding system according to a first embodiment of the present invention.
Figure 1B:
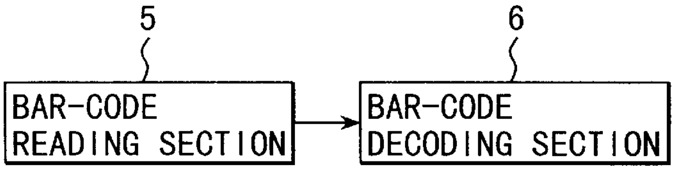

FIGS. 1A and 1B shows a bar-code encoding/decoding system according to the first embodiment, which is fit for use a mail-sorting system installed in, for example, a central post office. More correctly, FIGS. 1A and 1B illustrate the bar-code encoding unit and bar-code decoding unit, respectively, which constitute the barcode encoding/decoding system.

As seen from FIG. 1A, the bar-code encoding unit comprises an image-reading section 1, a character-recognizing section 2, a bar-code encoding section 3, and a bar-code printing section 4.

The image-reading section 1 has a scanner. The scanner reads the postal code and the address number written at prescribed positions on a mail piece (e.g., a post card or an envelope), and converts the postal and address codes into an image signal. The image signal is input to the character-recognizing section 2. The section 2 performs the known character-recognition process on the image signal, generating character data (i.e., character codes). The character data is input to the bar-code encoding section 3, which corrects errors contained in the data and converts the data into a bar-code pattern. The bar-code pattern is supplied to the bar-code printing section 4. The section 4 prints a bar code in, for example, fluorescent ink, in accordance with the bar-code pattern, at a predetermined position on that side of the mail piece on which the receiver's name and address are written.

If the image-reading section 1 fails to read the postal code or the address number or reads them but incorrectly, the character-recognizing section 2 generates an ID number which indicates the date of scanning the mail piece, the serial number of the bar-code printing section 4 and the lot number for the mail piece. In the bar-code encoding section 3, errors in the ID number are corrected and the ID number is converted into a bar-code pattern. The bar-code pattern is input to the bar-code printing section 4. The section 4 prints an ID-number bar code representing the ID number accordance with the bar-code pattern, at a predetermined position on that side of the mail piece on which the receiver's name and address are written.

As shown in FIG. 1B, the bar-code decoding unit comprises a code-reading section 5 and a bar-code decoding section 6. The code-reading section 5 has a scanner. When the mail piece is supplied to the section 5, the scanner reads the bar code printed on the mail piece. The bar code read is supplied to the bar-code decoding section 6. The section 6 decodes the bar code into character data representing the postal code and the address number. If a bar code is not printed on the mail piece, but an ID-number bar code is printed thereon, the scanner of the section 5 reads the ID-number bar code, which is input to the bar-code decoding section 6. The section 6 decodes the ID-number bar code into character data which represents the ID number.

Figure 2:
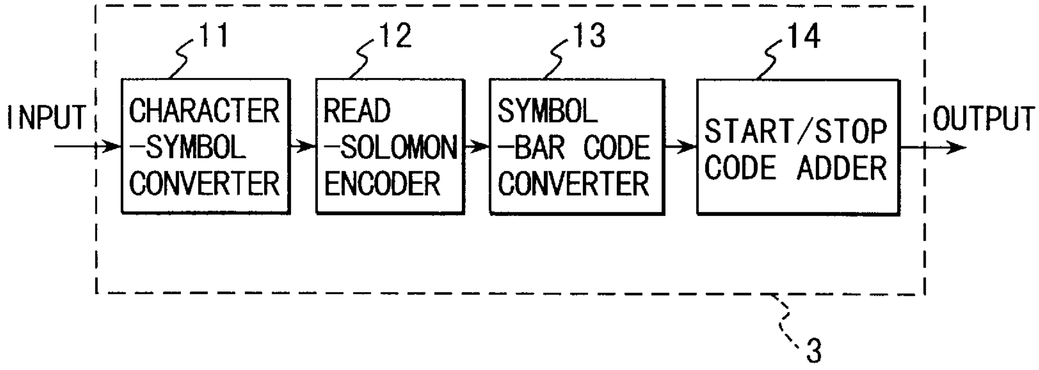
FIG. 2 is a diagram of the bar-code encoding section incorporated in the first embodiment shown in FIGS. 1A and 1B.

As shown in FIG. 2, the bar-code encoding section 3 of the bar-code encoding unit shown in FIG. 1A comprises a character-symbol converter 11, a read-solomon encoder 12, a symbol/bar code converter 13, and a start/stop code adder 14.

The character-symbol converter 11 receives the character data supplied from the character-recognizing section 2. The converter 11 converts this data into a combination of data symbols, each character into a combination of symbols, on the basis of prescribed rules. The data symbols are input to the read-solomon encoder 12. In the encoder 12, the data symbols are subjected to read-solomon encoding which is a method of correcting and encoding data. The read-solomon encoder 12 generates a string of data symbols, each added with a parity symbol. Read-solomon encoding is detailed in, for example, Hideki Imai, *Encoding Theory*, ed. Society of Electronic Information Communication, Japan.

The string of data symbols output from the encoder 12 is input to the symbol/bar code converter 13. The converter 13 converts the data symbols into a pattern of a bar code which is to be printed on the mail piece. The bar-code pattern is supplied to the start/stop code adder 14. The adder 14 adds to the bar-code pattern two data items representing a start bar and a stop bar, respectively. The start bar is to be printed at the head of the bar code, and the stop code is to be printed at the end of the bar code. The bar-code pattern, added with the start- and stop-bar data items, is input to the bar-code printing section 4 of the bar-code encoding unit.

Figure 3:
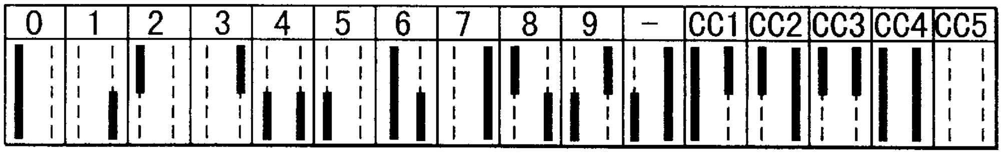
FIG. 3 is a diagram illustrating how bars are allocated in every bar code printed in the system of FIGS. 1A and 1B.

FIG. 3 is a schematic representation of a bar code printed in the first embodiment (FIGS. 1A and 1B). As shown in FIG. 3, the bar code consists of at most four bars. The absence of one bar indicates one state, and the presence thereof another state. Hence, the bar code as a whole can indicate 16 states ($=2^4$).

The read-solomon encoder 12 performs read-solomon encoding on the input data symbols, by using a Galois field, $GF(2^4)$. It generates a string of data symbols, each added with a parity symbol. Each of these data symbols consists of four bits. Namely, each data symbol is represented by two bars. There are 16 different 4-bit patterns, "0000" to "1111." Bars are allocated to all these 4-bit patterns, but the pattern "0000." In other words, 15 bars are allocated to 15 4-bit patterns.

In the present embodiment, 80 bars are printed in all, and an ID-number bar code represents only a number and consists of numerals "0" to "9" only.

Figure 4A:
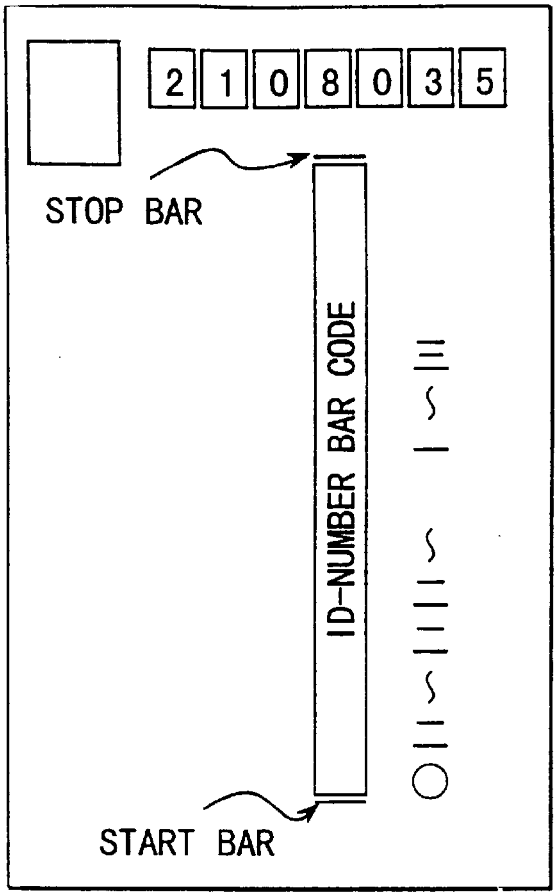
FIGS. 4A and 4B shows a post card and a letter envelope, indicating the positions on the card and the envelope, at which a bar code is printed in the first embodiment to represent the ID number assigned to the card and the envelope.
Figure 4B:
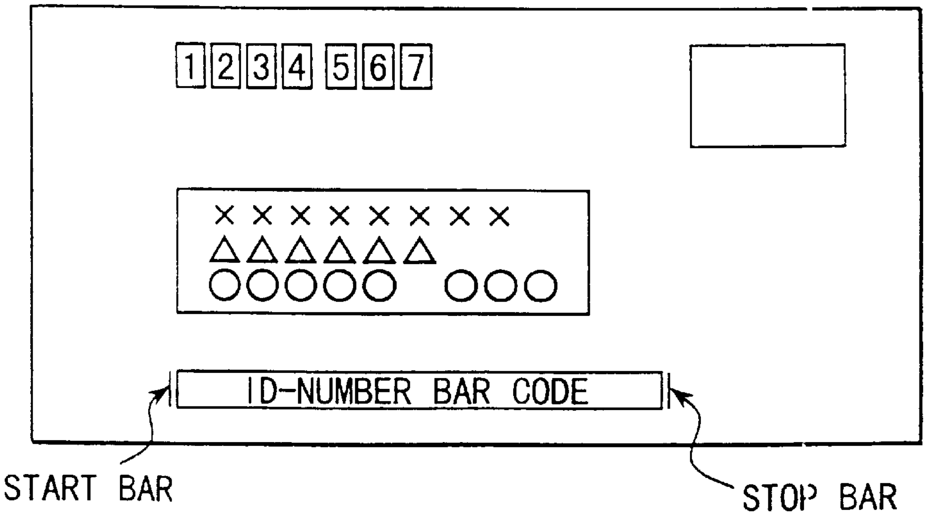

FIGS. 4A and 4B shows the positions on mail pieces delivered in the above-mentioned new postal zoning system which will be adopted in Japan in the future. More precisely, FIG. 4A shows a postal card, and FIG. 4B a letter envelope. As seen from FIGS. 4A and 4B, the ID-number bar code includes a start bar and a stop bar. Hence, 78 bars (=80–2) are used to represent 39 data symbols (=39/2), because two bars represents one data symbol as described above.

How the bar-code encoding section 3 corrects errors in the character data and converts the data into a bar-code pattern will be explained. The section 3 corrects the data and converts it into a bar-code pattern in one of the three methods illustrated in FIGS. 5A to 5C. In each method, the section 3 carries out read-solomon encoding on data-symbol strings which have the same ID number, thereby to generate strings of data symbols. It should be noted that each data symbol is added with one parity symbol.

Figure 5A:
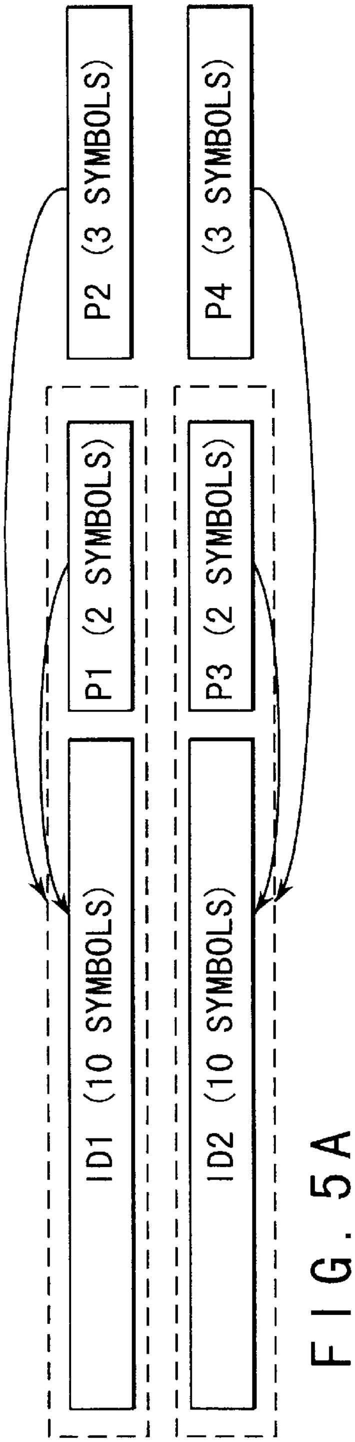
FIGS. 5A to 5C are diagrams explaining three methods in which the bar-code encoding section corrects character data and converts the data into a bar-code pattern in the first embodiment.

In the first method of FIG. 5A, the bar-code encoding section 3 effects read-solomon encoding on two strings ID1 and ID2 of first-type data symbols, having the same ID number (that is, ID1=ID2), by applying a code length of 12 and a minimum-hamming distance of 3. The section 3 thereby generating two strings P1 and P3 of first-type parity symbols (P1=P3). The string ID1 of first-type data symbols is combined with the string P1 of first-type parity symbols, forming a first string of second-type data symbols. Similarly, the string ID2 of first-type data symbols is combined with the string P3 of first-type parity symbols, forming a second string of second-type data symbols. Next, the bar-code encoding section 3 performs read-solomon encoding on the first and second strings of data symbols, by applying a code length of 15 and a minimum-hamming distance of 4. The section 3 thereby generate two strings P2 and P4 of second-type parity symbols (P2=P4).

Thus, in the first method the section 3 generates the first string of second-type data symbols (i.e., ID1 and P1), the second strings of second-type data symbols (i.e., ID2 and P3), the first string P2 of second-type parity symbols, and the second strings P4 of the second-type parity symbols. The bar-code encoding section 3 converts the first and second strings of second-type data symbols and the first and second strings of second-type parity symbols, into a bar-code pattern. The bar-code pattern is input to the bar-code printing section 4, which prints an ID-number bar code on the mail piece.

Figure 5B:
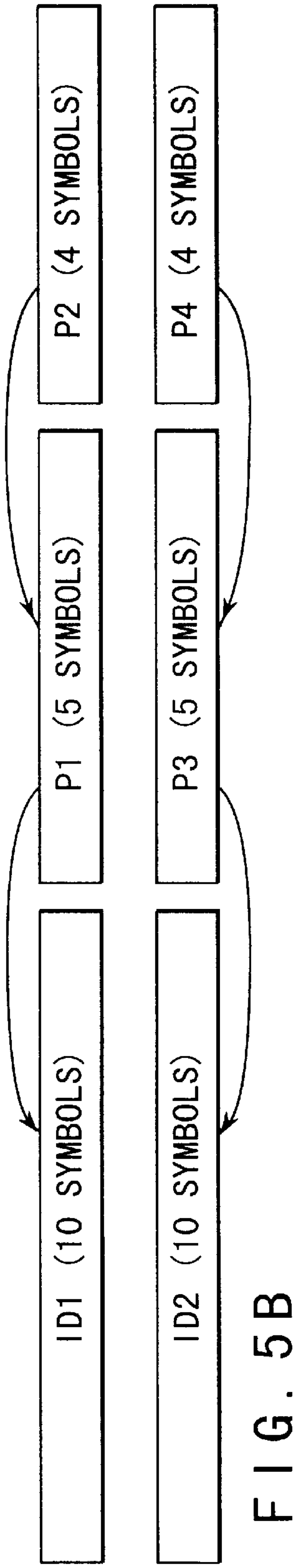

In the second method of FIG. 5B, the bar-code encoding section 3 carries out read-solomon encoding on two strings ID1 and ID2 of first-type data symbols, having the same ID number (that is, ID1–D2), by applying a code length of 15 and a minimum-hamming distance of 6. The section 3 thereby generates two strings P1 and P3 of first-type parity symbols (P1 P3). Next, the section 3 performs read-solomon encoding on the strings P1 and P3 of first-type parity symbols, by applying a code length of 5 and a minimum-hamming distance of 6. The section 3 thereby generates two strings P2 and P4 of second-type parity symbols (P2=P4).

Therefore, in the second method the section 3 generates two strings ID1 and ID2 of data symbols, two strings P1 and P3 of first-type parity symbols, and two strings P2 and P4 of second-type parity symbols. The bar-code encoding section 3 converts the strings ID1 and ID2 of data symbols, strings P1 and P3 of first-type parity symbols and strings P2 and P4 of second-type parity symbols, into a bar-code pattern. The bar-code pattern is input to the bar-code printing section 4, which prints an ID-number bar code on the mail piece.

Figure 5C:
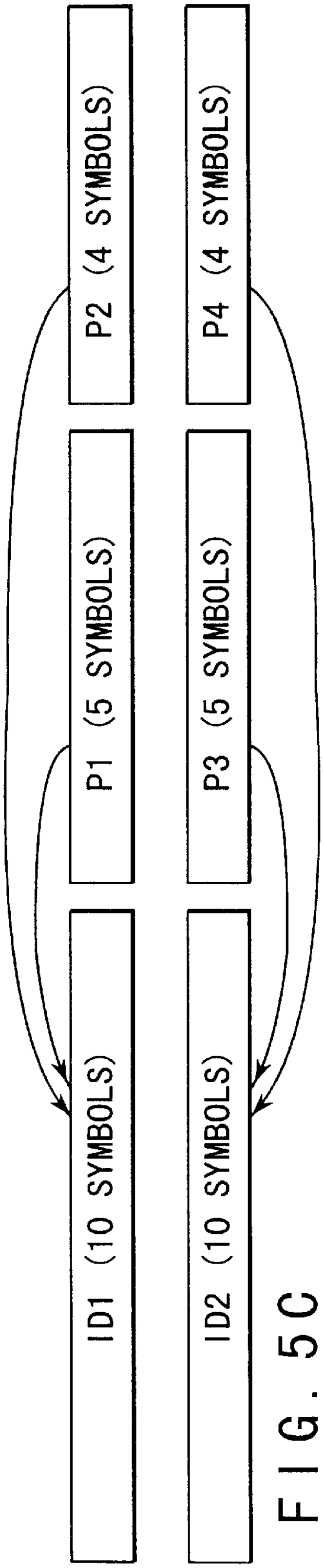

In the third method of FIG. 5C, the bar-code encoding section 3 effects read-solomon encoding on two strings ID1 and ID2 of first-type data symbols, having the same ID number (that is, ID1=ID2), by applying a code length of 15 and a minimum-hamming distance of 6. The section 3 thereby generates two strings P1 and P3 of first-type parity symbols (P1=P3). Then, the section 3 effects read-solomon encoding on the strings ID1 and ID2 of first-type data symbols, by applying a code length of 14 and a minimum-hamming distance of 5. The section 3 thereby generates two strings P2 and P4 (P2=P4) of second-type parity symbols.

Hence, in the third method the section 3 generates two strings ID1 and ID2 of data symbols, two strings P1 and P3 of first-type parity symbols, and two strings P2 and P4 of second-type parity symbols. The bar-code encoding section 3 converts the strings ID1 and ID2 of data symbols, strings P1 and P3 of first-type parity symbols and strings P2 and P4 of second-type parity symbols, into a bar-code pattern. The bar-code pattern is input to the bar-code printing section 4, which prints an ID-number bar code on the mail piece.

As described above, the bar-code decoding section 6 of the bar-code decoding unit (FIG. 1B) corrects a bar-code pattern and converts it into an ID number. To be more specific, the section 6 decodes each of the data-symbol strings obtained from the bar-code pattern read by the code-reading section 5, by using the parity symbol corresponding to the data-symbol string and the parity symbols corresponding to the other data-symbol string. The section 6 thereby generates a plurality of ID-number candidates and outputs one of these candidates which is most similar to the ID number assigned to the mail piece.

Figure 6:
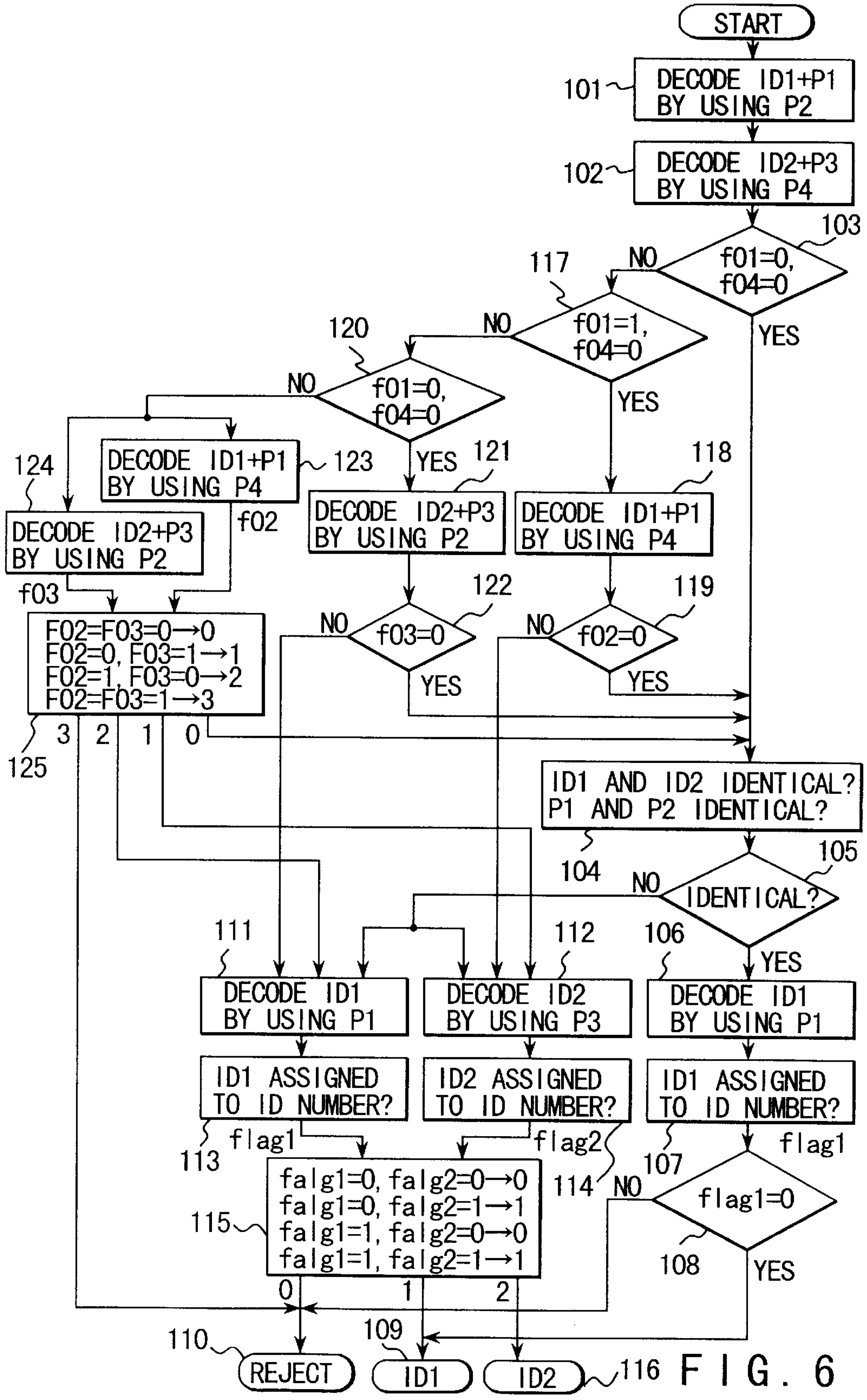
FIG. 6 is a flow chart explaining how the bar-code decoding section corrects a bar-code pattern and converts it into an ID number, when the bar-code pattern is one generated by the method illustrated in FIG. 5A.

With reference to the flow chart of FIG. 6, it will be explained how the bar-code decoding section 6 corrects a bar-code pattern and converts it into an ID number when the bar-code pattern is one generated by the method illustrated in FIG. 5A.

[1] A data symbol ID1+P1 is decoded by using P2, in Step 101. It is determined whether the data symbol ID1+P1 has been corrected. If Yes, f01 is set at "0." If No, f01 is set at "1."

[2] Similarly, a data symbol ID2+P3 is decoded by using P4, in Step 102. It is determined whether the data symbol ID2+P3 has been corrected. If Yes, f04 is set at "0." If No, f04 is set at "1."

[3] Then, it is determined in Step 103 whether f01=0 and f04=0, that is, whether both data symbols ID1+P1 and ID2+P3 have been corrected. If Yes, it is determined whether or not ID1 and ID2 are identical and P1 and P3 are identical, in Steps 104 and 105.

[4] If Yes in Step 105, the data symbols ID1+P1 and ID2+P3 are found to have been corrected, and the bar-code decoding section 6 decodes the data symbol ID1 (or ID2) by using the parity symbol P1 (or P3), in Step S106.

[5] It is determined whether the data symbol ID1 (or ID2) decoded in Step 106 is a symbol (0 to 9) assigned to the ID number, in Steps 107 and 108. In other words, the data symbol ID1 (or ID2) is checked to see whether it coincides with a symbol assigned to the ID number. If Yes, a flag=0 is output, and the data symbol ID1 is output in Steps 109. If No, a flag=1 is output, indicating that neither the data symbol ID1 nor the data symbol ID2 has been corrected. In Step 110, the data symbols ID1 and ID2 are rejected.

[6] If No in Step 105, that is, if ID1 and ID2 are not identical and P1 and P3 are not identical, it is impossible to determine whether or not the ID1 and ID2 have been corrected by using P1 and P3, respectively. In Step 111, the data symbol ID1 is decoded by using the parity symbol P1. In Step 112, the data symbol ID2 is decoded by using the parity symbol P3.

[7] It is determined in Step 111 whether the data symbol ID1 decoded in Step 111 is a symbol (0 to 9) assigned to the ID number. In other words, the data symbol ID1 is checked to see whether it coincides with a symbol assigned to the ID number. A flag 1=0 is output if Yes, and a flag 1=1 is output if No.

[8] Similarly, it is determined in Step 114 whether the data symbol ID2 decoded in Step 112 is a symbol (0 to 9) assigned to the ID number. In other words, the data symbol ID2 is checked to see whether it coincides with a symbol assigned to the ID number. A flag 2=0 is output if Yes, and a flag 2=1 is output if No.

[9] The decisions made in Steps 113 and 114 are checked in Step 115. If the flag 1=0 and the flag 2=0, it is impossible to determine whether or the ID1 and ID2 have been corrected, and the process passes to Step 110, in which the data symbols ID1 and ID2 are rejected. If the flag 1=0 and the flag 2=1, the process passes to Step 109, in which the data symbol ID1 is output. If the flag 1=1 and the flag 2=0, the process passes to Step 116, in which the data symbol ID2 is output. If the flag 1=1 and the flag 2=1, it is impossible to determine whether or the ID1 and ID2 have been corrected. In this case, and the process passes to Step 109, in which the data symbols ID1 and ID2 are rejected.

[10] If No in Step 103, that is, if neither the data symbol ID1+P1 nor the data symbol ID2+P3 has been corrected, the process passes to Step 117. In Step 117, it is determined whether f01 and f04 obtained in Steps 101 and 102 are "1" and "0," respectively. If Yes, the data symbol ID1+P1 is decoded by using the parity symbol P4, in Step 118. Then, it is determined in Step 119 whether the symbol ID1+P1 has been decoded, and f02 is set at "0" if Yes, and at "1" if No.

[11] Operations [3] to [9] are performed if f02=0.

[12] If f02=1, the process passes to Step 112, in which the data symbol ID2 is decoded by using the parity symbol P3.

[13] It is determined in Step 114 whether the data symbol ID2 decoded in Step 112 is a symbol (0 to 9) assigned to the ID number. In other words, the data symbol ID2 is checked to see whether it coincides with a symbol assigned to the ID number. If Yes, a flag 2=0 is output, and the data symbol ID2 is output in Steps 115 and 116. If No, a flag 2=1 is output, and the data symbol ID2 is rejected in Steps 115 and 110.

[14] If No in Step 117, that is, if f01 and f04 obtained in Steps 101 and 102 are not "1" and "0," respectively, the process passes to Step 120. In Step 120 it is determined whether f01 and f04 are "0" and "1," respectively. If Yes, that is, f01=0 and f04=1, the data symbol ID2+P3 is decoded by using the parity symbol P2, in Step 121. If the symbol ID2+P3 is decoded, f03 is set at "0." If the symbol ID2+P3 cannot be decoded, f03 is set at "1."

[15] It is determined in Step 122 whether f03=0. If Yes, the operations [3] to [9] are performed.

[16] If No in Step 122, that is, if f03=1, the process passes to Step 111. In Step 111 the data symbol ID1 is decoded by using the parity symbol P1.

[17] Then, it is determined in Step 113 whether the data symbol ID1 decoded in Step 111 is a symbol (0 to 9) assigned to the ID number. Namely, the data symbol ID1 is checked to see whether it coincides with a symbol assigned to the ID number. A flag 1=0 is output if Yes, and a flag 1=1 is output if No. If the flag 1 is "0," the data symbol ID1 is output in Steps 115 and 109. If the flag 1 "1," the data symbol ID1 is rejected in Steps 115 and 110.

[18] If No in Step 120, that is, if f01 and f04 are not "0" and "1," respectively, the process passes to Steps 123 and Step 124. More specifically, if f01=f04=1, the process passes to Steps 123 and 124. In Step 123, the data symbol ID1+P1 is decoded by using the parity symbol P4. If the symbol ID1+P1 is decoded, f02 is set at "0." If the symbol ID1+P1 cannot be decoded, f02 is set at "1."

[19] If f01=f04=1, the data symbol ID2+P3 is decoded by using the parity symbol P2 in Step 124 at the same time the data symbol ID1+P1 is decoded by using the parity symbol P4. If the symbol ID2+P3 is decoded, f03 is set at "0." If the symbol ID2+P3 cannot be decoded, f03 is set at "1."

[20] Then, f02 and f03 are checked for their values in Step 125. If f02=f03=0 (Case 0), the process passes to Step 104. In Step 104, it is determined whether or not ID1 and ID2 are identical and P1 and P3 are identical. In accordance with the decision made in Step 104, the operations [4] to [9] are performed.

[21] If f02=0 and f033=1 (Case 1), the process passes to Step 111. In Step 111, the data symbol ID1 is decoded by using the parity symbol P1, in Step 111.

[22] The operation [17] is performed.

[23] If f02=1 and f03=0 (Case 2), the process passes to Step 111. In Step 111, the data symbol ID2 is decoded by using the parity symbol P3, whereby the operation [13] is performed.

[24] If f02=f03=1 (Case 3), the process passes to Step 110. In Step 110, data symbol is rejected.

Figure 7:
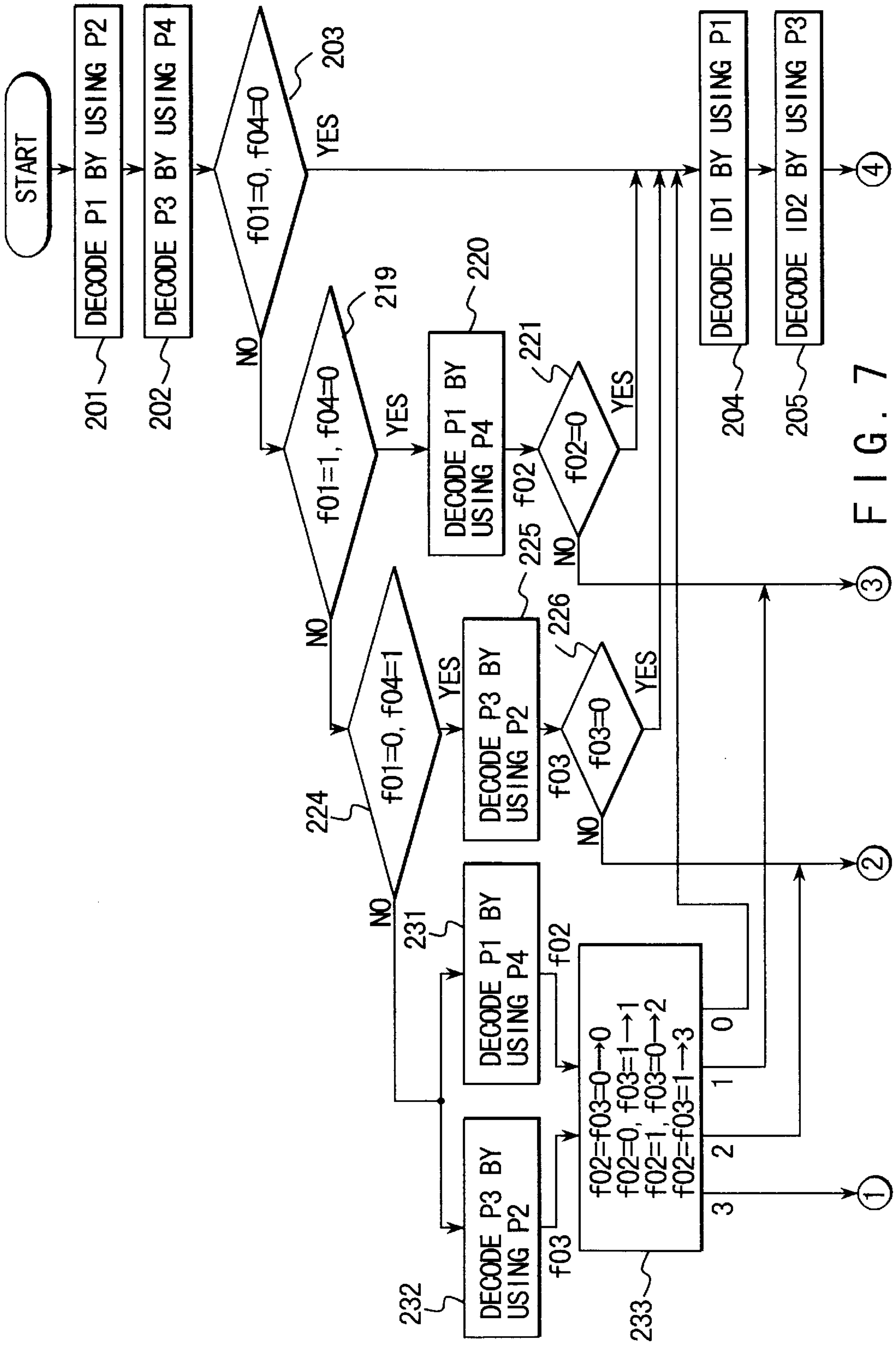
FIG. 7 is a flow chart explaining how the bar-code decoding section corrects a bar-code pattern and converts it into an ID number, when the bar-code pattern is one generated by the method illustrated in FIG. 5B.
Figure 8:
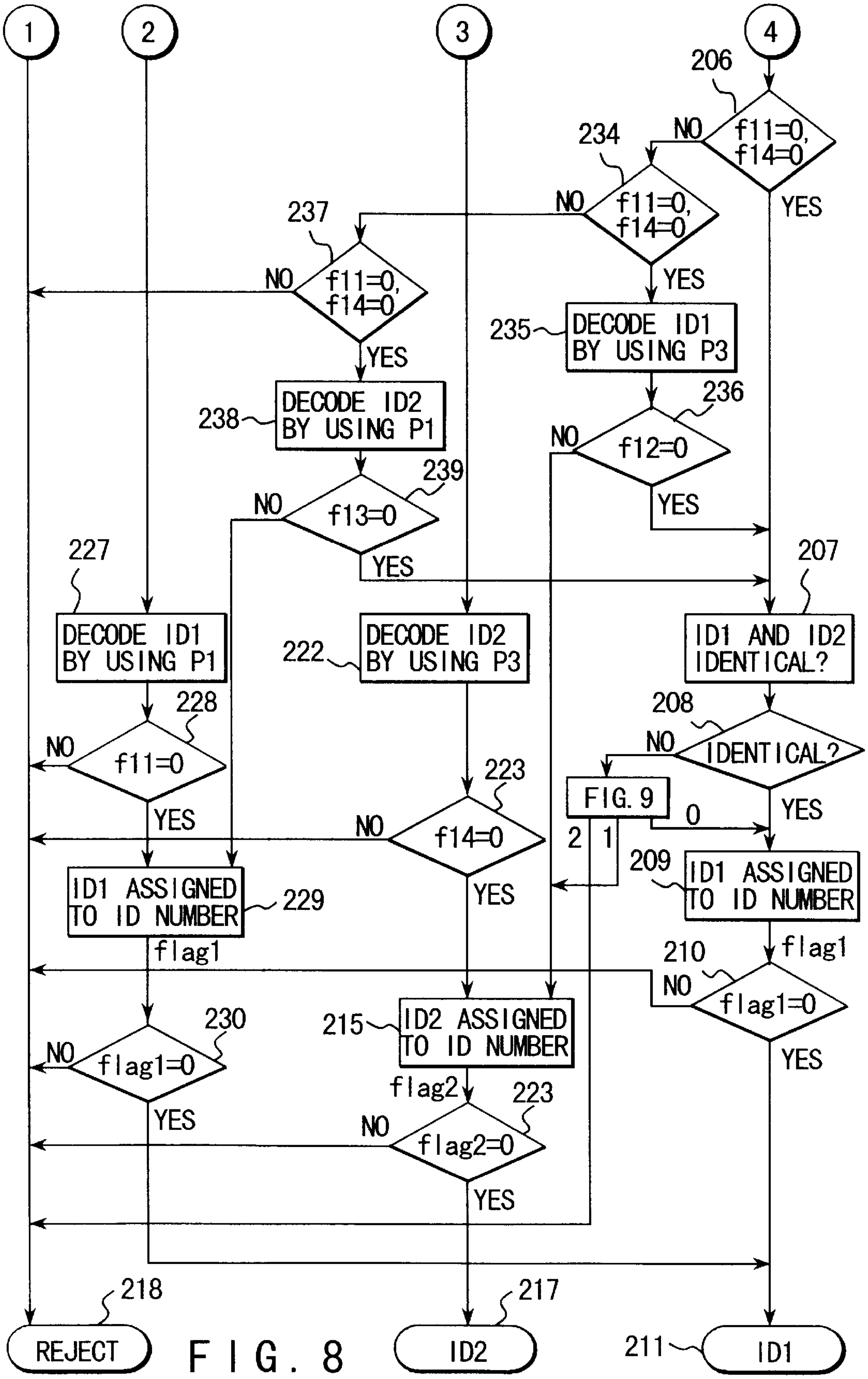
FIG. 8 is a flow chart explaining how the bar-code decoding section corrects a bar-code pattern and converts it into an ID number, when the bar-code pattern is one generated by the method illustrated in FIG. 5C.
Figure 9:
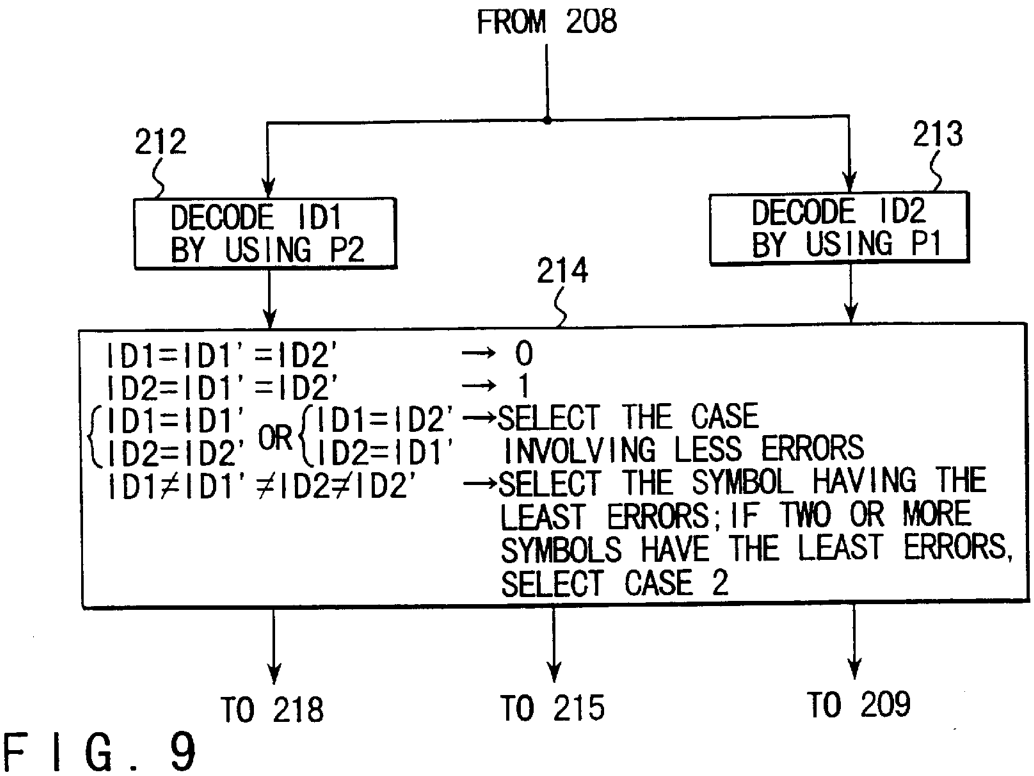
FIG. 9 is a flow chart representing, in detail, one step of the flow chart of FIG. 8.

With reference to the flow chart of FIGS. 7 to 9, it will be explained how the bar-code decoding section 6 corrects a bar-code pattern and converts it into an ID number when the bar-code pattern is one generated by the method illustrated in FIG. 5B.

[1] A data symbol P1 is decoded by using P2, in Step 201. It is determined whether the data symbol P1 has been corrected. If Yes, f01 is set at "0." If No, f01 is set at "1."

[2] Similarly, a data symbol P3 is decoded by using a parity symbol P4, in Step 202. It is determined whether the data symbol P3 has been corrected. If Yes, f04 is set at "0." If No, f04 is set at "1."

[3] Then, it is determined in Step 203 whether f01=0 and f04=0. If Yes, the data symbol ID1 is decoded by using a parity symbol P1, in Step 204. If the data symbol ID1 is corrected, f11 is set at "0." If the data symbol ID1 cannot be corrected, f11 is set at "1." Further, in Step 205, a data symbol ID2 is decoded by using a parity symbol P3. If the data symbol ID2 is corrected, f14 is set at "0." If the data symbol ID2 cannot be corrected, f14 is set at "1."

[4] In Step 206 it is determined whether f11 and f14 obtained in the operation [3] are "0." If Yes, it is determined in Steps 207 and 208 whether or not the data symbols ID1 and ID2 are identical.

[5] If the symbols ID1 and ID2 are found to be identical, the process passes to Step 209. In Step 209 it is determined whether the data symbol ID1 is a symbol (0 to 9) assigned to the ID number. In other words, the data symbol ID1 is checked to see whether it coincides with the symbol assigned to the ID number. If Yes, a flag 1 is set at "0." If No, the flag 1 is set at "1."

[6] If the flag 1 is "0," the process passes to Step 211, in which the data symbol ID1 is output. If the flag 1 is "1," the process passes to Step 218, in which the data symbol ID1 is rejected.

[7] If No in Step 208, that is, if the symbols ID1 and ID2 are not identical, it is quite possible that the symbols ID1 and ID2 have not been corrected. In this case, both symbols ID1 and ID2 are decoded as is illustrated in FIG. 9. More precisely, in Step 212 the symbol ID1 is decoded by using the parity symbol P1, into data symbol ID1', and in Step 213 the symbol ID2 is decoded by using the parity symbol P3, into data symbol ID2'.

[8] Of the four data symbols ID1, ID2, ID1' and ID2' thus decoded, at least one is different in value from the others. In Step 214 it is determined which is the different data symbol. If ID1=ID1'=ID2' (Case 0), the data symbol ID1 is output as the result of decoding, and the operation [5] is carried out, and the whole operation is completed. If ID2=ID1'=ID2' (Case 1), the data symbol ID2 is output is output as the result of decoding, and the process passes to Step 215. In Step 215 it is determined whether the data symbol ID2 is a symbol (0 to 9) assigned to the ID number. In other words, the data symbol ID2 is checked to see whether it coincides with the symbol assigned to the ID number. If Yes, a flag 2 is set at "0." and the process passes to Step 217, in which the symbol ID2 is output. If No, the flag 2 is set at "1," because the symbol ID2 has not been corrected, and the process passes to Step 218, in which the symbol ID2 is rejected.

[9] If it is found in Step 214 that ID1=ID1' and ID2=ID2', or that if ID1=ID2' and ID2=ID1', the set which involved less errors in the decoding process is selected. Then, the data symbol ID of the set selected is checked to see whether it coincides with the symbol (0 to 9) assigned to the ID number. If Yes, the data symbol ID is output. If No, the data symbol ID is rejected.

[10] If it is found in Step 214 that each of the four data symbols ID1, ID2, ID1' AND ID2' not is identical to any other, the data symbol involving least errors is selected. Then, the symbol selected is checked to see whether it coincides with the symbol (0 to 9) assigned to the ID number. If Yes, the data symbol ID output. If No, the data symbol is rejected. If two or more involve least errors (Case 2), it is impossible to determine whether the data symbols have been corrected. In this case, the process passes to Step 218, in which all four data symbols ID1, ID2, ID1' AND ID2' are rejected.

[11] If No in step 203, that is, if both f01 and f04 are not "0," the process passes to Step 219. In Step 219, it is determined whether f01=1 and f04=0. If Yes, the parity symbol P1 is decoded by using the parity symbol P4 in Step 220. If the symbol P1 has been corrected when decoded, f02 is set at "0." If the symbol P1 has not been corrected when decoded, f02 is set at "1."

[12] In Step 221 it is determined whether or not f02=0. If Yes, the operations [3] to [10] are performed.

[13] If No in Step 221, that is, if f02=1, the process passes to Step 222. In Step 222, the data symbol ID2 is decoded by using the parity symbol P3. If the symbol ID2 is corrected when thus decoded, f14 is set at "0." If the symbol ID2 is not corrected, f14 is set at "1."

[14] Then, in Step 223 it is determined whether the f14=0. If Yes, the process passes to Step 215, in which the data symbol ID2 is checked to see if it coincides with the symbol (0 to 9) assigned to the ID number. If Yes in Step 215, flag 2 is set at "0." If No in Step 215, it is determined that the data symbol ID2 has not bee corrected. In Step 216 it is determined whether or not the flag 2=0. If Yes, the data symbol ID2 is output in Step 217. If No, the data symbol ID2 is rejected in Step 218.

[15] If No in Step 219, that is, if f01 and f04 are not 1 and 0, respectively, the process passes to Step 224. In Step 224 it is determined whether f01=0 and f04=1. If Yes, the parity symbol P3 is decoded by using the parity symbol P2 in Step 225. If the symbol P3 is corrected when decoded, f03 is set at "0." If the symbol P3 is not corrected, f03 is set at "1."

[16] In Step 226 it is determined whether f03=0. If Yes, the operations [3] to [10] are carried out.

[17] If No in Step 226, that is, if f03=1, the process passes to Step 227. In Step 227, the data symbol ID1 is decoded by using the parity symbol P1. If the symbol ID1 is corrected when decoded, f11 is set at "0." If the symbol ID1 is not corrected, f11 is set at "1."

[18] Then, in Step 228 it is determined whether f11=0. If Yes, the process passes to Step 229, in which the data symbol ID1 is selected as the result of decoding. The the symbol ID1 is checked to see if it coincides with the symbol (0 to 9) assigned to the ID number. If the symbol ID1 coincides with the symbol (0 to 9), flag 1 is set at "0." If the symbol ID1 does not coincides with the symbol (0 to 9), the flag 1 is set at "1." In Step 230 it is determined whether the flag 1=0. If Yes in Step 230, the data symbol ID1 is output in Step 211. If No in Step 230, the data symbol ID1 is rejected in Step 218. If No in Step 228, that is, if f11=1, the process passes to Step 218, in which the data symbol ID1 is rejected.

[19] If No in Step 224, or if f01=f04=1, the process passes to Step 231. In Step 231, the parity symbol P1 is decoded by using the parity symbol P4. If the symbol P1 is successfully decoded, f02 is set at "0." If the symbol P1 cannot be decoded, f02 is set at "1."

[20] If No in Step 224, or if f01=f04=1, the process passes also to Step 232. In Step 232, the parity symbol P3 is decoded by using the parity symbol P2.

[21] The symbol P3 is successfully decoded in Step 232, f03 is set at "0." If the symbol P3 cannot be decoded, f03 is set at "1."

[22] In Step 233, f02 and f03 are checked for their values. If f02=f03=0, the operations [3] to [10] are performed.

[23] If it is found in Step 233 that f02=0 and f03=1, the operations [13] and [14] are carried out.

[24] If it is determined in Step 233 that f02=1 and f03=0, the operations [17] and [18] are carried out.

[25] If it is found in Step 233 that f02=f03=1, is rejected in Step 218.

[26] If No in Step 206, that is, if both f11 and f14 obtained in the operation [3] are not "0," the process passes to Step 234. In Step 234, if is determined whether f11=1 and f14=0. If Yes, the data symbol ID1 is decoded by using the parity symbol P3 in Step 235. If the symbol ID1 is successfully corrected when decoded, f12 is set at "0." If the symbol ID1 cannot be corrected, f12 is set at "1."

[27] In Step 236 it is determined whether f12=0. If Yes, the operations [4] to [10] are performed.

[28] If No in Step 236, that is, if f12=1, the operation [14] is carried out.

[29] If No in Step 234, that is, if f11 and f14 are not "1" and "0," respectively, the process passes to Step 237. In Step 237 it is determined whether f11=0 and f14=1. If Yes, the data symbol ID2 is decoded by using the parity symbol P1 in Step 238. If the symbol ID2 is successfully corrected when decoded, f13 is set at "0." If the symbol ID2 cannot be corrected, f13 is set at "1."

[30] In Step 239 it is determined whether f13=0. If Yes, the operations [4] to [10] are performed.

[31] If No in Step 239, that is, if f13=1, the operation [18] is carried out.

[32] If No in Step 237, or if f11=1 and f14=1, is rejected in Step 218.

It will be explained how the bar-code decoding section 6 corrects a bar-code pattern and converts it into an ID number when the bar-code pattern is one generated by the method illustrated in FIG. 5C.

[1] First, the data symbol ID1 is decoded by using the parity symbol Pi. If the symbol ID1 is thereby corrected, f01 is set at "0." The symbol ID1 thus decoded is checked to see if it coincides with the symbol (0 to 9) assigned to the ID number. If the symbol ID1 coincides with the symbol (0 to 9), flag 1 is set at "0." If the symbol ID1 does not coincides with the symbol, it is known that the data symbol ID1 has not been corrected. In this case, the flag 1 is set at "1."

[2] Then, the data symbol ID1 is decoded by using the parity symbol P2. If the symbol ID1 is thereby corrected, f02 is set at "0." The result of the decoding, i.e., a data symbol ID1', is checked to see if it coincides with the symbol (0 to 9) assigned to the ID number. If the symbol ID1' coincides with the symbol (0 to 9), flag 2 is set at "0." If the symbol ID1' does not coincides with the symbol, it is known that the data symbol ID1 has not been corrected. In this case, the flag 2 is set at "1."

[3] The data symbol ID2 is decoded by using the parity symbol P3. If the symbol ID2 is corrected, f0333 is set at "0." The symbol ID2 decoded is checked to see if it coincides with the symbol (0 to 9) assigned to the ID number. If the symbol ID2 coincides with the symbol (0 to 9), flag 4 is set at "0." If the symbol ID2 does not coincides with the symbol, it is known that the data symbol ID2 has not been corrected. In this case, the flag 3 is set at "1."

[4] Further, the data symbol ID2 is decoded by using the parity symbol P4. If the symbol ID2 is thereby corrected, f04 is set at "0." The result of the decoding, i.e., a data symbol ID2', is checked to see if it coincides with the symbol (0 to 9) assigned to the ID number. If the symbol ID2' coincides with the symbol (0 to 9), flag 4 is set at "0." If the symbol ID2' does not coincides with the symbol, it is known that the data symbol ID2 has not been corrected. In this case, the flag 4 is set at "1."

[5] If f01=f02=f03=f04=0, it is determined whether the data symbols ID1, ID2, ID1' and ID2' coincide with one another in the case where f0i=0 (i=1 to 4).

[6] When f0i=0 (i=1 to 4), there are the following cases (a) to (o), in which at least one data symbol is identical to at least one other data symbol.

(a) ID1=ID1'=ID2=ID2'
(b) ID1=ID1'=ID2
(c) ID1=ID1'=ID2'
(d) ID1=ID2=ID2'
(e) ID1'=ID2=ID2'
(f) ID1=ID1', ID2=ID2', ID1≠ID2.
(g) ID1=ID2, ID1'=ID2', ID1≠ID1'
(h) ID1=ID2', ID1'=ID2, ID1≠ID1'
(i) Id1=ID1', ID1≠ID2, or ID1=ID1', ID1≠ID2'
(j) ID1=ID2, ID2≠ID1', or Id1=ID2, ID1≠ID1'
(k) ID1'=ID2', ID1≠ID1', or ID1'≠Id2', ID1'≠ID2
(l) ID1'=ID2, ID1≠ID2/, or ID1'=ID2', ID1≠ID2'
(m) ID1=ID2', ID2≠ID1', or ID1=ID2', ID1≠ID2
(n) ID2=ID2', ID1≠ID2, or ID2=ID2', ID1'≠ID2
(o) One of the symbols ID1, ID1', ID2 and ID2' is decoded and coincides with the symbol (0 to 9) assigned to the ID number.

In the cases (a) to (d), the data symbol ID1, for example, is output.

In the case (e), the data symbol ID2, for example, is output.

In the cases (f) to (h), each data symbol is checked for the number of errors involved while the symbol is decoded. The symbol involving least errors is output. In the case (f), for example, the symbol ID1 is output if err1<err2<err3<err4, where err1 is the number of errors the symbol ID1 had, err2 the number of errors the symbol ID1' had, err3 the number of errors the symbol ID2 had, and err4 is the number of errors the symbol ID2' had.

In the cases (i) and (j), the data symbol ID1 is output.

In the cases (k) and (l), the data symbol ID1' is output.

In the cases (m) and (n), the data symbol ID2' is output.

In the case (o), any data symbol that has been decoded is output.

A bar-code encoding/decoding system according to the second embodiment of the invention will be described. The second embodiment is designed to add data to the ID number, to correct data symbols and convert the symbols into an ID-number bar code. Like the first embodiment, the second embodiment can print an ID-number bar code on a mail piece which represents 39 data symbols. The data added to the ID number represents eight data symbols at most. With the Galois field, GF($2^4$), used in the second embodiment, the code length can be 15 at most. (If an expansion field is provided, the code length can be increased to 16.)

Figure 10:
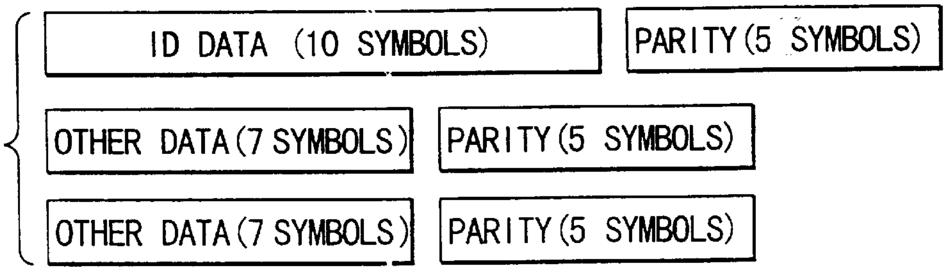
FIG. 10 is diagram explaining the method in which the bar-code encoding section incorporated in a bar-code encoding/decoding system according to a second embodiment corrects character data and converts the data into a bar-code pattern.

FIG. 10 is diagram explaining the method in which the bar-code encoding section incorporated in the second embodiment corrects character data and converts the data into a bar-code pattern. As can be understood from FIG. 10, read-solomon encoding is performed on an ID number, by applying a code length of 15 and a minimum-hamming distance of 6. The data (14 digits at most) other than the ID number is divided into two parts. Read-solomon encoding is performed on each part of this data, by applying a code length of 12 and a minimum-hamming distance of 6. The data added to the ID number may be used to represent two identical postal codes, because each postal code for use in the new postal zoning system is a 7-digit code. Alternatively, the data added to the ID number may be used to represent an address number, because the address number for use in the new postal zoning system is a 13-digit code.

With the second embodiment it is possible to compare the postal or address number decoded from the ID-number bar code printed on the mail piece, with the postal or address number decoded from the bar code printed on the mail piece in the post office, thereby to output.

Figure 11:
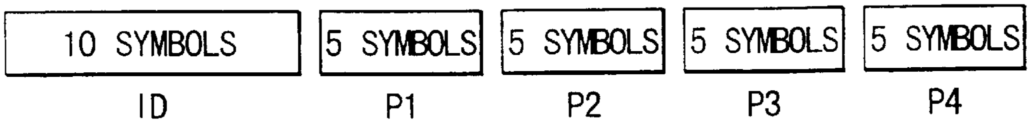
FIG. 11 is a diagram illustrating the strings of parity symbols, obtained in a third embodiment of the present invention.
Figure 12:
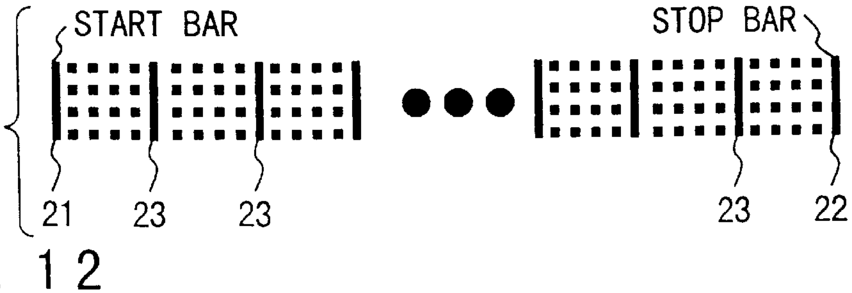
FIG. 12 is a diagram depicting a bar code printed in the third embodiment of the invention.

A bar-code encoding/decoding system according to the third embodiment of the present invention will be described, with reference to FIGS. 11 and 12.

The system according to the third embodiment is characterized in that a prescribed number of bars (hereinafter called "boundary bars') are inserted in an ID-number bar code, each for every specific number of bars. More specifically, as shown in FIG. 12, the ID-number bar code printed in the third embodiment includes a start bar 21, a stop bar 22 and boundary bars 23. One boundary bar 23 is located next to every fourth bar. As in the first embodiment, the ID-number bar code consists of 80 bars in all. Therefore, there are 60 bars other than the start bar 21, the stop bar 22 and the boundary bars 23. These 60 bars represent 30 symbols, every two representing one symbol.

In the third embodiment, a 15-digit ID number is subjected to read-solomon encoding, by applying a code length of 15 and a minimum-hamming distance of 6. As a result, a string P1 of five parity symbols is generated. Read-solomon encoding is conducted on the string P1, by applying a code length of 10 and a minimum-hamming distance of 6, thereby generating a string P2 of five parity symbols. Further, read-solomon encoding is conducted on the string P2, by applying a code length of 10 and a minimum-hamming distance of 6, thereby generating a string P3 of five parity symbols. Still further, read-solomon encoding is conducted on the string P3, by applying a code length of 10 and a minimum-hamming distance of 6, thus generating a string P4 of five parity symbols. The four strings P1 to P4 of parity symbols, thus obtained, are illustrated in FIG. 11.

None of the bars representing the ID data are blank bars, i.e., bars of the type CC5 shown in FIG. 3. However, a bar or bars of the type CC5 are included in the bars defining the strings P1 to P4 of parity symbols. Nonetheless, the par pitch can be easily detected since the ID-number bar code includes the boundary bars (full bars) 23, each provided for four preceding bars. In this case, there are three blank bars (i.e., bars of the type CC5) between every two adjacent boundary bars. Thus, even if the ID-number bar code is printed, overlapping the receiver's name or address written on the mail piece, the blank bars can be reliably recognized. This reduces the possibility that the ID-number bar code cannot be read at all or is read incorrectly.

As described above, the first to third embodiments of the present invention prints an ID-number bar code on every mail piece from which a postal code or an address number cannot be read or are read but incorrectly by means of an OCR. Since the ID-number bar code represents the sender's postal code and address number, the mail piece can be sorted automatically, greatly enhancing the efficiency of returning the mail piece to the sender.

A bar-code encoding/decoding system according to the fourth embodiment of the invention, intended to achieve the above-mentioned second object of the invention, will be described.

Figure 13A:
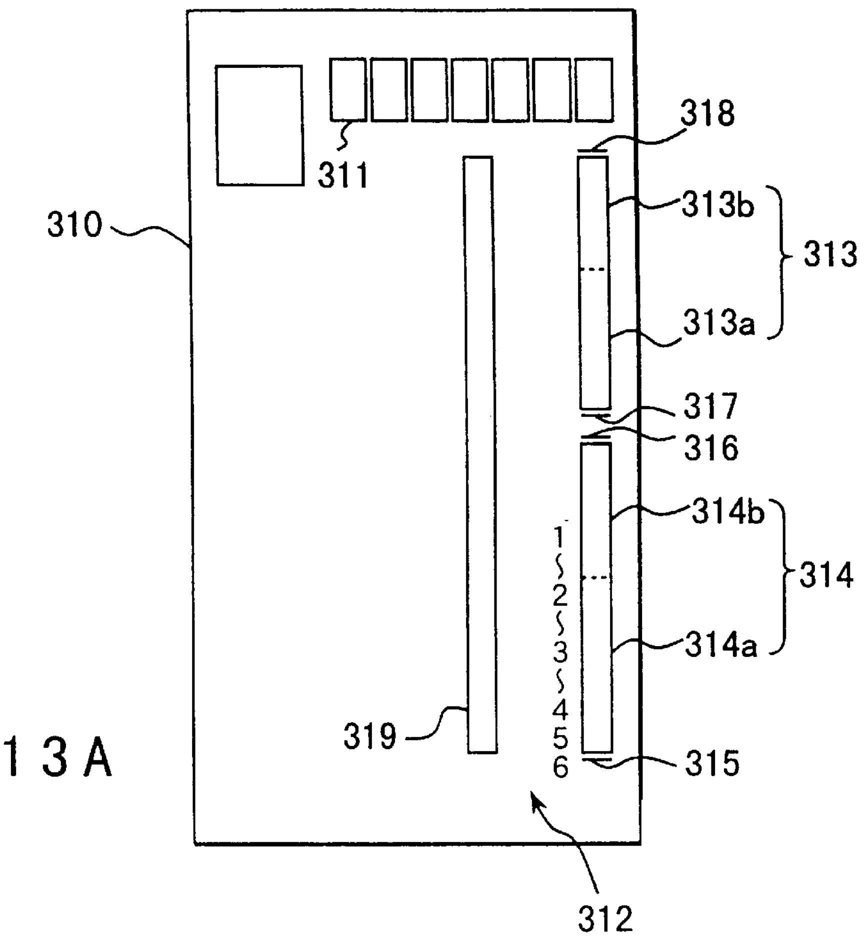
FIG. 13A and 13B shows a post card and a letter envelop indicating the positions on the card and the envelope, at which bar codes are printed in a bar-code encoding/decoding system according to a fourth embodiment of the invention.
Figure 13B:
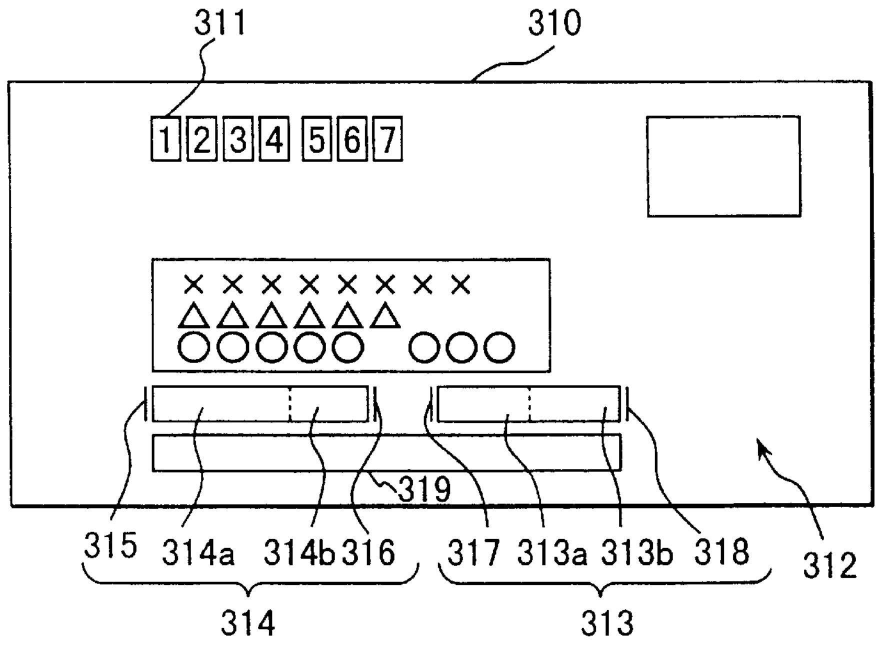

FIGS. 13A and 13B show mail pieces which are to be processed by the bar-code encoding/decoding system, so that they may be delivered in the above-mentioned new postal zoning system which will be adopted in Japan in the future. More precisely, FIG. 13A shows a postal card, and FIG. 13B a letter envelope.

As shown in FIG. 13A, a sender writes the postal code and address number in seven postal-code/address-number boxes 311 printed at the top of the past card 310. The postal code and the address number consists of seven digits. The seven digits designate the address of the receiver, in greater detail than the postal code used at present; more precisely, they designate the prefecture, the city, the ward and the street.

The post card 310 has an address region 312 at its center, in which the receiver's name and address are written. Provided on the right of the address region 312 are a postal-code region 313 and an address-number region 314 which are aligned vertically. The postal-code region 313 consists of a postal-code bar-code region 313*a* and a postal-code parity region 313*b* which are aligned vertically. In the regions 313*a* and 313*b* there will be printed a bar code which represents the postal code. The address-number region 314 consists of an address-number bar-code region 314*a* and an address-number parity region 314*b*. In these regions 314*a* and 314*b* there will be printed a bar code which represents the address number. The address number includes the lot numbers (e.g., "chome," "ban," and "gou," all being Japanese).

A start bar 315 and a stop bar 316 are printed at the head and end of the postal-code region 313, respectively. Similarly, a start bar 317 and 128 are printed at the head and end of the address-number region 314.

The post card 310 also has an ID-number bar-code region 319, located inside the address region 312 and the address-number region 314. It is in this region 319 that an ID-number bar code will be printed.

As shown in FIG. 13B, the letter envelope 310 has postal-code/address-number boxes 311, an address region 312, a postal-code region 313, an address-number region 314, and an ID-number bar-code region 319. The postal-code region 313 and the address-number region 314 are provided in the address region 312 and horizontally aligned with each other. The ID-number bar-code region 319 is located below the regions 213 and 314. The postal-code region 313 consists of a postal-code bar-code region 313*a* and a postal-code parity region 313*b* which are aligned horizontally. A start bar 317 and a stop bar 318 are provided at the head and end of the postal-code region 313. The address-number region 314 consists of an address-number bar-code region 314*a* and an address-number parity region 314*b*. A start bar 315 and a stop bar 316 are provided at the head and end of the address-number region 314.

The bar-code encoding/decoding system according to the fourth embodiment has a bar-code printing system and a bar-code reading system.

Figure 14:
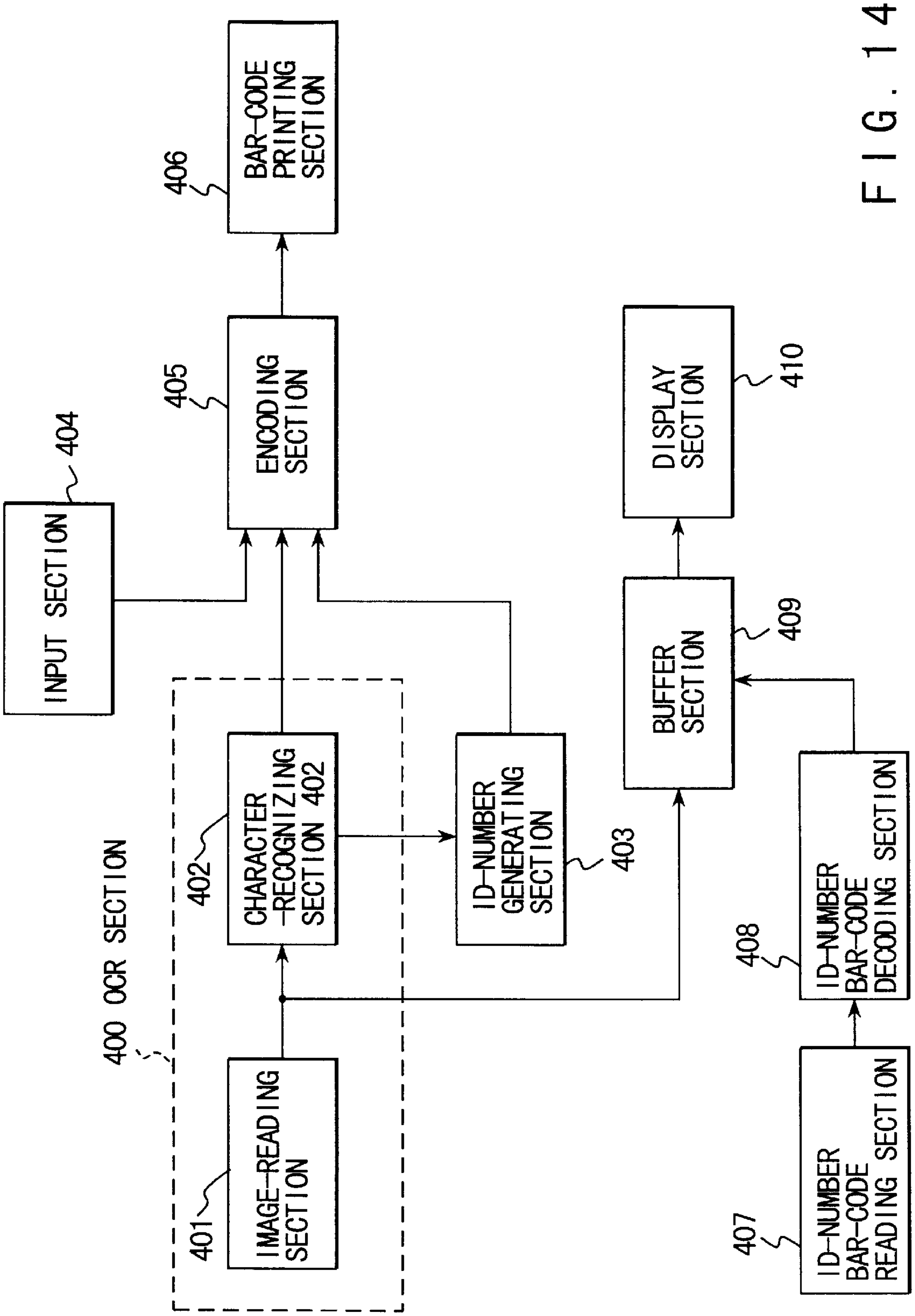
FIG. 14 is a block diagram of the bar-code printing system incorporated in the fourth embodiment.

FIG. 14 is a block diagram of the bar-code printing system incorporated in the fourth embodiment. As shown in FIG. 14, the printing system comprises an OCR section 400 (i.e., an optical character-reading section), an ID-number generating section 403, an input section 404, a bar-code encoding section 405, a bar-code printing section 406, an ID-number bar-code reading section 407, an ID-number bar-code decoding section 408, a buffer section 409, and a display section 410.

The OCR section 400 comprises an image-reading section 401 and a character-recognizing section 402. The section 401 has a scanner. The scanner reads the postal code and the address number written in the postal-code/address-number boxes 311 which is provided on the mail piece 310. The scanner reads the receiver's name and address written in the address region 312 of the mail piece 310, too. The image-reading section 401 generates image data representing the postal code, the address number and the receiver's name and address. The image data is supplied to the character-recognizing section 402. The section 402 perform the known character recognition process on the image data and generates character data (i.e., character codes).

The ID-number generating section 403 generates an ID number which represents the date when the scanner scans the mail piece. It also generates the serial number of the bar-code printing section 406 and the lot number for the mail piece. The input section 404 is operated by an operator. More specifically, the operator operates the section 404 to input the ID number. Alternatively, the operator operates the section 404 to input the postal code and the address number which he or she sees on the screen of the display section 410.

The character codes generated by the OCR section 400 and the ID number generated by the ID-number generating section 403 or input by operating the input section 404 are input to the bar-code encoding section 405. The section 405 corrects the character codes and the ID number and converts them into postal-code bar-code data, address-number bar-code data and ID-number bar-code data. The bar-code data items are input to the bar-code printing section 406. The printing section 406 processes the input data items and prints a postal-code bar code, an address-number bar code and an ID-number bar code in the postal-code region 313, address-number region 314 and ID-number bar-code region 319 of the mail piece, respectively, in, for example, fluorescent ink or transparent ink.

The ID-number bar-code reading section 407 is designed to read the ID-number bar code printed in the ID-number bar-code region 319 of the mail piece. Like the image-reading section 401, it has a scanner for reading the ID-number bar code. The section 407 generates ID-number bar code data, which is input to the ID-number bar-code decoding section 408. The section 408 decodes the ID-number bar code, generating ID number data. The ID number data is supplied to the buffer section 409. The buffer section 409 temporarily stores the image data read by the image-reading section 401. When the ID number data supplied from the bar-code decoding section 408, the image data is transferred to the display section 410. The receiver's name and address written in the address region 312 are thereby displayed on the screen of the display section 410.

Figure 15:
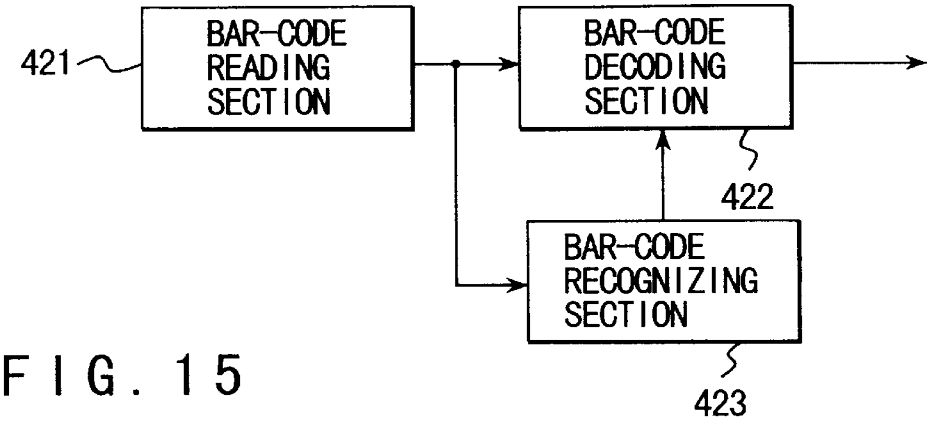
FIG. 15 is a block diagram of the bar-code reading system incorporated in the fourth embodiment.

FIG. 15 is a block diagram of the bar-code reading system incorporated in the fourth embodiment. As seen from FIG. 15, the bar-code reading system comprises a bar-code reading section 421, a bar-code decoding section 422, and a bar-code recognizing section 423.

The bar-code reading section 421 has a scanner, which reads the bar codes printed on the mail piece 310 by the bar-code printing system of FIG. 14. The section 421 generates data representing the bar codes. The bar-code data is input to the bar-code decoding section 422 and also to the bar-code recognizing section 423. The section 422 decodes the bar-code data, generating character codes. The section 423 determines the types of the bar codes read by the bar-code reading section 421. The bar-code recognizing section 423 will be described later, in detail.

Figure 16:
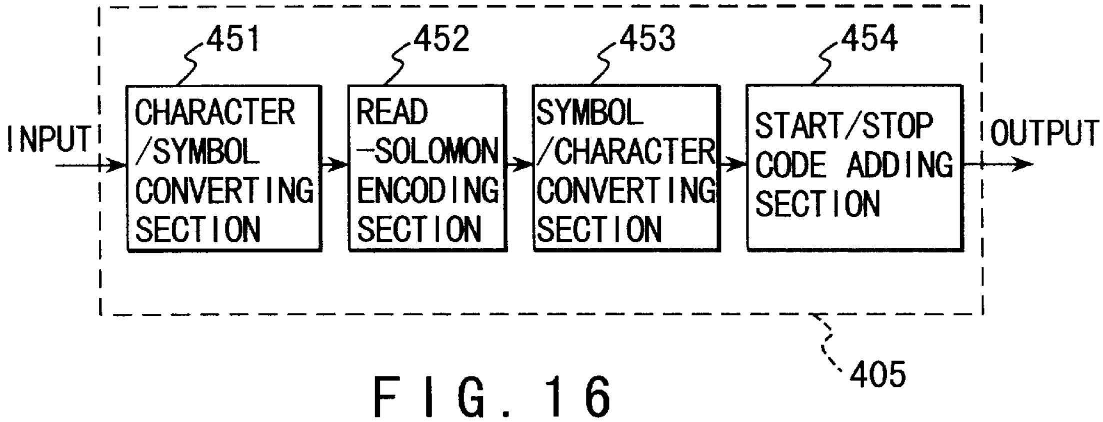
FIG. 16 is a block diagram of the bar-code encoding section provided in the bar-code printing system shown in FIG. 14.

FIG. 16 is a block diagram showing the bar-code encoding section 405 provided in the bar-code printing system of FIG. 14. As shown in FIG. 16, the section 405 comprises a character/symbol converting section 451, a read-solomon encoding section 452, a symbol/character converting section 453, and a start/stop code adding section 454.

The character/symbol converting section 451 converts each character code supplied from the OCR section 400 (FIG. 14) into a combination of data symbols, on the basis of prescribed rules. The data symbols generated by the section 451 are input to the read-solomon encoding section 452. The section 452 performs read-solomon encoding on the data symbols and generates a string of data symbols, each added with a parity symbol.

The data symbols, thus read-solomon encoded, are supplied to the symbol/character converting section 453. The section 453 converts the data symbols into a bar-code pattern which represents a bar code. The bar-code pattern is input to the start/stop code adding section 454. The section 454 adds a start bar pattern and a stop bar pattern to the bar-code pattern. The start-bar pattern represents a bar to be printed at the head of the bar code, and the stop-bar pattern a bar to be printed at the end of the bar code. The bar code pattern and the start- and stop-bar patterns are supplied to the bar-code printing section 406.

Figure 17:
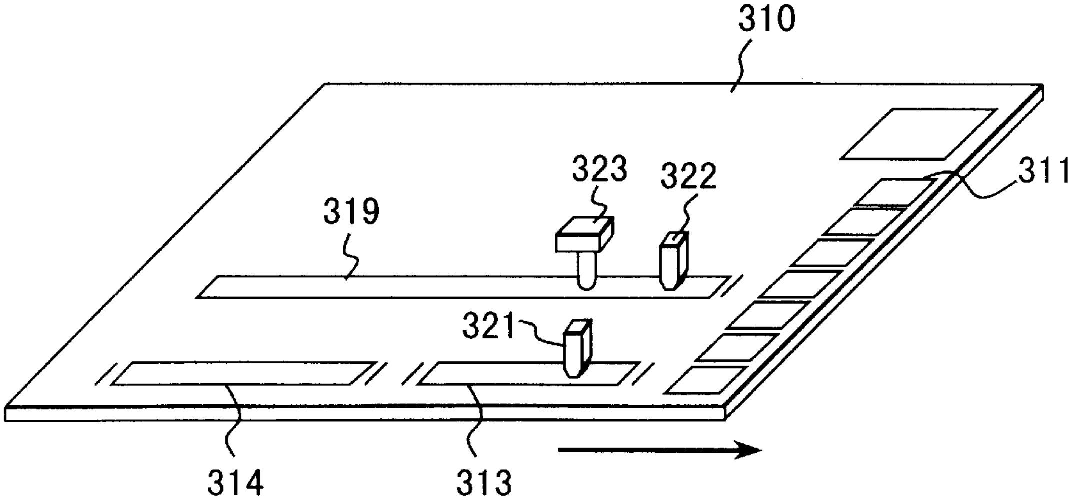
FIG. 17 is a perspective view showing the positional relation between a mail piece, on the one hand, and the bar-code printing section and the ID-number bar-code printing section, on the other, both incorporated in the bar-code printing system shown in FIG. 14.

FIG. 17 is a perspective view showing the positional relation between the mail piece 310, on the one hand, and the bar-code printing section 406 and and the ID-number bar-code reading section 407, on the other. As shown in FIG. 17, the first printer head 321 of the section 406 is located above the postal-code region 313 and address-number region 314 of the mail piece 310. The second printer head 322 is located above the ID-number bar-code region 319 of the mail piece 310. The scanner 323 of the ID-number bar-code reading section 407 is located also above the ID-number bar-code region 319. The printer heads 321 and 322 are, for example, ink-jet heads.

FIGS. 18A to 18D are diagrams illustrating how bars are allocated in different types of bar codes printed in the fourth embodiment.

Figure 18A:
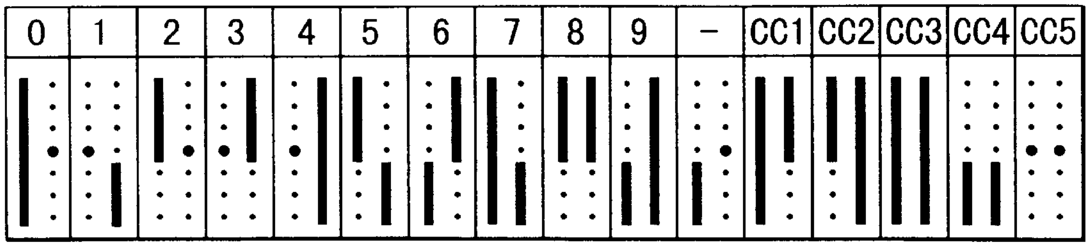
FIGS. 18A to 18D are diagrams illustrating how bars are allocated in different types of bar codes printed in the fourth embodiment.

The bar code shown in FIG. 18A consists of at most four bars, representing 16 states. Namely, the absence of one bar indicates one state, and the presence thereof another state, and four bars indicate 16 states ($=2^4$).

Figure 18B:
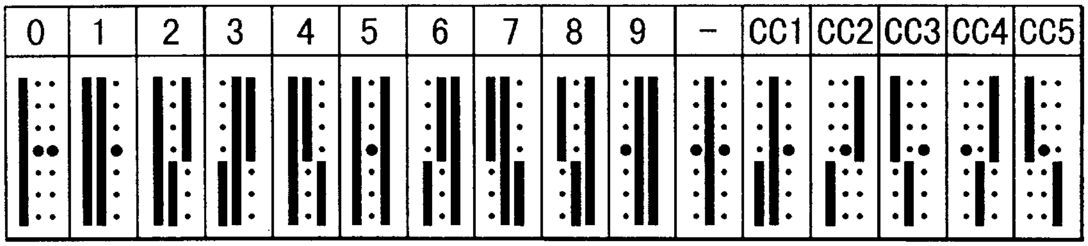

The bar code shown in FIG. 18B consists of at most six bars, representing 64 states. More correctly, the absence of one bar indicates one state, and the presence thereof another state, and six bars indicate 64 states ($=2^6$). In the fourth embodiment, however, only four of the six bars are used to represent 16 sates.

Figure 18C:
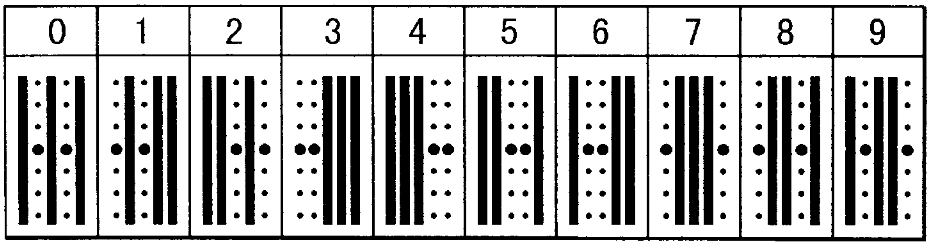

The bar code shown in FIG. 18C consists of at most five bars, representing 32 states. Namely, the absence of one bar indicates one state, and the presence thereof another state, and five bars indicate 32 states ($=2^5$).

The read-solomon encoding section 452 (FIG. 16) uses a Galois field, $GF(2^4)$, to carry out read-solomon encoding. Each of the data symbols the section 452 generates is represented by four bits in the case the bar code shown in FIG. 18A is used. In other words, two bars represent one data symbol. There are 16 different 4-bit patterns, "0000" to "1111." The bars of the bar code are allocated to 15 of these 16 4-bit patterns.

When the bar code shown in FIG. 18A is used, each of the data symbols generated by the section 452 is represented by six bits. In other words, three bars represent one data symbol. There are 64 different 6-bit patterns, "000000" to "111111." The bars of the bar code are allocated to only 15 of these 64 4-bit patterns.

When the bar code shown in FIG. 18C is used, each of the data symbols generated by the section 452 is represented by five bits. In other words, five bars represent one data symbol. There are 32 different 5-bit patterns, "00000" to "11111." Three of the five bars of the bar code are allocated to ten of these 32 5-bit patterns.

Figure 18D:
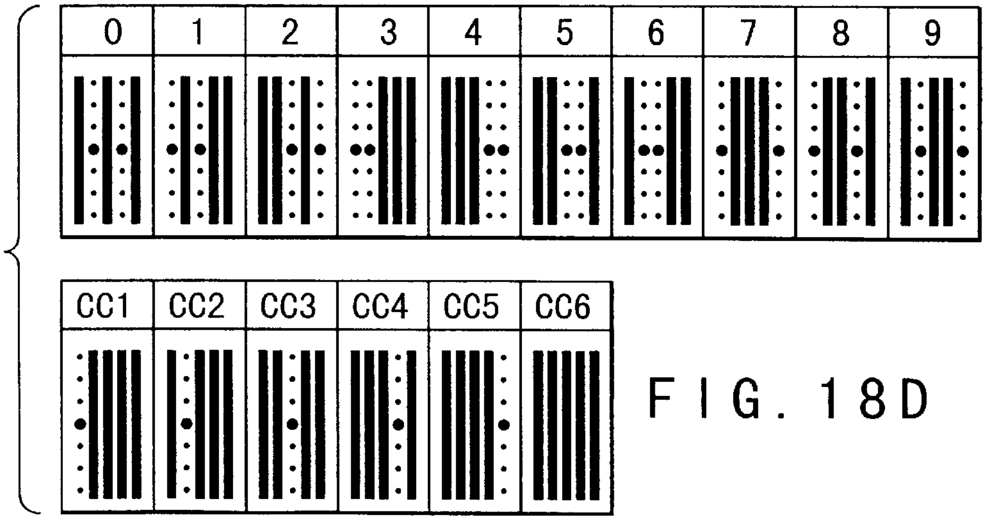

When the bar code shown in FIG. 18D is used, each of the data symbols generated by the section 452 is represented by five bits. In other words, five bars represent one data symbol. There are 32 different 5-bit patterns, "00000" to "11111." The bars of the bar code are allocated to only 15 of these 32 5-bit patterns.

The bar code printed in the fourth embodiment consists of at most 80 bars. The ID-number bar code is a string of data symbols which are numerals only, each ranging from "0" to "9."

Figure 19A:
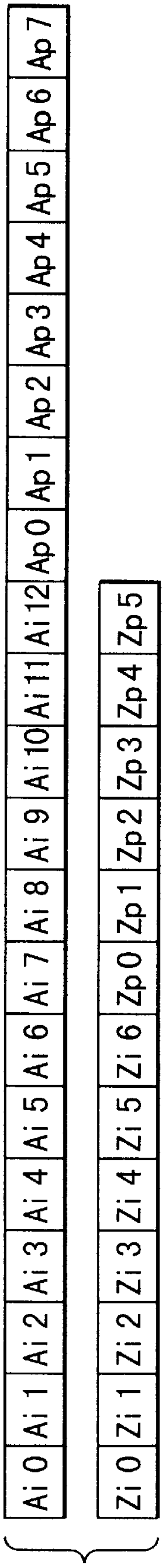
FIGS. 19A to 19D are diagrams showing bar codes printed in which the bars are allocated in the manner illustrated in FIGS. 18A to 18D.
Figure 19B:
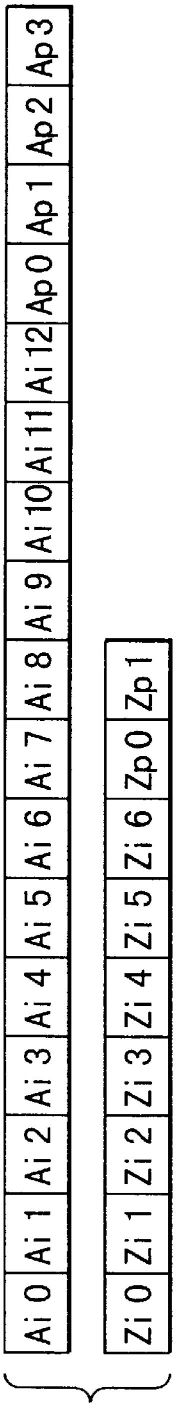
Figure 19C:
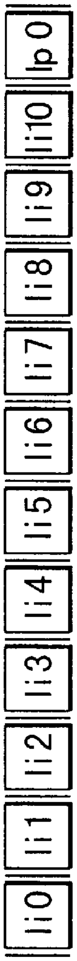
Figure 19D:
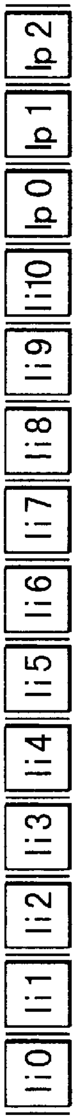

FIGS. 19A to 19D show four bar codes of the types explained with reference to FIGS. 18A to 18D. The bar codes of FIGS. 19A and 19B have a start bar and a stop bar each. Hence, the bar code shown in FIG. 19A represents at most 39 data symbols, and the bar code shown in FIG. 19B represents at most 26 data symbols. In the bar codes of FIGS. 19C and 19D, a start bar and a stop bar provided for each data symbol, and each data symbol is represented by six bars. Therefore, the bar codes shown in FIGS. 19C and 19D represent at most 13 data symbols each.

To generate the bar code shown in FIG. 18A, the postal code is subjected to read-solomon encoding (13, 7, 7) by applying a code length of 13 and a minimum-hamming distance of 7, and the address number to read-solomon encoding (21, 13, 9) by applying a code length of 21 and a minimum-hamming distance of 9.

To generate the bar code shown in FIG. 18B, the postal code is subjected to read-solomon encoding (9, 7, 3) by applying a code length of 9 and a minimum-hamming distance of 3, and the address number to read-solomon encoding (17, 13, 5), by applying a code length of 17 and a minimum-hamming distance of 5.

To generate the bar code shown in FIG. 18C, check-sum encoding (12, 11, 2) is performed, adding one check digit to each data symbol.

To generate the bar code shown in FIG. 18D, read-solomon encoding (13, 11, 3) is performed by applying a code length of 13 and a minimum-hamming distance of 3.

Hereinafter, the bar code representing the postal code and the address number will be referred to as "post-office bar code," and the ID-number bar code as "ID bar code." Further, the bar codes shown in FIGS. 18A, 18B, 18C and 18D will be called "4S2B bar code," "4S3B bar code," "3-out-of-5 bar code," and "BNB (Bar-No-Bar) bar code," respectively.

Figure 20:
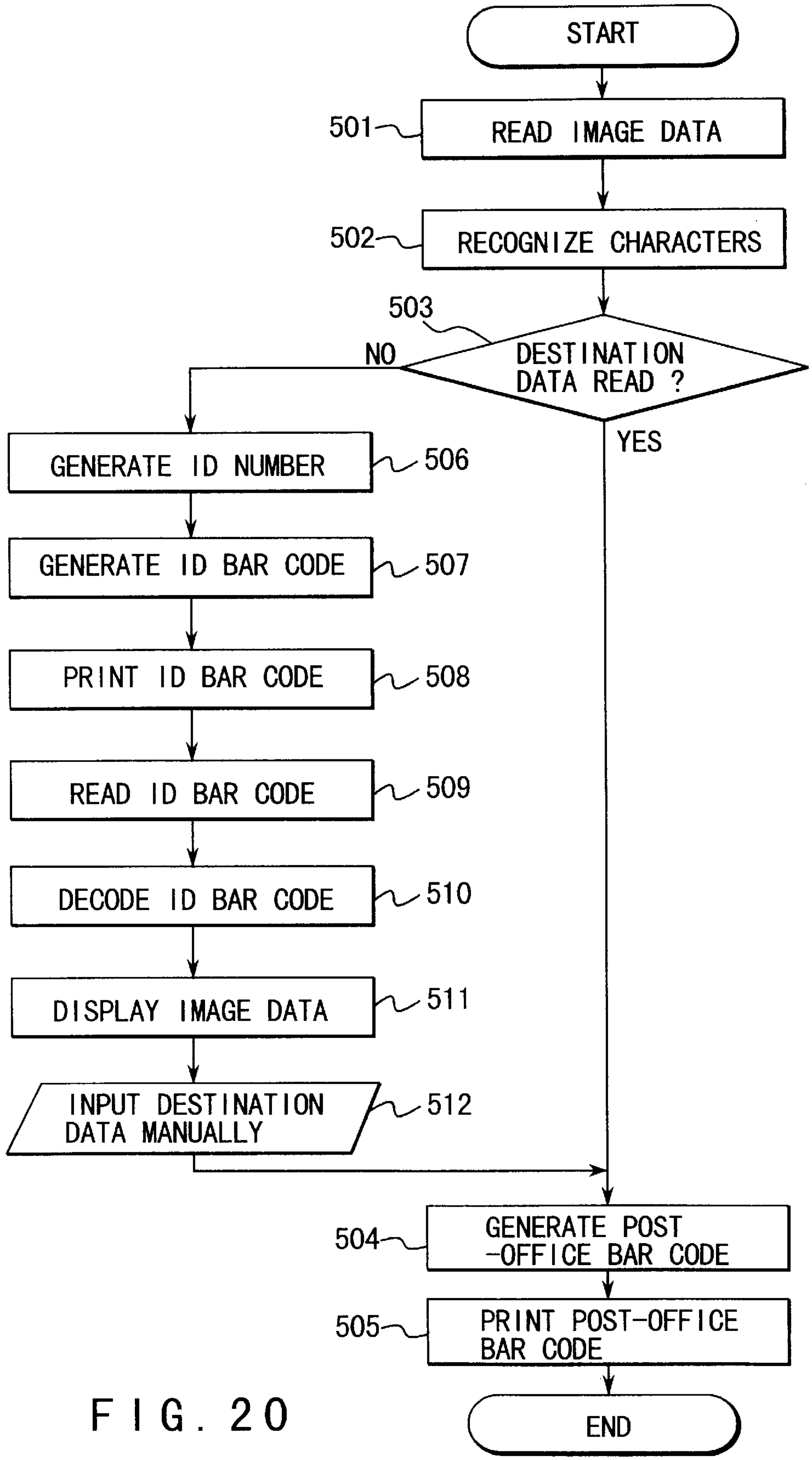
FIG. 20 is a flow chart explaining how bar codes are printed in the fourth embodiment.

How the bar-code printing section 406 prints a post-office bar code, an ID bar code, a 4S2B bar code, a 4S3B bar code and a BNB bar code will be explained, with reference to the flow chart of FIG. 20.

First, in Step 501 the image-reading section 401 reads the destination data written on the mail piece 310 (i.e., the postal code, the address number, and the receiver's name and address) in the form of image data. The image data is input to the character-recognizing section 402. In Step 502, the section 402 recognizes the characters constituting the destination data, generating character codes. Then, in Step 503 it is determined whether the section 401 has correctly read postal code and the address number, from the character codes generated by the character-recognizing section 402. If Yes, the process passes to Step 504, in which the bar-code encoding section 405 converts the character codes into a post-office bar code. Then in Step 505, the printer heads 321 and 322 of the bar-code printing section 406 print the post-office bar code (i.e., the postal-code bar code and the address-number bar code) not only in the postal-code region 313 and address-number region 314, but also in the ID-number bar-code region 319 of the mail piece 310.

The fourth embodiment is characterized in that the printing section 406 prints the post-office bar code is printed in the ID-number bar-code region 319, as well as postal-code region 313 and address-number region 314, when the character-recognizing section 402 correctly reads both the postal code and the address number written in the postal-code/address-number boxes 311. Hence, if the post-office bar code printed in the regions 313 and 314 overlaps the receiver's name or address (or printed advertisement), or is stained or erased, and can no longer be read at all or correctly, the bar-code reading section 421 can read the post-office bar code printed in the ID-number bar-code region 319. Thus, the bar-code decoding section 422 can decode the post-office bar code, generating character codes. This serves to reduce the number of mail pieces from which an operator needs to read the postal code and the address number to sort them into various destination bins.

If No in Step 503, that is, if the image-reading section 401 has failed to correctly read the destination data (i.e., the postal code and the address number), the process passes to Step 506. In Step 506, the ID-number generating section 403 generates an ID number assigned to the mail piece 310. The ID number is input to the bar-code encoding section 405. In Step 507, the section 405 generates ID bar code, which is supplied to the bar-code printing section 406. In Step 508, the section 406 prints the ID bar code in the ID-number bar-code region 319 of the mail piece 310. Then in Step 509, the ID-number bar-code reading section 407 reads the ID bar code and generates data representing the ID bar code. The ID bar code data is input to the bar-code decoding section 408. In Step 510, the section 508 decodes the data into the ID number.

After the ID bar code data is decoded into the ID number in Step 510, the process passes to Step 511. In Step 511, the display section 410 displays the image the image-reading section 401 has read in Step 501. Then in Step 512, the operator operates the input section 404, while seeing the image of the mail piece 310. Character codes representing the postal code and the address number, i.e., the destination data, are thereby input from the section 404 to the bar-code encoding section 405. The process passes to Step 504, in which the encoding section 405 converts the character codes into a post-office bar code. In Step 505, the first printer head 321 of the bar-code printing section 406 prints the post-office bar code not only in the postal-code region 313 and address-number region 314, but also in the ID-number bar-code region 319 of the mail piece 310.

How the data items are encoded so that they are printed in the form of bar codes in the postal-code region 313, address-number region 314 and ID-number bar-code region 319 of the mail piece 310 will be explained, with reference to FIGS. 21 to 27.

As mentioned above, the data items are encoded into a post-office bar code, and the post-office bar code is printed not only in the postal-code region 313 and address-number region 314 (hereinafter called "post-office bar-code region"), but also in the ID-number bar-code region 319.

Figure 21:
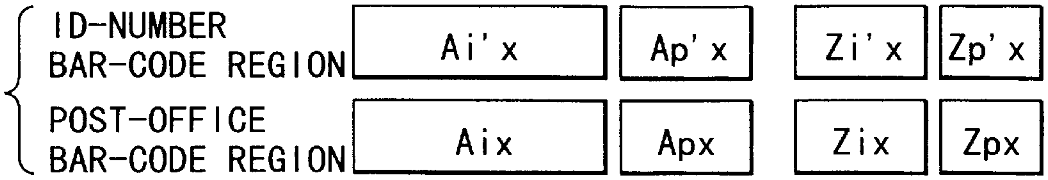
FIG. 21 is a diagram explaining a first method of encoding data items in the fourth embodiment.

FIG. 21 illustrates the method of encoding the data items when the image-reading section 401 correctly reads both the postal code and the address number, so that the post-office bar code may be printed in the ID-number bar-code region 319. Shown in FIG. 21 are: the data parts Aix and Ai'x of the read-solomon address number; the parity parts Apx and Ap'x thereof; the data parts Zix and Zi'x of the read-solomon postal code; and the parity parts Zpx and Zp'x thereof.

A post-office bar code identical to the post-office bar code printed in the post-office bar-code region may be printed in the ID-number bar-code region. In this case, a 4S2B bar code will be printed in the ID-number bar-code region if the post-office bar code printed in the post-office bar-code region is a 4S2B code. Alternatively, a 4S3B bar code will be printed in the ID-number bar-code region if the post-office bar code printed in the post-office bar-code region is a 4S3B code. The postal code is a (13, 7, 7) read-solomon code. Its data parts Zix and Zi'x consist of seven symbols each, and its parity parts Zpx and Zp'x consist of six symbols each. The address number is a (21, 13, 9) read-solomon code. The data parts Aix and Ai'x of the postal code consist of 13 symbols each, and the parity parts Apx and Ap'x thereof consist of eight symbols each.

How the post-office bar code is decoded will be explained.

The postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] Zi'x is decoded by using Zpx. Thus, Zi'x which can be corrected and which is an element of a set of symbols representing the postal code is changed to Zix3.

[Step 4] Zi'x is decoded by using Zp'x. Thus, Zi'x which can be corrected and which is an element of a set of symbols representing the postal code is changed to Zix4.

[Step 5] Of the four data parts Zix1 to Zix4 thus obtained, the one which is identical to more other data parts than any other one is output. For instance, Zix1 is output if Zix1=Zix2=Zix3≠Zix4.

[Step 6] All four data parts Zix1 to Zix4 obtained are rendered not correctable if any one of these data parts is identical to as many other ones as any other one (OK?) (for example, Zix1=Zix2, Zix3=Zix4, and Zix1≠Zix3), or if all these data parts are not identical to one another (namely, Zix1≠Zix2≠Zix3≠Zix4).

[Step 7] If only two data parts are obtained in Steps 1 to 4 and are not identical (for example, if Zix1 and Zix3 are obtained and Zix1≠Zix3), both data parts obtained are rendered not correctable.

The address number is decoded in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] Ai'x is decoded by using Apx. Thus, Ai'x which can be corrected and which is an element of a set of symbols representing the address number is changed to Aix3.

[Step 4] Ai'x is decoded by using Ap'x. Thus, Ai'x which can be corrected and which is an element of a set of symbols representing the address number is changed to Aix4.

[Step 5] Of the four data parts Aix1 to Aix4 thus obtained, the one which is identical to more other data parts than any other one is output. For instance, Aix1 is output if Aix1=Aix2=Aix3≠Aix4.

[Step 6] All four data parts Aix1 to Aix4 are rendered not correctable if any one of these data parts is identical to as many other ones as any other one (for example, Aix1=Aix2, Aix3=Aix4, and Aix1≠Aix3), or if all these data parts are not identical to one another (namely, Aix1≠Aix2≠Aix3≠Aix4).

[Step 7] If only two data parts are obtained in Steps 1 to 4 and are not identical (for example, if Aix1 and Aix3 are obtained and Aix1≠Aix3), both data parts obtained are rendered not correctable.

A post-office bar code different from the post-office bar code printed in the post-office bar-code region may be printed in the ID-number bar-code region. In this case, a 4S3B bar code will be printed in the ID-number bar-code region if the post-office bar code printed in the post-office bar-code region is a 4S2B code. Alternatively, a 4S2B bar code will be printed in the ID-number bar-code region if the post-office bar code printed in the post-office bar-code region is a 4S2B code.

In this instance, the post-office bar code is a 4S2B code, and the bar code printed in the ID-number bar-code region is a 4S3B code. Therefore, the postal-code bar code included in the post-office bar code is a (13, 7, 7) read-solomon code, and the data part Zix and parity part Zpx of the postal code consist of seven symbols and six symbols, respectively. The address-number bar code included in the post-office bar code is a (21, 13, 9) read-solomon code, and the data part Aix and parity part Apx of the address number consist of 13 symbols and eight symbols, respectively. The postal-code bar code printed in the ID-number bar-code region is a (9, 7, 3) read-solomon code, and the data part Zi'x and parity part Zp'x of the postal code bar code consist of seven symbols and two symbols, respectively. The address-number bar code printed in the ID-number bar-code region is a (17, 13, 5) read-solomon code, and the data part Ai'x and parity part Ap'x of this address-number bar code consist of 13 symbols and four symbols, respectively.

How this post-office bar code is decoded will be explained.

The postal code is decoded in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of an element of a set of symbols representing the address number is thereby changed to Aix2.

[Step 3] Ai'x is decoded by using Apx. Thus, Ai'x which can be corrected and which is an element of a set of symbols representing the address number is changed to Zix3.

[Step 4] Ai'x is decoded by using Ap'x. Thus, Ai'x which can be corrected and which is an element of a set of symbols representing the address number is changed to Zix4.

[Step 5] Of the four data parts Aix1 to Aix4 thus obtained, the one which is identical to more other data parts than any other one is output. For instance, Aix1 is output if Aix1=Aix2=Aix3≠Zix4.

[Step 6] Of the four data parts Aix1 to Aix4 obtained, if Aix1=Aix3, Aix2=Aix4, and Aix1≠Aix2, the data part Aix1 (or Aix3) is output.

[Step 7] In any other case than Step 6, all four data parts Aix1 to Aix4 obtained are rendered not correctable if any one of these data parts is identical to as many other ones as any other one (for example, Aix1=Aix2, Aix3=Aix4, and Aix1≠Aix3), or if all these data parts are not identical to one another (namely, Aix1≠Aix2≠Aix3≠Aix4).

[Step 8] If only two data parts Aix1 and Aix2 or Aix1 and Aix4 are obtained in Steps 1 to 4, the data part Aix1 is output, no matter whether the address number is identical. If only two data parts Aix2 and Aix3 or Aix3 and Aix4 are obtained in Steps 1 to 4, the data part Aix3 is output, no matter whether the address number is identical. If any other combination of two data parts, other than the combinations mentioned, (which have been corrected with the same minimum-hamming distance) is output, the data parts of this combination are made not correctable when the address number is not identical, and are output when the address number is identical.

[Step 9] All four data parts Aix1 to Aix4 obtained are rendered not correctable if any one of these data parts is identical to as many other ones as any other one (for example, Aix1=Aix2, Aix3=Aix4, and Aix1≠Aix3), or if all these data parts are not identical to one another (namely, Aix1≠Aix2≠Aix3≠Aix4).

[Step 10] If only two data parts are obtained in Steps 1 to 4 and are not identical (for example, if Aix1 and Aix3 are obtained and Aix1≠Aix3), both data parts obtained are rendered not correctable.

Figure 22:
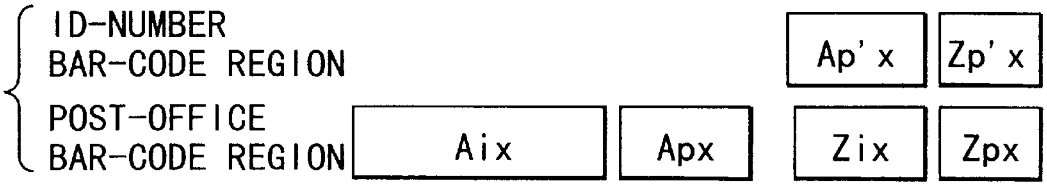
FIG. 22 is a diagram explaining a second method of encoding the data item sin the fourth embodiment.

FIG. 22 illustrates the method of encoding the data items when the image-reading section 401 correctly reads both the postal code and the address number, so that the parity symbols of the post-office bar code may be printed in the ID-number bar-code region 319. Shown in FIG. 22 are: the data part Aix (i.e., the address number) of the read-solomon address number; the parity parts Apx and Ap'x thereof; the data parts Zix (i.e., the postal code) of the read-solomon postal code; and the parity parts Zpx and Zp'x thereof.

A post-office bar code identical to the post-office bar code printed in the post-office bar-code region may be printed in the ID-number bar-code region. In this case, a 4S2B bar code will be printed in the ID-number bar-code region if the post-office bar code printed in the post-office bar-code region is a 4S2B code. Alternatively, a 4S3B bar code will be printed in the ID-number bar-code region if the post-office bar code printed in the post-office bar-code region is a 4S3B code. The postal code is a (13, 7, 7) read-solomon code. Its data part Zix consists of seven symbols, and its parity parts Zpx and Zp'x consist of six symbols each. The address number is a (21, 13, 9) read-solomon code. The data part Aix of the postal code consist of 13 symbols each, and the parity parts Apx and Ap'x thereof consist of eight symbols each.

How the post-office bar code is decoded will be explained.

The postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] If Zix1=Zix2, the data part Zix1, for example, is output.

[Step 4] If If Zix1≠Zix2, both data parts Zix1 and Zix2 are rendered not correctable.

The address number is decoded similarly, in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] If Aix1=Aix2, the data part Aix1, for example, is output.

[Step 4] If If Aix1≠Aix2, both data parts Aix1 and Aix2 are rendered not correctable.

A post-office bar code different from the post-office bar code printed in the post-office bar-code region may be printed in the ID-number bar-code region. In this case, a 4S3B bar code will be printed in the ID-number bar-code region if the post-office bar code printed in the post-office bar-code region is a 4S2B code. Alternatively, a 4S2B bar code will be printed in the ID-number bar-code region if the post-office bar code printed in the post-office bar-code region is a 4S2B code.

In the case of FIG. 22, the post-office bar code is a 4S2B code, and the bar code printed in the ID-number bar-code region is a 4S3b code. Hence, the postal-code bar code included in the post-office bar code is a (13, 7, 7) read-solomon code, and the data part Zix and parity part Zpx of the postal code consist of seven symbols and six symbols, respectively. The address-number bar code included in the post-office bar code is a (21, 13, 9) read-solomon code, and the data part Aix and parity part Apx of the address number consist of 13 symbols and eight symbols, respectively. The postal-code parity symbol code printed in the ID-number bar-code region is a (9, 7, 3) read-solomon code, and the parity part Zp'x of the postal-code parity symbol code consist of two symbols. The address-number parity symbol code printed in the ID-number bar-code region is a (17, 13, 5) read-solomon code, and the parity part Ap'x of this address-number parity symbol code consists of four symbols.

How this post-office bar code is decoded will be explained.

The postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] If Zix1=Zix2, the data part Zix1, for example, is output.

[Step 4] If If Zix1≠Zix2, the data part Zix1 is output which is can be more readily corrected than the data part Zix2.

The address number is decoded in the following sequence of steps:

[Step 1] Aix is decoded by using Apx. Hence, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] If Aix1=Aix2, the data part Aix1, for example, is output.

[Step 4] If If Aix1≠Aix2, the data part Aix1 is output which can be corrected more readily than the data part Aix2.

Since only a few bar codes are printed in the ID-number bar-code region, they can be encoded by applying the same minimum-hamming distance even if the post-office bar code is a 4S2B code in the case where a 4S3B bar code is printed in the ID-number bar-code. Even if the post-office bar code printed in the ID-number bar-code region is identical to the post-office bar code printed in the post-office bar-code region, parity symbols obtained by applying a different minimum-hamming distance may be printed in the ID-number bar-code region. In this case, the bar code of a longer minimum-hamming distance (i.e., the code which can be corrected more readily) is output before the other bar code.

Figure 23:
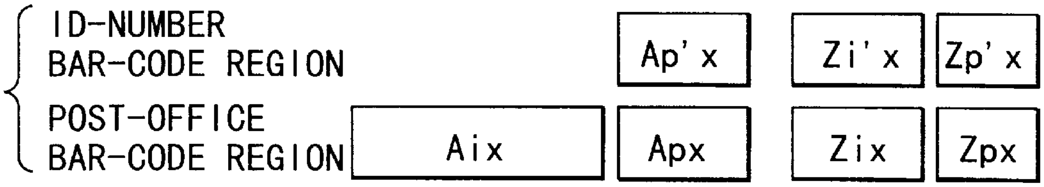
FIG. 23 is a diagram explaining a third method of encoding data items in the fourth embodiment.

FIG. 23 represents the method of encoding the data items when the image-reading section 401 correctly reads both the postal code and the address number, so that the postal code, the parity-symbol code obtained by encoding the postal code, and the parity-symbol code obtained by encoding the address number may be printed in the ID-number bar-code region 319. Shown in FIG. 23 are: the data part Aix and parity part Ap'x of the read-solomon code for the address number; the data parts Zix and Zi'x of the read-solomon code for the postal code; and the parity parts Zpx and Zp'x thereof. A post-office bar code identical to the post-office bar code printed in the post-office bar-code region may be printed in the ID-number bar-code region. In this case, a 4S2B bar code will be printed in the ID-number bar-code region if the post-office bar code printed in the post-office bar-code region is a 4S2B code. Alternatively, a 4S3B bar code will be printed in the ID-number bar-code region if the post-office bar code printed in the post-office bar-code region is a 4S3B code.

The postal code is a (13, 7, 7) read-solomon code. Its data parts Zix and Zi'x consist of seven symbols each, and its parity parts Zpx and Zp'x consist of six symbols each. The address number is a (21, 13, 9) read-solomon code. The data part Aix of the postal code consists of 13 symbols and the parity parts Apx and Ap'x thereof consist of eight symbols each.

How the post-office bar code is decoded will be explained.

The postal code is decoded in the following sequence of steps:

[Step 1] Zix is decoded by using Zpx. Thus, Zix which can be corrected and which is an element of an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] Zi'x is decoded by using Zpx. Zi'x which can be corrected and which is an element of a set of symbols representing the postal code is thereby changed to Zix3.

[Step 4] Zi'x is decoded by using Zp'x. Zi'x which can be corrected and which is a sect of symbols representing the postal code is thus changed to Zix4.

[Step 5] Of the four data parts Zix1 to Zix4 thus obtained, the one which is identical to more other data parts than any other one is output. For instance, Zix1 is output if Zix1=Zix2=Zix3≠Zix4.

[Step 6] All four data parts Zix1 to Zix4 obtained are rendered not correctable if any one of these data parts is identical to as many other ones as any other one (for example, Zix1=Zix2, Zix3=Zix4, and Zix1≠Zix3), or if all these data parts are not identical to one another (namely, Zix1≠Zix2≠Zix3≠Zix4).

[Step 7] If only two data parts are obtained in Steps 1 to 4 and are not identical (for example, if Zix1 and Zix3 are obtained and Zix1≠Zix3), both data parts obtained are rendered not correctable.

The address number is similarly decoded, in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] If Aix1=Aix2, the data part Aix1, for example, is output.

[Step 4] If If Aix1≠Aix2, both data parts Aix1 an Aix2 are made not correctable.

A post-office bar code different from the post-office bar code printed in the post-office bar-code region may be printed in the ID-number bar-code region. In this case, a 4S3B bar code will be printed in the ID-number bar-code region if the post-office bar code printed in the post-office bar-code region is a 4S2B code. Alternatively, a 4S2B bar code will be printed in the ID-number bar-code region if the post-office bar code printed in the post-office bar-code region is a 4S2B code.

In this instance, the post-office bar code is a 4S2B code, and the bar code printed in the ID-number bar-code region is a 4S3B code. Thus, the postal-code bar code included in the post-office bar code is a (13, 7, 7) read-solomon code, and the data part Zix and parity part Zpx of the postal code consist of seven symbols and six symbols, respectively. The address-number bar code included in the post-office bar code is a (21, 13, 9) read-solomon code, and the data part Aix and parity part Apx of the address number consist of 13 symbols and eight symbols, respectively. The postal code printed in the ID-number bar-code is a (9, 7, 3) read-solomon code, and its data parts Zi'x and parity part Zp'x consist of seven symbols and two symbols, respectively. The address number is a (17, 13, 5) read-solomon code, and the data part Ai'x and parity part Ap'x of this address number consist of 13 symbols and four symbols, respectively.

How this post-office bar code is decoded in this case will be explained.

The postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] Zi'x is decoded by using Zpx. Zi'x which can be corrected and which is an element of an element of a set of symbols representing the postal code is thereby changed to Zix3.

[Step 4] Zi'x is decoded by using Zp'x. Zi'x which can be corrected and which is a sect of symbols representing the postal code is thus changed to Zix4.

[Step 5] Of the four data parts Zix1 to Zix4 thus obtained, the one which is identical to more other data parts than any other one is output. For instance, Zix1 is output if Zix1=Zix2=Zix3≠Zix4.

[Step 6] If Zix1=Zix3, Zix2=Zix4, and Zix1≠Zix2, the data parts Zix1 or Zix3 are output.

[Step 7] All four data parts Zix1 to Zix4 obtained are rendered not correctable if any one of these data parts is identical to as many other ones as any other one (for example, Zix1=Zix2, Zix3=Zix4, and Zix1≠Zix3), or if all these data parts are not identical to one another (namely, Zix1≠Zix2≠Zix3≠Zix4), in any step but Step 6.

[Step 8] Zix1 is output if only two data parts Zix1 and Zix2 or Zix1 and Zix4 are obtained in Steps 1 to 7, or only two data parts Zix2 and Zix3 or Zix3 and Aix4 in Steps 1 to 7, no matter whether the postal code is identical. If any combination of two data parts, other than those specified above, is output (that is, two data parts corrected with the same minimum-hamming distance are output), these two data parts output are rendered not correctable if the postal code is not identical, and are output if the postal code is identical.

The address number is decoded in the following sequence of steps:

[Step 1] Aix is decoded by using Apx. Thus, Aix which can be corrected and which is an element of an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] If Aix1=Aix2, the data part Aix1, for example, is output.

[Step 4] If If Aix1≠Aix2, the data part Aix1 is output which can be corrected more readily than the data part Aix2.

Also in this case, only a few bar codes are printed in the ID-number bar-code region. Hence, the bar codes can be encoded by applying the same minimum-hamming distance even if the post-office bar code is a 4S2B code when a 4S3B bar code is printed in the ID-number bar-code region. Even if the post-office bar codes printed in the ID-number bar-code region and the post-office bar-code region are identical, parity symbols obtained by applying a different minimum-hamming distance may be printed in the ID-number bar-code region. In this case, the bar code of a longer minimum-hamming distance (i.e., the code which can be corrected more readily) is output before the other bar code.

Figure 24:
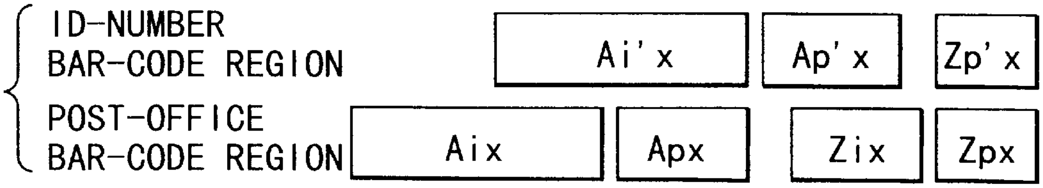
FIG. 24 is a diagram explaining a fourth method of encoding data items in the fourth embodiment.

FIG. 24 represents the method of encoding the data items when the image-reading section 401 correctly reads both the postal code and the address number, so that the post-office bar code may be printed in the ID-number bar-code region 319. Shown in FIG. 24 are: the data parts Aix and Ai'x of the read-solomon code for the address number; the parity parts Apx and Ap'x thereof; the data part Zix of the read-solomon code for the postal code; and the parity parts Zpx and Zp'x thereof.

A post-office bar code identical to the post-office bar code printed in the post-office bar-code region may be printed in the ID-number bar-code region. In this case, a 4S2B bar code will be printed in the ID-number bar-code region if the post-office bar code printed in the post-office bar-code region is a 4S2B code. Alternatively, a 4S3B bar code will be printed in the ID-number bar-code region if the post-office bar code printed in the post-office bar-code region is a 4S3B code. The postal code is a (13, 7, 7) read-solomon code. Its data part Zix consists of seven symbols, and its parity parts Zpx and Zp'x consist of six symbols each. The address number is a (21, 13, 9) read-solomon code. The data parts Aix and Ai'x of the postal code consist of 13 symbols each, and the parity parts Apx and Ap'x thereof consist of eight symbols each.

How the post-office bar code is decoded in this case will be explained.

The postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] If Zix1=Zix2, the data part Zix1, for example, is output.

[Step 4] If If Zix1≠Zix2, both data parts Zix1 and Zix2 are rendered not correctable.

The address number is decoded similarly, in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] Ai'x is decoded by using Apx. Thus, Ai'x which can be corrected and which is an element of a set of symbols representing the address number is changed to Zix3.

[Step 4] Ai'x is decoded by using Ap'x. Thus, Ai'x which can be corrected and which is an element of a set of symbols representing the address number is changed to Zix4.

[Step 5] Of the four data parts Aix1 to Aix4 thus obtained, the one which is identical to more other data parts than any other one is output. For instance, Aix1 is output if Aix1=Aix2=Aix3≠Zix4.

[Step 6] All four data parts Aix1 to Aix4 obtained are rendered not correctable if any one of these data parts is identical to as many other ones as any other one (for example, Aix1=Aix2, Aix3=Aix4, and Aix1≠Aix3), or if all these data parts are not identical to one another (that is, Aix1≠Aix2≠Aix3≠Aix4).

[Step 7] If only two data parts are obtained in Steps 1 to 4 and are not identical (for example, if Aix1 and Aix3 are obtained and Aix1≠Aix3), both data parts obtained are rendered not correctable.

A post-office bar code different from the post-office bar code printed in the post-office bar-code region may be printed in the ID-number bar-code region. In this case, a 4S3B bar code will be printed in the ID-number bar-code region if the post-office bar code printed in the post-office bar-code region is a 4S2B code. Alternatively, a 4S2B bar code will be printed in the ID-number bar-code region if the post-office bar code printed in the post-office bar-code region is a 4S2B code.

In this instance, the post-office bar code is a 4S2B code, and the bar code printed in the ID-number bar-code region is a 4S3B code. Thus, the postal-code bar code included in the post-office bar code is a (13, 7, 7) read-solomon code, and the data part Zix and parity part Zpx of the postal code consists of seven symbols and six symbols, respectively. The address-number bar code included in the post-office bar code is a (21, 13, 9) read-solomon code, and the data part Aix and parity part Apx of the address number consist of 13 symbols and eight symbols, respectively. The postal code printed in the ID-number bar code is a (9, 7, 3) read-solomon code, and its data parts Zi'x and parity part Zp'x consist of seven symbols and two symbols each. The address number is a (17, 13, 5) read-solomon code, and the data part Ai'x and parity part Ap'x of this address number consists of 13 symbols and four symbols, respectively.

In this case, the postal code is decoded in the following sequence of steps:

[Step 1] Zix is decoded by using Zpx. Thus, Zix which can be corrected and which is an element of a set of symbols representing the postal code is changed to Zix1.

[Step 2] Zi'x is decoded by using Zp'x. Zi'x which can be corrected and which is an element of a set of symbols representing the postal code is thereby changed to Zix2.

[Step 3] If Zix1=Zix2, the data part Zix1, for example, is output.

[Step 4] If If Zix1≠Zix2, the data part Zix1 which can be more readily corrected is output.

The address number is decoded in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 4] Ai'x is decoded by using Ap'x. Thus, Ai'x which can be corrected and which is an element of a set of symbols representing the address number is changed to Zix4.

[Step 6] Of the four data parts Aix1 to Aix4 obtained, if Aix1=Aix3, Aix2=Aix4, and Aix1≠Aix2, the data part Aix1 (or Aix3) is output.

[Step 7] In any other case than Step 6, all four data parts Aix1 to Aix4 obtained are rendered not correctable if any one of these data parts is identical to as many other ones as any other one (for example, Aix1=Aix2, Aix3=Aix4, and Aix1≠Aix3), or if all these data parts are not identical to one another (namely, Aix1≠Aix2≠Aix3≠Aix4).

[Step 8] If only two data parts Aix1 and Aix2 or Aix1 and Aix4 are obtained in Steps 1 to 4, the data part Aix1 is output, no matter whether the address number is identical. If only two data parts Aix2 and Aix3 or Aix3 and Aix4 are obtained in Steps 1 to 4, the data part Aix3 is output, no matter whether the address number is identical. If any other combination of two data parts, other than the combinations mentioned, (which have been corrected with the same minimum-hamming distance) is output, the data parts of this combination are made not correctable when the address number is not identical, and are output when the address number is identical.

[Step 9] All four data parts Aix1 to Aix4 obtained are rendered not correctable if any one of these data parts is identical to as many other ones as any other one (for example, Aix1=Aix2, Aix3=Aix4, and Aix1≠Aix3), or if all these data parts are not identical to one another (namely, Aix1≠Aix2≠Aix3≠Aix4).

[Step 10] If only two data parts are obtained in Steps 1 to 4 and are not identical (for example, if Aix1 and Aix3 are obtained and Aix1≠Aix3), both data parts obtained are rendered not correctable.

Figure 25:
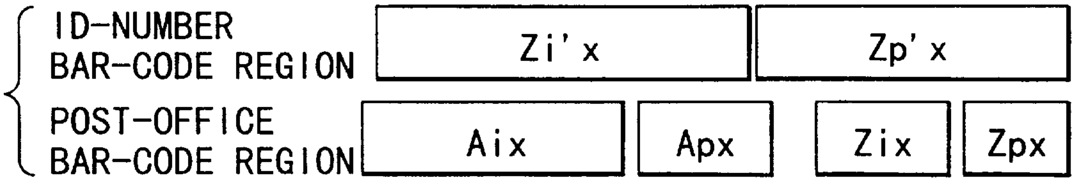
FIG. 25 is a diagram explaining a fifth method of encoding data items in the fourth embodiment.

FIG. 25 represents the method of encoding the data items when the bar code shown in FIG. 18C is printed on the mail piece 310. The bar code shown in FIG. 18C is a 3-out-of-5 code, check-sum encoding (8, 7, 2) is performed, and $GF(2^4)$ read-solomon encoding cannot be effected. As the check-sum encoding is performed, a one-symbol parity is added each data symbol. Shown in FIG. 25 are: the data parts Zix and Zi'x which consist of seven symbols each; the parity part Zpx which consists of six symbols if the post-office bar code is a 4S2B code and which consists of two symbols if the post-office bar code is a 4S3B code; and the parity part Zp'x which consists of one symbol. The parity symbols cannot be replaced one with another as in the decoding methods (FIGS. 21 to 24) in order to decode the destination data.

[Step 3] If Zix1=Zix2, the data part Zix1, for example, is output.

[Step 4] If If Zix1≠Zix2, the data part Zix1 which can be more readily corrected is output.

The address number is decoded by using Aix and Apx.

The bar code shown in FIG. 18D is a BNB bar code. When this bar code is used, read-solomon encoding can be carried out. Namely, the post code to be printed in the ID-number bar-code region 319 is subjected to (13, 7, 7)

red-solomon encoding. Hence, Zi'x consists of seven symbols, and Zp'x consists of six symbols. In this case, the postal code is decoded in the following sequence of steps:

[Step 1] Zix is decoded by using Zpx. Thus, Zix which can be corrected and which is an element of a set of symbols representing the postal code is changed to Zix1.

[Step 2] Zix is decoded by using Zp'x. Zix which can be corrected and which is an element of a set of symbols representing the postal code is thereby changed to Zix2.

[Step 3] Zi'x is decoded by using Zpx. Zi'x which can be corrected and which is an element of a set of symbols representing the postal code is thereby changed to Zix3.

[Step 4] Zi'x is decoded by using Zp'x. Zi'x which can be corrected and which is an element of a set of symbols representing the postal code is thereby changed to Zix4.

[Step 5] Of the four data parts Zix1 to Zix4 thus obtained, the one which is identical to more other data parts than any other one is output. For example, Zix1 is output if Zix1=Zix2=Zix3≠Zix4.

[Step 6] If Zix1=Zix3, Zix2=Zix4, and Zix1≠Zix2, the data parts Zix2 or Zix4 are output.

[Step 7] All four data parts Zix1 to Zix4 obtained are rendered not correctable if any one of these data parts is identical to as many other ones as any other one (for example, Zix1=Zix2, Zix3=Zix4, and Zix1≠Zix3), or if all these data parts are not identical to one another (namely, Zix1≠Zix2≠Zix3≠Zix4), in any step but Step 6.

[Step 8] Zix2 is output if only two data parts Zix1 and Zix2 or Zix2 and Zix3 are obtained in Steps 1 to 4 and the post-office bar code is a 4S2B code, provided the two data parts are identical. If the two data parts are not identical, they are rendered not correctable. Zix2 is output if the post-office bar code is a 4S3B code, no matter whether the two data parts obtained are identical or not. Zix4 is output if only two data parts Zix1 and Zix4 or Zix3 and Zix4 are obtained and the post-office bar code is a 4S2B code, provided the two data parts are identical. If the two data parts are not identical, they are rendered not correctable. Zix4 is output if the post-office bar code is a 4S3B code, no matter whether the two data parts obtained are identical or not. If the two data parts obtained are Zix and Zix3, the data part Zix1 or Zix3 is output. If the two data parts obtained are Zix2 and Zix4, the data part Zix2 or Zix4 is output.

The address number is decoded by using Aix and Apx.

Figure 26:
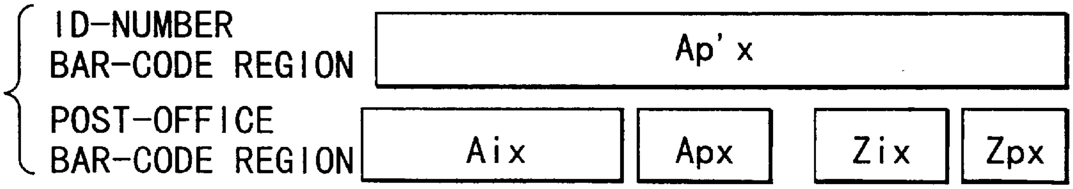
FIG. 26 is a diagram explaining a sixth method of encoding data items in the fourth embodiment.

FIG. 26 represents the method of encoding the data items when the image-reading section 401 correctly reads both the postal code and the address number, so that the parity-symbol bar code provided by correcting and encoding the address number may be printed in the ID-number bar-code region 319. Shown in FIG. 26 are: the data part Aix of the read-solomon code for the address number; the parity parts Apx and Ap'x thereof; the data part Zix of the read-solomon code for the postal code; and the parity part Zpx thereof.

If the post-office bar code is a 4S2B code, the bar code printed in the ID-number bar-code region is the bar code of the type shown in FIG. 18D. Six bars are required to represent one symbol as in the method explained with reference to FIG. 25. This is because a bar is added to the end of the bar code, distinguishing the bar code from any other. The bar code that can be printed in the ID-number bar-code region consists of 13 symbols, or less symbols than the constituent symbols of a 4S2B code or a 4S3B.

In this case, the address number is decoded in the following sequence of steps:

[Step 1] Aix is decoded by using Apx. Thus, Aix which can be corrected and which is an element of a set of symbols representing the address number is changed to Aix1.

[Step 2] Aix is decoded by using Ap'x. Aix which can be corrected and which is an element of a set of symbols representing the address number is thereby changed to Aix2.

[Step 3] If Aix1=Aix2, the data part Aix1, for example, is output.

[Step 4] If Aix1≠Aix2, the data part Aix2 is output.

Figure 27:
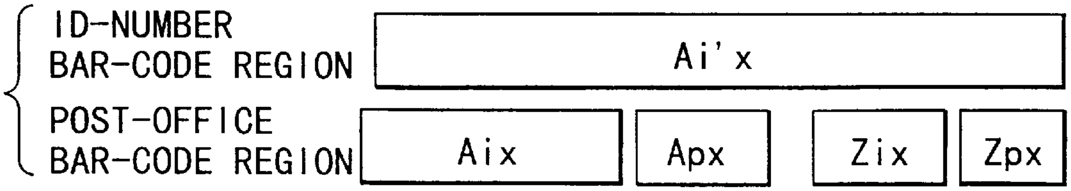
FIG. 27 is a diagram explaining a seventh method of encoding data items in the fourth embodiment.

FIG. 27 represents the method of encoding the data items when the image-reading section 401 correctly reads both the postal code and the address number, so that the address number may be printed in the ID-number bar-code region 319, in the form of a bar code of the type shown in FIG. 18C or 18D. Shown in FIG. 27 are: the data parts Aix and Ai'x of the address-number bar code; the parity part Apx of the read-solomon code for the address number; the data part Zix of the error-correcting code for the address number; and the parity part Zpx thereof.

If the post-office bar code is a 4S2B code or a 4S3B code, the bar code printed in the ID-number bar-code region is the bar code of the type shown in FIG. 18C or 18D. Six bars are required to represent one symbol as in the method explained with reference to FIG. 26. This is because a bar is added to the end of the bar code, distinguishing the bar code from any other. The bar code that can be printed in the ID-number bar-code region consists of 13 symbols, or less symbols than the constituent symbols of a 4S2B code or a 4S3B.

In this case, the address number is decoded in the following sequence of steps:

[Step 1] Aix is decoded by using Apx. Thus, Aix which can be corrected and which is an element of a set of symbols representing the address number is changed to Aix1.

[Step 2] Ai'x is decoded by using Apx. Ai'x which can be corrected and which is an element of a set of symbols representing the address number is thereby changed to Aix2.

[Step 3] If Aix1=Aix2, the data part Aix1, for example, is output.

[Step 4] If Aix1≠Aix2, both data parts are rendered not correctable.

Figure 28A:
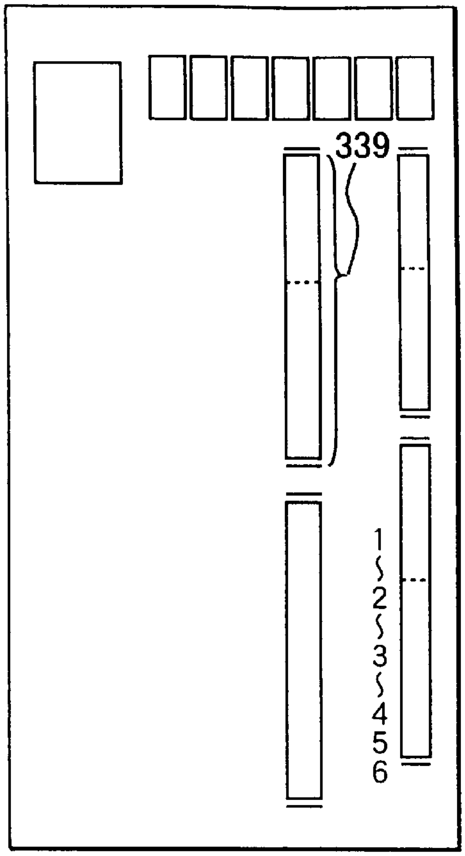
FIGS. 28A and 28B show two types of letter envelopes, indicating the positions on the envelopes, at which bar codes are printed in a bar-code encoding/decoding system according to a fifth embodiment of this invention.
Figure 28B:
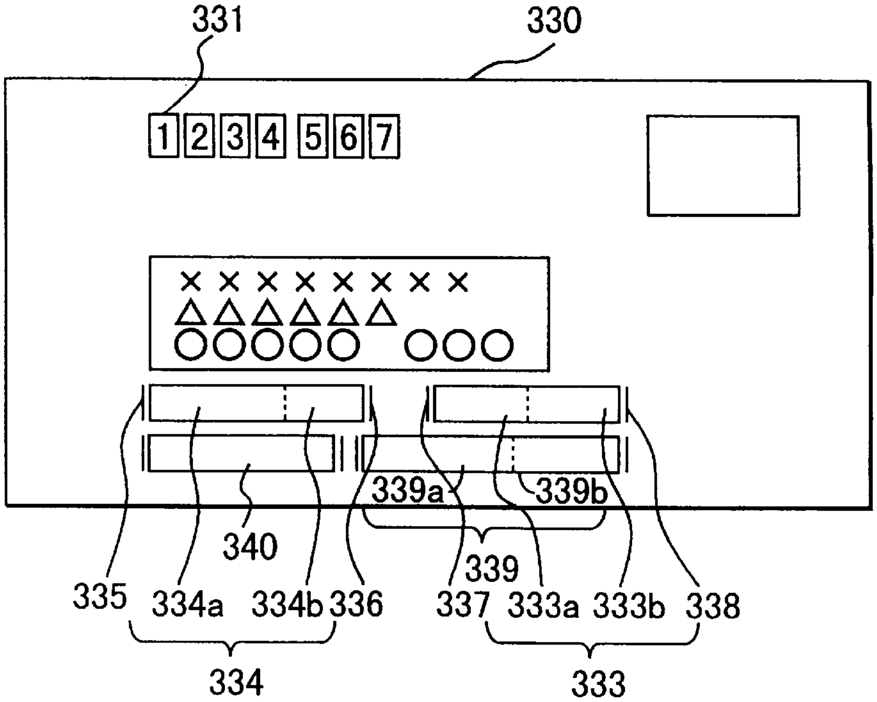

FIGS. 28A and 28B show mail pieces 330 which are to be processed by a bar-code encoding/decoding system according to the fifth embodiment of the present invention. More precisely, FIG. 28A shows a letter envelope of the Japanese style, and FIG. 28B a letter envelope of Euro-American style. As in the case of the post card and letter envelope shown in FIGS. 13A and 13B, a sender writes the postal code and address number in seven postal-code/address-number boxes 331 printed at the top of the Japanese-style envelope 330.

The envelope 330 shown in FIG. 28A has an address region 332 at its center, in which the sender writes the receiver's name and address. Provided on the right of the address region 332 are a postal-code region 333 and an address-number region 334 which are aligned vertically. The postal-code region 333 consists of a postal-code bar-code region 333*a* and a postal-code parity region 333*b* which are aligned vertically. The address-number region 334 consists of an address-number bar-code region 334*a* and an address-number parity region 334*b*. A start bar 335 and a stop bar 336 are printed at the head and end of the postal-code region 333, respectively. Similarly, a start bar 337 and 338 are printed at the head and end of the address-number region 334.

The envelope 330 also has an ID-number bar-code region 339, located inside the address region 322 and the address-number region 334. The ID-number bar-code region 339 is composed of an ID-number bar-code region 339*a* and an ID-number parity bar-code region 339*b*, which are aligned vertically. The envelope 330 further has a blank region 340.

The blank region 340 extends vertically. An ID-number bar code can be printed in both regions 339 and 340. In this respect the letter envelope shown in FIG. 28A differs from the envelope and post card illustrated in FIGS. 13A and 13B.

Figure 29:
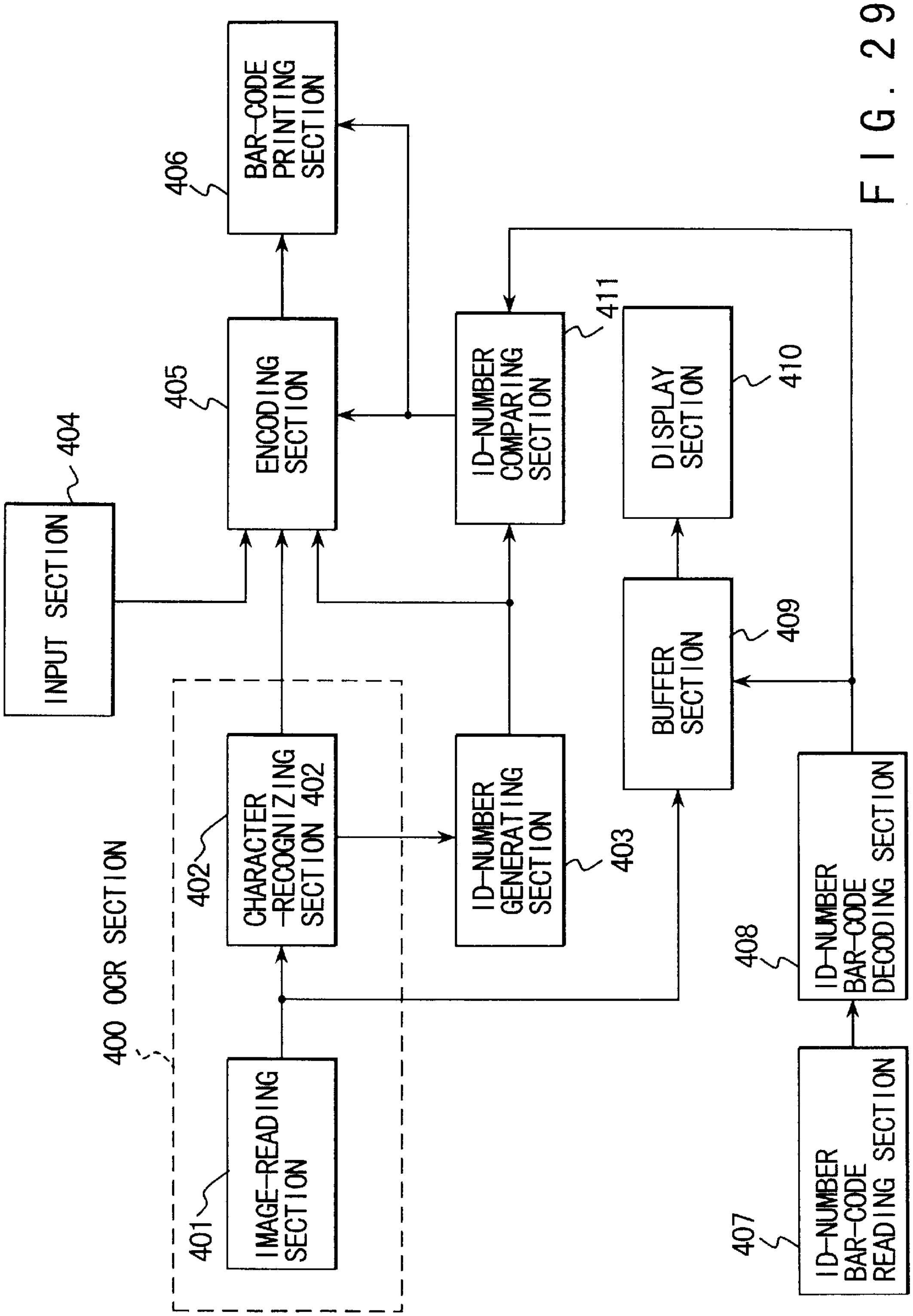
FIG. 29 is a block diagram of the bar-code printing system incorporated in the fifth embodiment.

FIG. 29 is a block diagram of the bar-code printing system incorporated in the fifth embodiment. As shown in FIG. 29, this printing system comprises an OCR section 400 (i.e., an optical character-reading section), an ID-number generating section 403, an input section 404, a bar-code encoding section 405, a bar-code printing section 406, an ID-number bar-code reading section 407, an ID-number bar-code decoding section 408, a buffer section 409, a display section 410, and an ID-number comparing section 411. The OCR section 400 comprises an image-reading section 401 and a character-recognizing section 402. Thus, the fifth embodiment differs from the fourth embodiment (FIG. 14) in that it incorporates the ID-number comparing section 411. The section 411 is designed to compare the ID-number bar code read by the ID-number bar-code reading section 407, with the ID-number bar code decoded by the ID-number bar-code decoding section 408. If the ID-number bar codes compared are not identical, the section 411 generates a control signal. The control signal is supplied to the bar-code encoding section 405, instructing the section 405 to generate a bar-code pattern. The control signal is supplied also to the bar-code printing section 406, instructing the section 406 to process the bar-code pattern and print a bar code.

Figures 30, 31A, 31B, 31C:
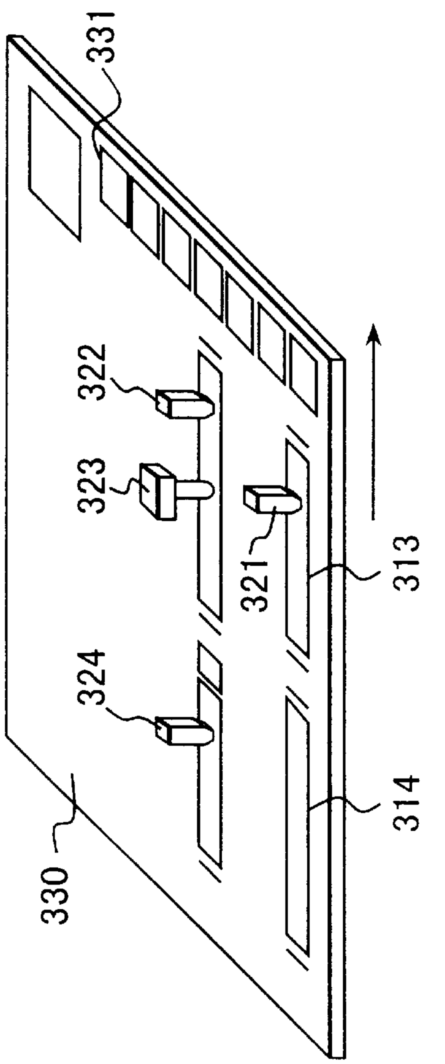
FIG. 30 is a perspective view showing the positional relation between a mail piece, on the one hand, and the bar-code printing section and the ID-number bar-code printing section, on the other, both incorporated in the bar-code printing system shown in FIG. 29.
FIGS. 31A to 31C are diagrams showing bar codes printed in which the bars are allocated in the manner illustrated in FIG. 18A.

FIG. 39 is a perspective view showing the positional relation between the mail piece 330, on the one hand, and the bar-code printing section 406 and and the ID-number bar-code reading section 407, on the other. As shown in FIG. 30, the first printer head 321 of the section 406 is located above the postal-code region 333 and address-number region 334 of the mail piece 310 which is being moved in the direction of the arrow. The second printer head 322 is located above the ID-number bar-code region 339*a*. The scanner 323 of the ID-number bar-code reading section 407 is located also above the ID-number bar-code region 319. Further, the third printer head 324 of the section 406 is located above the ID-number parity bar-code region 339*b*. The bar-code printing section 406 differs from its counterpart of the fourth embodiment (FIG. 14) in that the third printer head 324 is added.

The fifth embodiment prints bar codes of the type shown in FIG. 18A, each consisting of four bars and representing 16 states. Namely, the absence of one bar indicates one state, and the presence thereof another state, whereby four bars indicate 16 states ($=2^4$).

The read-solomon encoding section 452 (FIG. 16) of the bar-code printing section 406 uses a Galois field, GF($2^4$), to carry out read-solomon encoding. Each of the data symbols the section 452 generates is represented by four bits in the case the bar code shown in FIG. 18A is used. In other words, two bars represent one data symbol. There are 16 different 4-bit patterns, "0000" to "1111." The bars of the bar code are allocated to 15 of these 16 4-bit patterns.

To generate the bar code shown in FIG. 18A, the postal code is subjected to read-solomon encoding (13, 7, 7) by applying a code length of 13 and a minimum-hamming distance of 7, and the address number to read-solomon encoding (21, 13, 9) by applying a code length of 21 and a minimum-hamming distance of 9.

As in the fourth embodiment, both the postal code and the address number are converted into a post-office bar code, and the ID number is converted into an ID-number bar code. The bar code shown in FIG. 18A is a 4S2B code. The bar code printed in the fifth embodiment consists of at most 80 bars. The ID-number bar code is a string of data symbols which are numerals only, each ranging from "0" to "9."

FIGS. 31A to 32C show four bar codes of the types which are printed in the fifth embodiment. To be more specific, FIG. 31A shows the bar code to be printed in the address-number bar-code region, FIG. 31B the bar code to be printed in the postal-code bar-code region, and FIG. 31C the bar code to be printed in the ID-number bar-code region. As shown in FIG. 31C, the bar code that can be printed in the blank region 340 represents at most 19 symbols.

Figure 32:
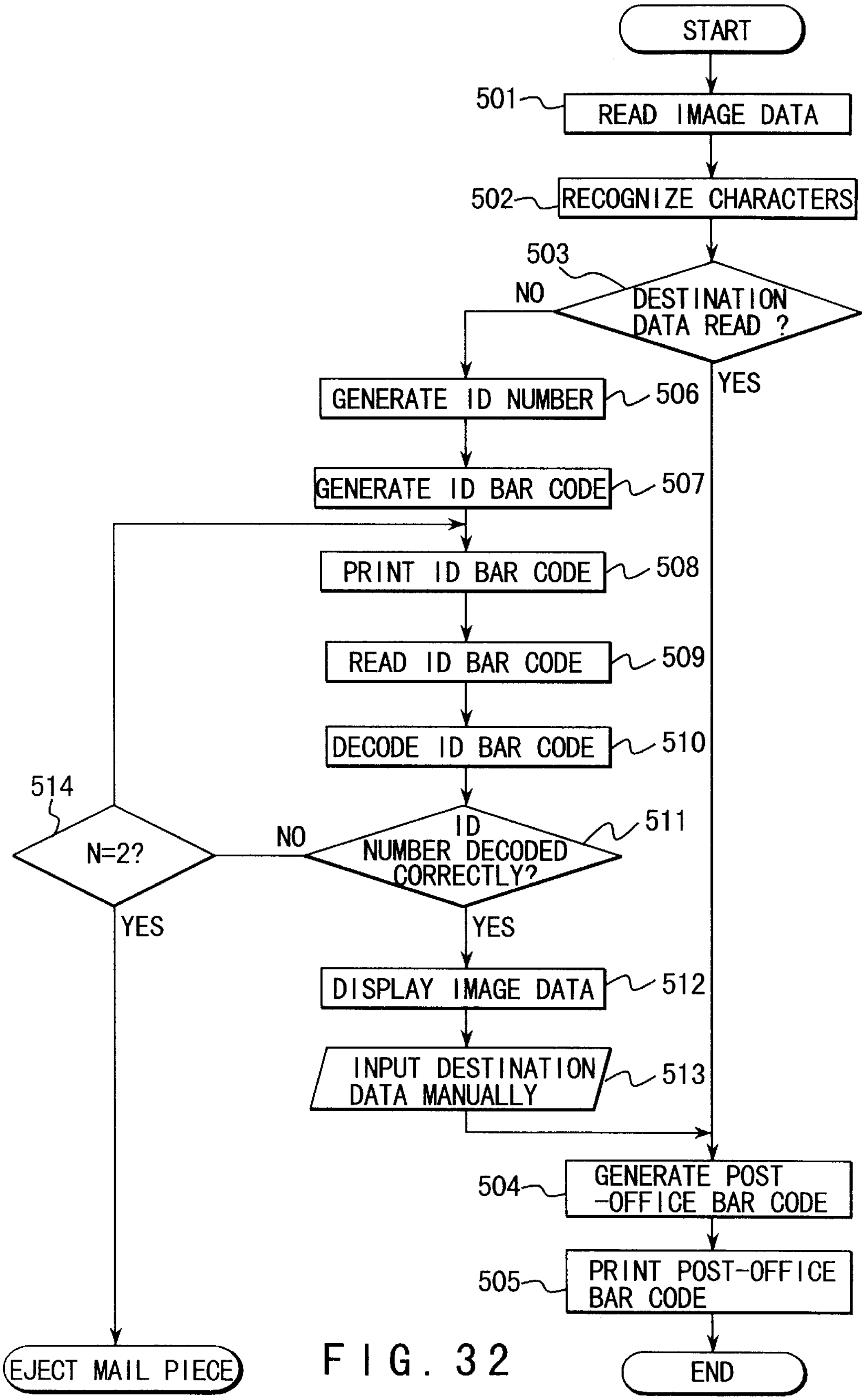
FIG. 32 is a flow chart explaining how bar codes are printed in the fifth embodiment.

How the bar-code printing section 406 prints bar codes on the mail piece 330 will be explained, with reference to the flow chart of FIG. 32.

First, in Step 501 the image-reading section 401 reads the data items written on the mail piece 330, in the form of image data. The image data is supplied to the character-recognizing section 402. In Step 502, the section 402 recognizes the characters constituting the destination data, generating character codes. Then, in Step 503 it is determined whether the section 401 has correctly read postal code and the address number, from the character codes generated by the character-recognizing section 402. If Yes, the process passes to Step 504, in which the bar-code encoding section 405 converts the character codes into a post-office bar code. Then in Step 505, the printer heads 321 and 322 of the bar-code printing section 406 print the post-office bar code (i.e., the postal-code bar code and the address-number bar code) in the postal-code region 333 and address-number region 334 of the mail piece 330.

The post-office bar code is printed also in the ID-number bar-code region (339*a*, 339*b*, and 340), when the character-recognizing section 402 correctly reads both the postal code and the address number written in the postal-code/address-number boxes 331. Hence, if the post-office bar code printed in the regions 333 and 334 overlaps the receiver's name or address (or printed advertisement), or is stained or erased, and can no longer be read at all or correctly, the bar-code reading section 421 can read the post-office bar code printed in the blank region 340. Thus, the bar-code decoding section 422 can decode the post-office bar code, generating character codes. This serves to reduce the number of mail pieces from which an operator needs to read the postal code and the address number to sort them into various destination bins.

If No in Step 503, that is, if the image-reading section 401 has failed to correctly read the destination data (i.e., the postal code and the address number), the process passes to Step 506. In Step 506, the ID-number generating section 403 generates an ID number assigned to the mail piece 330. The ID number is input to the bar-code encoding section 405. In Step 507, the section 405 generates ID bar code, which is supplied to the bar-code printing section 406. In Step 508, the section 406 prints the ID bar code in the ID-number bar-code region 339 of the mail piece 330. Then in Step 509, the ID-number bar-code reading section 407 reads the ID bar code and generates data representing the ID bar code. The ID bar code data is input to the bar-code decoding section 408. In Step 510, the section 508 decodes the data into the ID number.

Then in Step 511, the ID-number comparing section 411 determines whether the ID number has been correctly decoded or not. If Yes, the process passes to Step 512. In Step 512, the display section 410 displays the image the image-reading section 401 has read in Step 501. Then in Step 513, the operator operates the input section 404, while seeing the image of the mail piece 330. Character codes representing the postal code and the address number, i.e., the destination data, are thereby input from the section 404 to the bar-code encoding section 405. The process passes to Step 504, in which the encoding section 405 converts the character codes into a post-office bar code. In Step 505, the first printer head 321 of the bar-code printing section 406 prints the post-office bar code not only in the postal-code region 333 and address-number region 334, but also in the ID-number bar-code region 339 of the mail piece 330.

If No in Step 511, that is, if the ID number has not been correctly decoded, the process passes to Step 514. In Step 514, it is determined whether the ID number has been decoded twice. If No, the process returns to Step 508. In Step 508, the third printer head 324 prints the ID-number bar code in the blank region 340. In Step 509, the ID-number bar-code reading section 407 reads the ID-number bar code, in the form of image data. In Step 510, the section 508 decodes the image data into the ID number. In Step 511, the comparing section 411 determines whether the ID number has been correctly decoded or not. If No, it is determined in Step 514 that the ID number has been decoded twice. This time, the mail piece 330 is ejected from the mail-processing line.

If Yes in Step 511, Steps 512 and 513 are performed again. In Step 512, the display section 410 displays the image the image-reading section 401 has read in Step 501. Then in Step 513, the operator operates the input section 404. Character codes representing the postal code and the address number are thereby input from the section 404 to the bar-code encoding section 405. The process passes to Step 504, in which the encoding section 405 converts the character codes into a post-office bar code. In Step 505, the first printer head 321 of the bar-code printing section 406 prints the post-office bar code not only in the postal-code region 333 and address-number region 334. Furthermore, the post-office bar code is printed in the blank region 340, in Step 505.

As indicated above, the post-office bar code is printed in the blank region 340 if the ID-number bar code printed in the ID-number bar-code regions 339*a* and 339*b* is decoded correctly. Therefore, if the post-office bar code printed in the regions 333 and 334 overlaps the receiver's name or address (or printed advertisement), or is stained or erased, and can no longer be read at all or correctly, the bar-code reading section 421 can read the post-office bar code printed in the blank region 340. Thus, the bar-code decoding section 422 can decode the post-office bar code, generating character codes. This serves to reduce the number of mail pieces from which the operator needs to read the postal code and the address number to sort them into various destination bins.

Moreover, if the ID-number bar code printed in the ID-number bar-code regions 339*a* and 339*b* is not decoded correctly, it is printed in the blank region 340. The ID-number bar code can therefore be decoded correctly. This helps reduce the number of mail pieces the operator must scan to read the postal code and the address number.

How the data items are encoded so that they are printed in the form of bar codes in the postal-code region 333 and address-number region 334 (hereinafter called "post-office bar-code region" and the ID-number bar-code regions 339 and 340 will be explained, with reference to FIGS. 33 to 38.

Shown in FIGS. 33 to 38 are: the data parts Aix and Ai'x of the read-solomon code representing the postal code; the parity parts Apx and Ap'x thereof; the data parts Zix and Zi'x of a read-solomon code representing the address number; the parity parts Zpx and Zp'x thereof; the data parts Iix and Ii'x of the read-solomon code representing the ID number; and the parity parts Ipx and Ip'x thereof.

Figure 33:
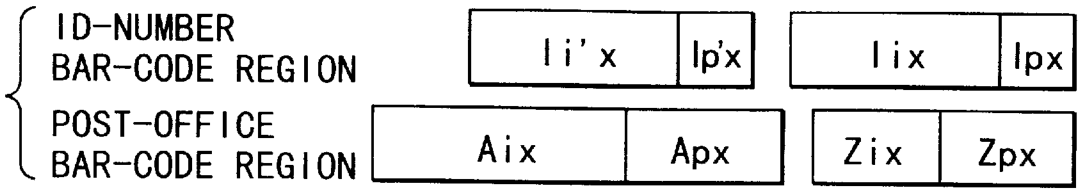
FIG. 33 is a diagram explaining a first method of encoding data items in the fifth embodiment.

FIG. 33 illustrates the method of encoding the data items in order to print the ID-number bar code in the blank region 340 included in the ID-number bar-code region. The parity part Ip'x of the ID-number bar code may be identical to the parity part Ipx of the ID-number bar code Ipx or to a parity part obtained by means of a different encoding (wherein the distance is changed). To effect the different encoding, it is necessary to use a Galois field, $GF(2^4)$. In the present embodiment, Ipx=Ip'x. Therefore, the postal code and the address number are decoded by the ordinary read-solomon decoding.

The method of decoding the ID-number bar code will be explained. As mentioned above, the data part Ii'x and parity part Ip'x of the ID-number bar code will be printed if they cannot be corrected when decoded by using Iix and Ip'x. The data part Iix and the parity part Ipx are not decoded in the method illustrated in FIG. 33.

The ID-number bar code is decoded in the following sequence of steps:

[Step 1] Iix is decoded by using Ip'x. Thus, Iix which can be corrected and which is an element of a set of symbols representing the ID number is changed to Iix1.

[Step 2] Ii'x is decoded by using Ipx. Ii'x which can be corrected and which is an element of set of symbols representing the ID number is thereby changed to Iix2.

[Step 3] Ii'x is decoded by using Ip'x. Ii'x which can be corrected and which is an element of a set of symbols representing the ID number is thereby changed to Iix3.

[Step 4] Of all three data parts Iix1, Iix2 and Iix3 are identical, the one which is identical to more other data parts of the ID-number bar code than any other is output. For instance, Iix1 is output if Iix1=Iix2≠Iix3.

[Step 5] If the three data parts Iix1 to Iix3 are not identical (Iix1≠Iix2≠Iix3), they are rendered not correctable. If only two data parts are obtained in in any one of Steps 1 to 4 and are not identical (for example, if Iix1 and Iix3 are obtained and Iix1≠Iix3), they are rendered not correctable.

In the present case, the data part Ii'x and the parity part Ip'x are printed if they cannot be corrected when decoded by using Iix and Ipx. Instead, they may not be decoded by using Iix and Ipx and be printed together with Iix and Ipx in Step 508 (FIG. 32). If this method is employed, the ID-number bar code is decoded in the following sequence of steps:

[Step 1] Iix is decoded by using Ipx. Thus, Iix which can be corrected and which is an element of an element of a set of symbols representing the ID number is changed to Iix1.

[Step 2] Iix is decoded by using I'px. Iix which can be corrected and which is an element of a set of symbols representing the ID number is thereby changed to Iix2.

[Step 3] Ii'x is decoded by using Ipx. Ii'x which can be corrected and which is an element of a set of symbols representing the ID number is thereby changed to Iix3.

[Step 4] Ii'x is decoded by using Ip'x. Ii'x which can be corrected and which is an element of a set of symbols representing the ID number is thereby changed to Iix4.

[Step 5] Of all four data parts Iix1 to Iix4 obtained, the one which is identical to more other data parts of the ID-number bar code than any other is output. For instance, Iix1 is output if Iix1=Iix2=Iix3≠Iix4.

[Step 6] All four data parts Iix1 to Iix4 obtained are rendered not correctable if any one of these data parts is identical to as many other ones as any other one (for example, Iix1=Iix2, Iix3=Iix4, and Iix1≠Iix3), or if all these data parts are not identical to one another (namely, Iix1≠Iix2≠Iix3≠Iix4).

[Step 7] If only two data parts are obtained in in any one of Steps 1 to 4 and are not identical (for example, if Iix1 and Iix3 are obtained and Iix1≠Iix3), they are rendered not correctable.

Figure 34:
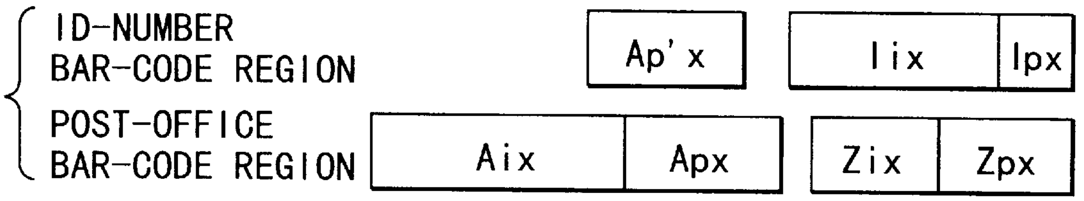
FIG. 34 is a diagram explaining a second method of encoding data items in the fifth embodiment.

FIG. 34 is a diagram explaining the method of encoding the data items in order to print the address-number parity bar code in the blank region 340 included in the ID-number bar-code region. The parity part Ap'x to be printed in the region 340 may be identical to the parity part Apx or to a parity part obtained by means of a different encoding (wherein the distance is changed). To effect the different encoding, it is necessary to use a Galois field, $GF(2^4)$. In the present embodiment, Apx=Ap'x. Therefore, the postal code and the address number are decoded by the ordinary read-solomon decoding.

The address-number bar code is decoded in the following sequence of steps:

[Step 1] Aix is decoded by using Apx. Thus, Aix which can be corrected and which is an element of a set of symbols representing the address number is changed to Ax1.

[Step 2] Aix is decoded by using A'px. Aix which can be corrected and which is an element of a set of symbols representing the address umber is thereby changed to Aix2.

[Step 3] If Aix1=Aix2, the data part Aix1, for example, is output.

[Step 4] If Aix1≠Aix2, both data parts are rendered not correctable.

Figure 35:
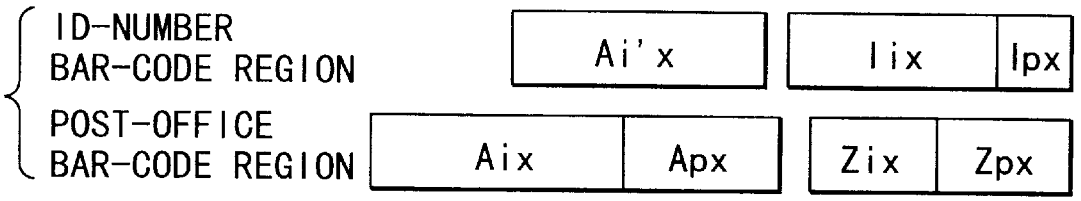
FIG. 35 is a diagram explaining a third method of encoding data items in the fifth embodiment.

FIG. 35 is a diagram explaining the method of encoding the data items in order to print the address-number bar code in the blank region 340 included in the ID-number bar-code region. In this case, too, Aix=Ai'x. Therefore, the postal code and the address number are decoded by means of the ordinary read-solomon decoding.

The address-number bar code is decoded in the following sequence of steps:

[Step 1] Aix is decoded by using Apx. Thus, Aix which can be corrected and which is an element of a set of symbols representing the address number is changed to Ax1.

[Step 2] Ai'x is decoded by using A'px. Ai'x which can be corrected and which is an element of a set of symbols representing the address umber is thereby changed to Aix2.

[Step 3] If Aix1=Aix2, the data part Aix1, for example, is output.

[Step 4] If Aix1≠Aix2, both data parts are rendered not correctable.

Figure 36:
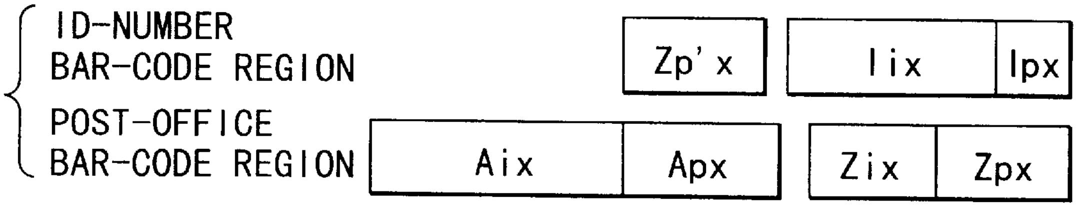
FIG. 36 is a diagram explaining a fourth method of encoding data items in the fifth embodiment.

FIG. 36 is a diagram explaining the method of encoding the data items in order to print the address-number parity bar code in the blank region 340 included in the ID-number bar-code region. The parity part Zp'x to be printed in the region 340 may be identical to the parity part Zpx or to a parity part obtained by means of a different encoding (wherein the distance is changed). To effect the different encoding, it is necessary to use a Galois field, $GF(2^4)$. In the present embodiment, Zpx=Zp'x.

The postal-code bar code is decoded in the following sequence of steps:

[Step 1] Zix is decoded by using Zpx. Thus, Zix which can be corrected and which is an element of a set of symbols representing the postal code is changed to Zx1.

[Step 2] Zix is decoded by using Z'px. Zix which can be corrected and which is an element of a set of symbols representing the postal code is thereby changed to Zix2.

[Step 3] If Zix1=Zix2, the data part Zix1, for example, is output.

[Step 4] If Zix1≠Zix2, both data parts are rendered not correctable.

Figure 37:
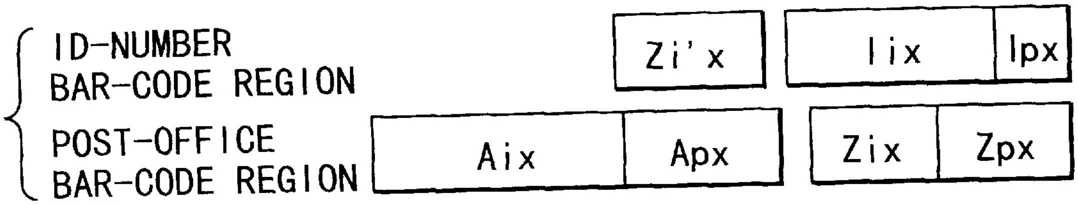
FIG. 37 is a diagram explaining a fifth method of encoding data items in the fifth embodiment.

FIG. 37 is a diagram explaining the method of encoding the data items in order to print the address-number bar code in the blank region 340 included in the ID-number bar-code region. In this case, Zix=Zi'x. Hence, the postal code and the address number are decoded by means of the ordinary read-solomon decoding.

The postal-code bar code is decoded in the following sequence of steps:

[Step 1] Zix is decoded by using Zpx. Thus, Zix which can be corrected and which is an element of a set of symbols representing the postal code is changed to Zx1.

[Step 2] Zi'x is decoded by using Zpx. Zi'x which can be corrected and which is an element of a set of symbols representing the postal code is thereby changed to Zix2.

[Step 3] If Zix1=Zix2, the data part Zix1, for example, is output.

[Step 4] If Zix1≠Zix2, both data parts are rendered not correctable.

Figure 38:
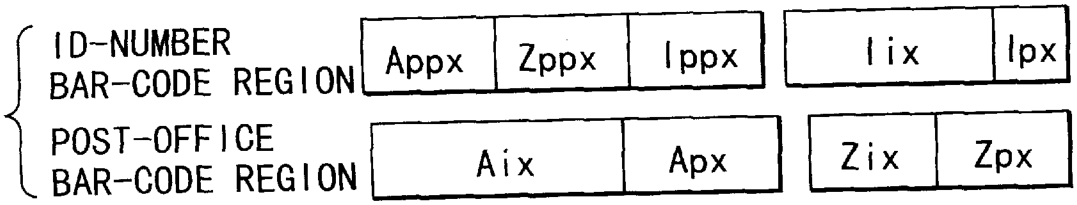
FIG. 38 is a diagram explaining a sixth method of encoding data items in the fifth embodiment.

FIG. 38 is a diagram explaining the method of encoding the data items. Shown in FIG. 38, along with Aix, Apx, Zix, Zps, Iix and Ipx, are: a parity-symbol bar code Appx obtained subjecting Apx to read-solomon encoding; a parity-symbol bar code Zppx obtained by subjecting Zpx to read-solomon encoding; a parity-symbol bar code Ippx obtained by subjecting Ipx to read-solomon encoding. In the present instance, Apx is encoded by read-solomon encoding (13, 11, 3), in which a code length of 15 and a minimum-hamming distance of 8 are applied. Thus, the bar code Appx represents seven symbols. Zpx is encoded by read-solomon encoding (15, 6, 10), in which a code length of 15 and a minimum-hamming distance of 10 are applied. Hence, the bar code Appx represents nine symbols. Ipx is encoded by read-solomon encoding (13, 8, 8), in which a code length of 15 and a minimum-hamming distance of 8 are applied. The bar code Appx therefore represents seven symbols.

The postal code is decoded in the following sequence of steps:

[Step 1] Zpx is decoded by using Zppx. Even if Zpx thus decoded cannot be corrected, Step 2 is carried out.

[Step 2] Zix is decoded by using Zpx. Zix thus decoded is output if it can be corrected and if it is an element of a set of symbols representing the postal code. If Zix cannot be corrected or is not an element of a set of such symbols, Zix is regarded as not correctable.

The ID-number is decoded in the following sequence of steps:

[Step 1] Iix is decoded by using Ippx. Even if Iix thus decoded cannot be corrected, Step 2 is carried out.

[Step 2] Iix is decoded by using Ipx. Iix thus decoded is output if it can be corrected and if it is an element of a set of symbols representing the postal code. If Iix cannot be corrected or is not an element of a set of such symbols, Iix is regarded as not correctable.

It is the bar-code recognizing section 423 of the bar-code reading system (FIG. 15) that determines which type is the bar code printed in the blank region 340, the type shown in FIG. 34, 35, 36, 37 or 38. In other words, the section 423 identifies the information which the bar code represents. Why it is possible for the section 432 to identify the information will be explained.

The data part Ii'x and parity part Ip'x, both shown in FIG. 33, consist of 15 symbols altogether, and the bar code composed of the data part Ii'x and parity part Ip'x is formed of 32 bars including start and stop bars. The parity part Ap'x shown in FIG. 34 consists of eight symbols and the bar code composed of Ap'x is represented by 18 bars including start and stop bars. The data part Ai'x shown in FIG. 35 consists of 13 symbols and the bar code composed of Ai'x is represented by 28 bars including start and stop bars. The parity part Zp'x shown in FIG. 36 consists of six symbols and the bar code composed of Zp'x is represented by 14 bars including the start and stop bars. The data part Zi'x shown in FIG. 37 consists of seven symbols and the bar code composed of Zi'x is represented by 16 bars including start and stop bars. The bar codes Appx, Zppx and Ippx shown in FIG. 38 consist of seven symbols, nine symbols and seven symbols, respectively, and the bar code composed of Appx, Zppx and Ippx is represented by 48 bars including start and stop bars.

These data part, parity part and bar codes, each printed in the blank region 340, differ in terms of the number of bars constituting each. Hence, the bar-code recognizing section 423 can identify the information which any one of these bar codes represents.

In the present embodiment, the symbols shown in, for example, FIG. 34 or FIG. 36 are identical in numbers to the parity symbols constituting the post-office bar code. Namely, they represent the same parity as is obtained by the same encoding. The data part Ii'x and the parity part Ip'x, both shown in FIG. 33, are identical to Iix and Ipx, respectively.

Figure 39A:
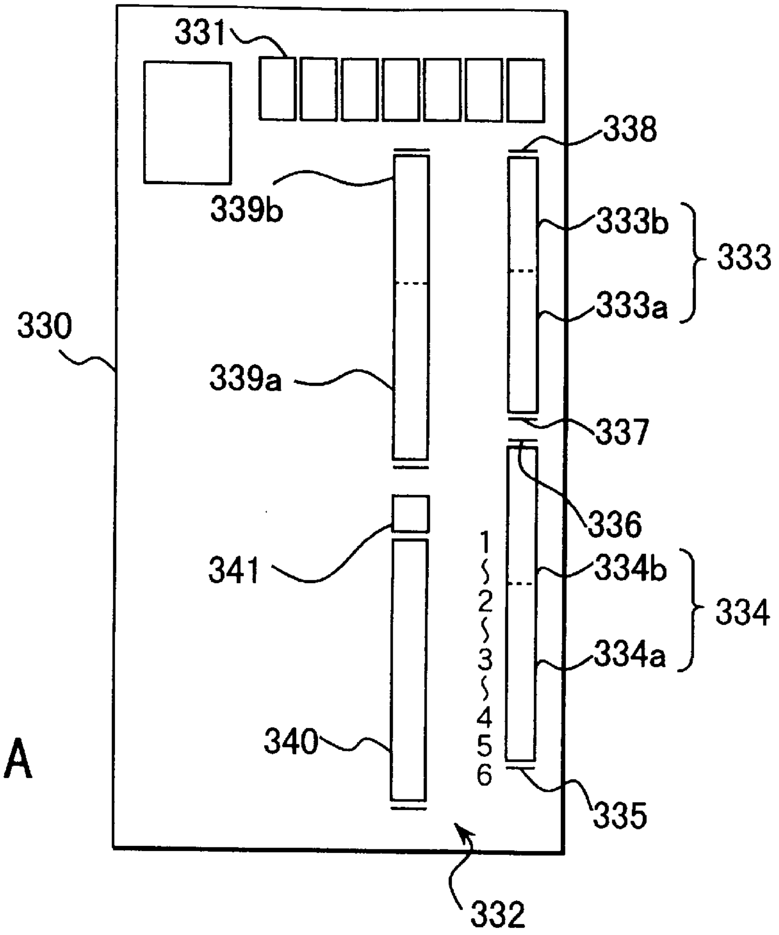
FIGS. 39A and 39B show two types of letter envelopes, on which an ID bar code is printed along with other bar codes in the bar-code encoding/decoding system according to the fifth embodiment.
Figure 39B:
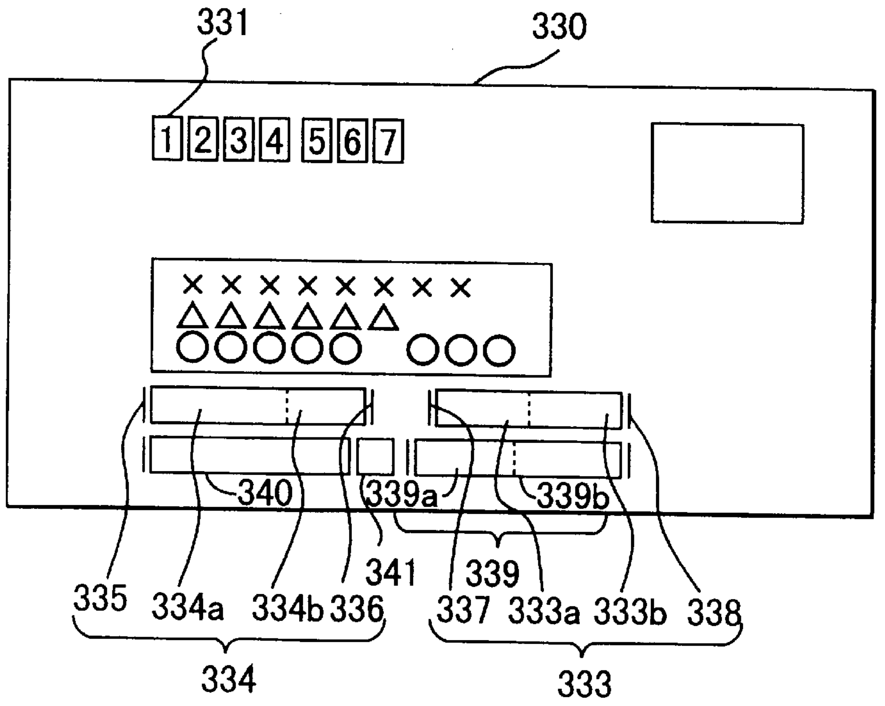

When the data parts and the parity parts shown in FIGS. 33, 34 and 36 are encoded by different methods, however, Ap'x and Zp'x, for example, may consist of different numbers of symbols. If this happens, it is impossible for the bar-code recognizing section 423 to identify the information represented by any of these bars, on the basis of the number of bars constituting the bar code. To identify the information reliably, an ID bar code 341 may be printed on the mail piece 330 as shown in FIGS. 39A and 39B, which indicates the type of the bar code printed in the blank region 340. Thus, seeing the ID bar code 341, the operator can identify the bar code printed in the blank region 340.

FIGS. 39A and 39B show a letter envelope 330 of the Japanese style and a letter envelope 330 of Euro-American style, respectively, which are to be processed by a bar-code encoding/decoding system according to the fifth embodiment of the present invention.

The ID bar code 341 is the one shown in FIG. 18A and representing "4" when the bar codes shown in FIG. 33 are printed on the envelope 330. It is the one shown in FIG. 18A and representing "0" when the bar codes shown in FIG. 34 are printed on the envelope 330. It is the one shown in FIG. 18A and representing "1" when the bar codes shown in FIG. 35 are printed on the envelope 330. It is the one shown in FIG. 18A and representing "2" when the bar codes shown in FIG. 36 are printed on the envelope 330. It is the one shown in FIG. 18A and representing "3" when the bar codes shown in FIG. 37 are printed on the envelope 330. It is the one shown in FIG. 18A and representing "5" when the bar codes shown in FIG. 38 are printed on the envelope 330.

To add the ID bar code 341 when the bar codes shown in FIG. 33 are printed on the envelope 330, Ii'x and Ip'x are subjected to read-solomon encoding (14, 11, 3), in which a code length of 14 and a minimum-hamming distance of 4 are applied. When the bar codes shown in FIG. 34 are printed on the envelope 330, encoding needs to be performed to reduce the number of symbols constituting Appx, Zppx or Ippx by one. The bar-code recognizing section 423 can identify the information represented by any bar code, in the same way as described above.

As detailed above, if the destination data (i.e., the postal code and the address number) is optically read from the mail piece, a post-office bar code representing the destination data is printed in the second region in which the ID-number bar code is not printed. Hence, if the post-office bar code printed in the first region overlaps the receiver's name or address (or printed advertisement), or is stained or erased, and can no longer be decoded, the post-office bar code printed in the second region can be read and decoded into character codes. This helps to reduce the number of mail pieces from which the operator needs to read the destination data to sort them into various destination bins.

Further, if the ID-number bar code printed in the second region is decoded correctly, the post-office bar code is printed in the blank region included in the second region. In this case, too, the post-office bar code printed in the blank region can be read and decoded into character codes even if the post-office bar code printed in the first region overlaps the receiver's name or address (or printed advertisement), or is stained or erased, and can no longer be decoded. As a result, it is possible to decrease the number of mail pieces from which the operator needs to read the destination data to sort them into various destination bins.

Still further, if the ID-number bar code printed in the second region is decoded but not correctly, the ID-number bar code is printed again in the blank region included in the second region. In this case, too, the post-office bar code printed in the blank region can be read and decoded correctly. It is therefore possible to decrease the number of mail pieces from which the operator needs to read the destination data to sort them into various destination bins.

A bar-code encoding/decoding system according to the sixth embodiment of the invention, intended to achieve the above-mentioned third object of this invention, will be described.

Figure 40A:
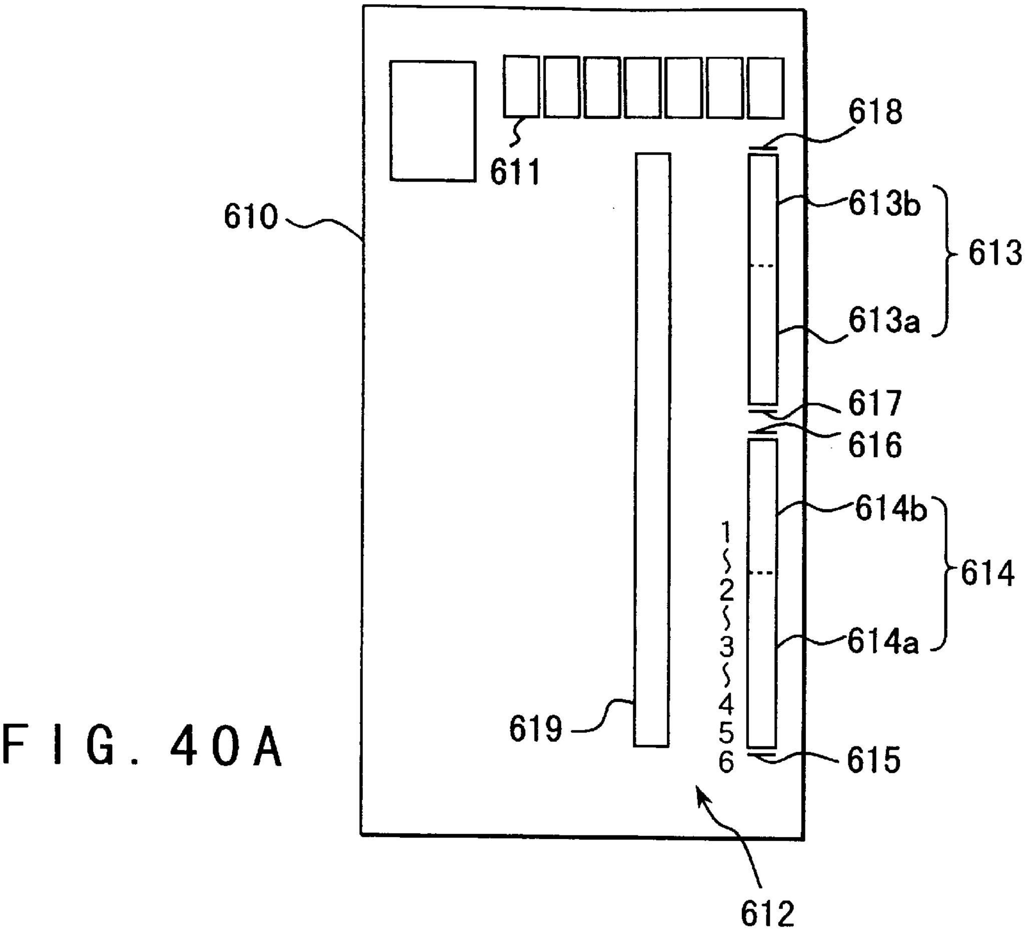
FIGS. 40A and 40B show two types of letter envelopes, on which an ID bar code is printed along with other bar codes in the bar-code encoding/decoding system according to a sixth embodiment of the invention.
Figure 40B:
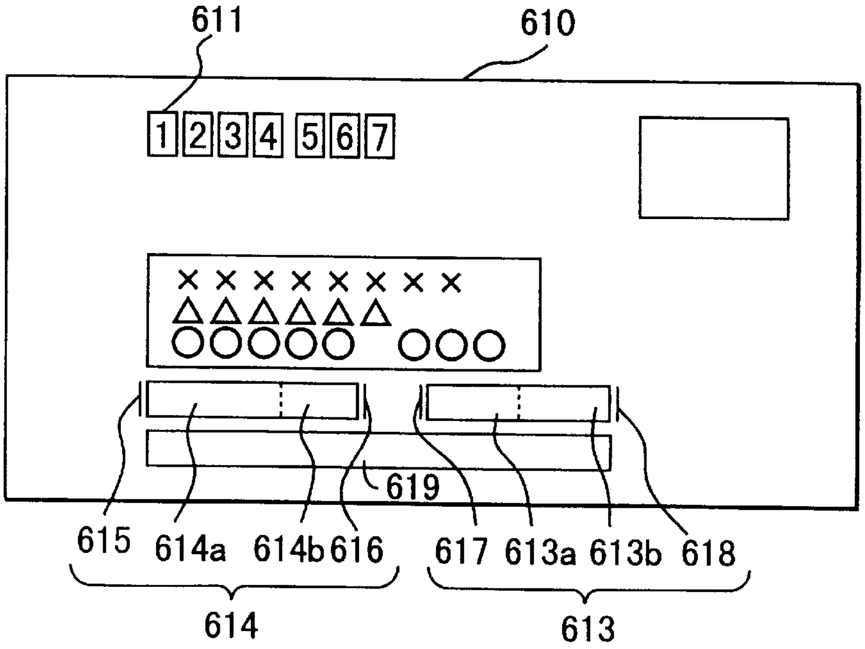

FIGS. 40A and 40B show a letter envelope 610 of the Japanese style and a letter envelope 610 of Euro-American style, respectively, which are to be processed by a bar-code encoding/decoding system according to the sixth embodiment of the present invention.

As shown in FIG. 40A, a sender writes the postal code and address number in seven postal-code/address-number boxes 611 printed at the top of the envelope 610. The postal code and the address number consists of seven digits. The seven digits designate the address of the receiver, in greater detail than the postal code used at present; more precisely, they designate the prefecture, the city, the ward and the street.

The envelope 610 has an address region 612 at its center, in which the receiver's name and address are written. Provided on the right of the address region 612 are a postal-code region 613 and an address-number region 614 which are vertically aligned. The postal-code region 613 consists of a postal-code bar-code region 613*a* and an postal-code bar-code parity region 613*b* which are aligned vertically. The address-number region 614 consists of an address-number bar-code region 614*a* and an address-number bar-code parity region 614*b* which are vertically aligned. In the regions 613*a* and 613*b* there will be printed a bar code which represents the postal code. In the regions 614*a* and 614*b* there will be printed a bar code which represents the address number. The address number includes the lot numbers (e.g., "chome," "ban," and "gou," all being Japanese).

A start bar 615 and a stop bar 616 are printed at the head and end of the postal-code region 613, respectively. Similarly, a start bar 617 and 618 are printed at the head and end of the address-number region 614.

The envelope 610 also has an ID-number bar-code region 619, located inside the postal-code region 613 and the address-number region 334.

Figure 41A:
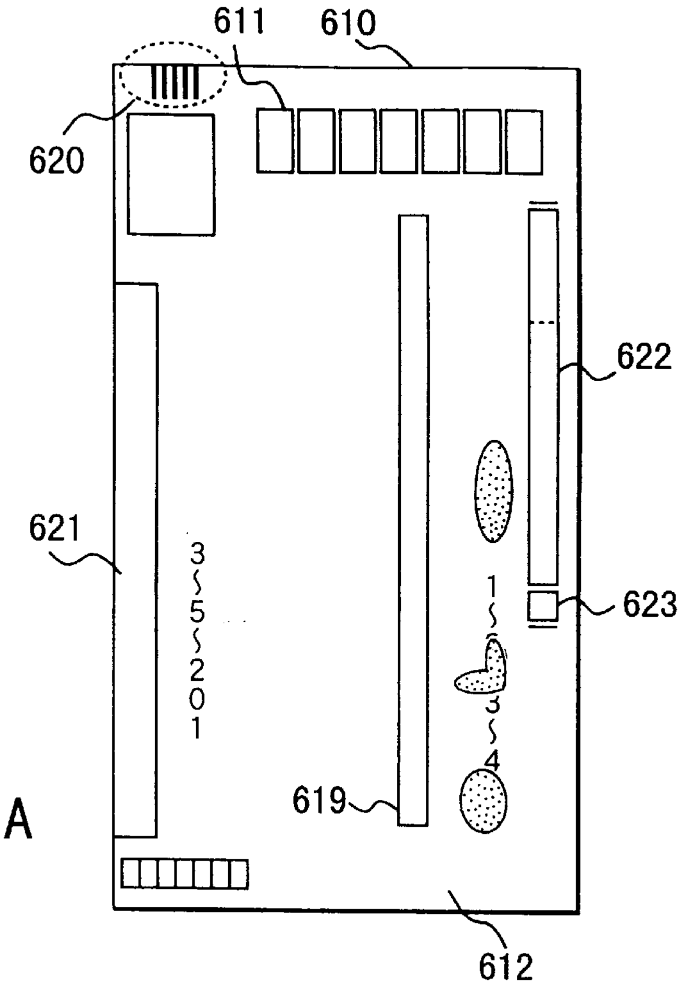
FIGS. 41A and 41B show other two types of letter envelopes on which an ID bar code is printed along with other bar codes in the bar-code encoding/decoding system according to the sixth embodiment.
Figure 41B:
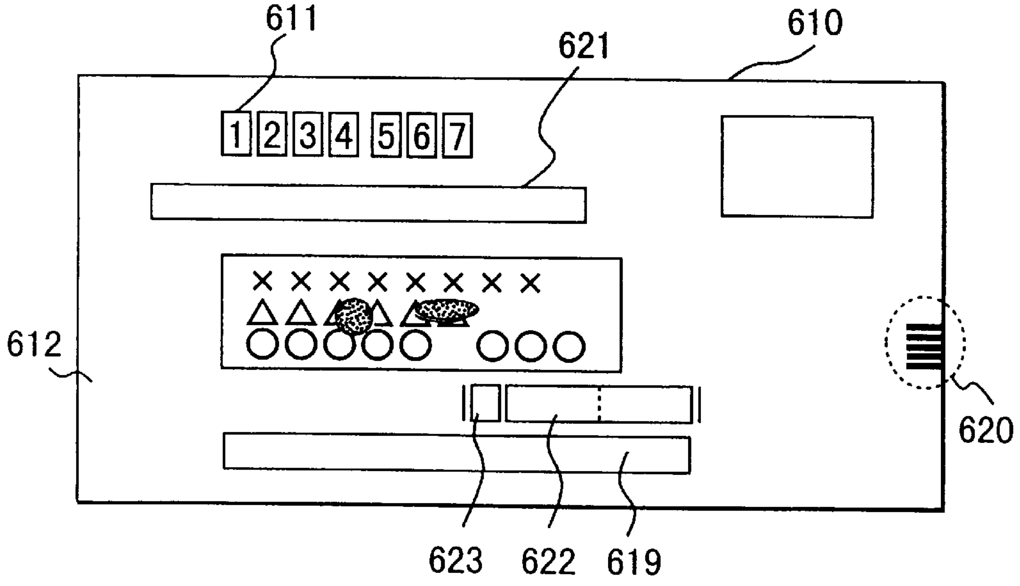

FIGS. 41A and 41B show a letter envelope 610 of the Japanese style and a letter envelope 610 of Euro-American style, respectively, which are to be processed by a bar-code encoding/decoding system according to the sixth embodiment of the invention. These envelopes 610 are identical to those shown in FIGS. 40A and 40B, except that a sender's bar codes are printed. More precisely, when the operator cannot input any data in the VCS to print a post-office bar code on the envelope 610, the sender's postal-code bar code is printed in the post-office bar-code region (i.e., the first region), and a sender's address-number bar code 622 is printed in a region (i.e., the third region) opposite to the post-office bar-code region. Further, an address-unknown mark 620 can be printed in the upper-left corner of the envelope 610. In addition, a sender's postal-zone code 623 is printed below the sender's address-number bar code 622. The address-unknown mark 620 indicates that the destination of the mail piece 610 is unknown and also that the senders' postal-code bar code 621 is printed in the post-office bar-code region.

Figure 42:
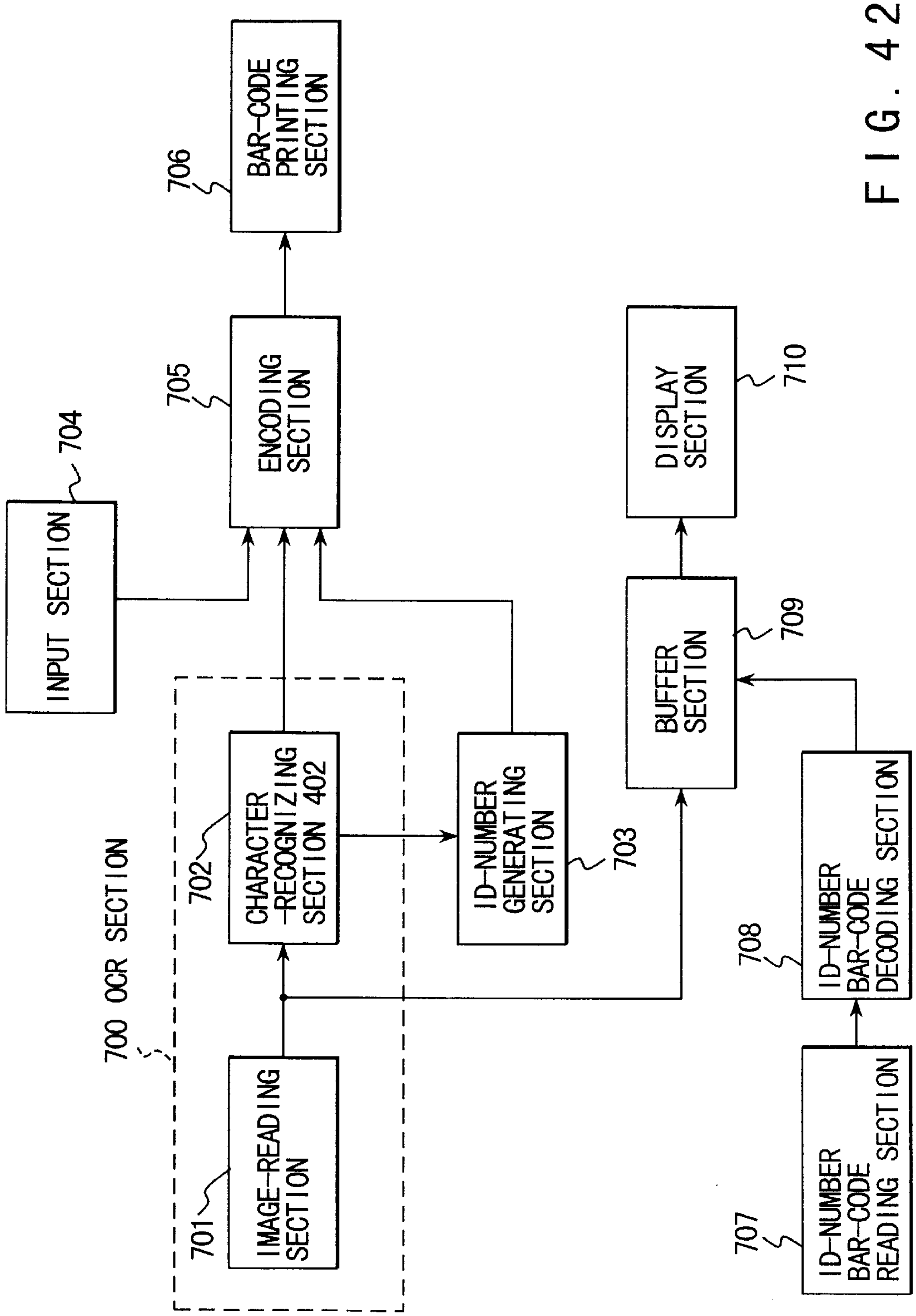
FIG. 42 is a block diagram of the bar-code printing system incorporated in the sixth embodiment.

FIG. 42 is a block diagram of the bar-code printing system incorporated in the sixth embodiment, to be installed in a central post office. As shown in FIG. 42, the printing system comprises an OCR section 700 (i.e., an optical character-reading section), an ID-number generating section 703, an input section 704, a bar-code encoding section 705, a bar-code printing section 706, an ID-number bar-code reading section 707, an ID-number bar-code decoding section 708, a buffer section 709, and a display section 710.

The OCR section 700 comprises an image-reading section 701 and a character-recognizing section 702. The section 701 has a scanner. The scanner reads the postal code and the address number written in the postal-code/address-number boxes 611 which is provided on the mail piece 610. The scanner reads the receiver's name and address written in the address region 612 of the mail piece 610, too. The image-reading section 701 generates image data representing the postal code, the address number and the receiver's name and address. The image data is supplied to the character-recognizing section 702. The section 702 perform the known character recognition process on the image data and generates character data (i.e., character codes).

The ID-number generating section 703 generates an ID number which represents the date when the scanner scans the mail piece. It also generates the serial number of the bar-code printing section 706 and the lot number for the mail piece. The input section 704 is operated by an operator. More specifically, the operator operates the section 704 to input the ID number. Alternatively, the operator operates the section 704 to input the postal code and the address number which he or she sees on the screen of the display section 710.

The character codes generated by the OCR section 700 and the ID number generated by the ID-number generating section 703 or input by operating the input section 704 are input to the bar-code encoding section 705. The section 705 corrects the character codes and the ID number and converts them into postal-code bar-code data, address-number bar-code data and ID-number bar-code data. The bar-code data items are input to the bar-code printing section 706. The printing section 706 processes the input data items and prints a postal-code bar code, an address-number bar code and an ID-number bar code in the postal-code region 613, address-number region 614 and ID-number bar-code region 619 of the mail piece, respectively, in, for example, fluorescent ink or transparent ink.

The ID-number bar-code reading section 707 is designed to read the ID-number bar code printed in the ID-number bar-code region 619 of the mail piece. Like the image-reading section 701, it has a scanner for reading the ID-number bar code. The section 707 generates ID-number bar code data, which is input to the ID-number bar-code decoding section 708. The section 708 decodes the ID-number bar code, generating ID number data. The ID number data is supplied to the buffer section 709. The buffer section 709 temporarily stores the image data read by the image-reading section 701. When the ID number data supplied from the bar-code decoding section 708, the image data is transferred to the display section 710. The receiver's name and address written in the address region 612 are thereby displayed on the screen of the display section 710.

Figure 43:
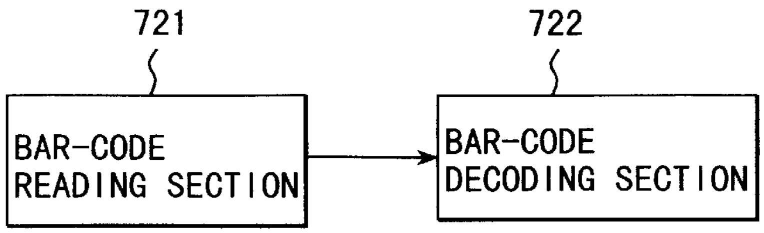
FIG. 43 is a block diagram of the bar-code reading system incorporated in the sixth embodiment.

FIG. 43 is a block diagram of the bar-code reading system incorporated in the sixth embodiment. As seen from FIG. 43, the bar-code reading system comprises a bar-code reading section 721 and a bar-code decoding section 722. The bar-code reading section 721 has a scanner, which reads the bar codes printed on the mail piece 610 by the bar-code printing system of FIG. 42. The section 721 generates data representing the bar codes. The bar-code data is input to the bar-code decoding section 722. The section 722 decodes the bar-code data, generating character codes.

Figure 44:
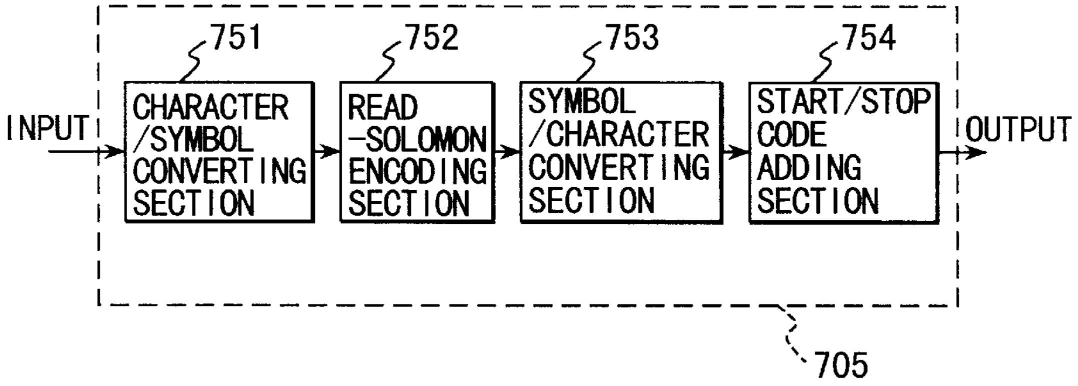
FIG. 44 is a block diagram of the bar-code encoding section provided in the bar-code printing system shown in FIG. 42.

FIG. 44 is a block diagram showing the bar-code encoding section 705 provided in the bar-code printing system of FIG. 42. As shown in FIG. 44, the section 705 comprises a character/symbol converting section 751, a read-solomon encoding section 752, a symbol/character converting section 753, and a start/stop code adding section 754.

The character/symbol converting section 751 converts each character code supplied from the OCR section 700 (FIG. 42) into a combination of data symbols, on the basis of prescribed rules. The data symbols generated by the section 751 are input to the read-solomon encoding section 752. The section 752 performs read-solomon encoding on the data symbols and generates a string of data symbols, each added with a parity symbol.

The data symbols, thus read-solomon encoded, are supplied to the symbol/character converting section 753. The section 753 converts the data symbols into a bar-code pattern which represents a bar code. The bar-code pattern is input to the start/stop code adding section 754. The section 754 adds a start bar pattern and a stop bar pattern to the bar-code pattern. The start-bar pattern represents a bar to be printed at the head of the bar code, and the stop-bar pattern a bar to be printed at the end of the bar code. The bar code pattern and the start- and stop-bar patterns are supplied to the bar-code printing section 706.

Figure 45:
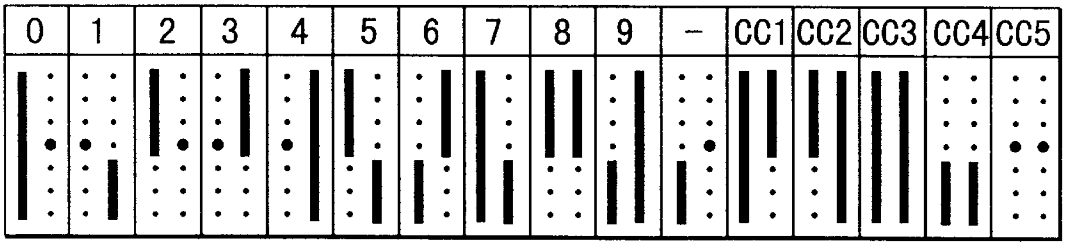
FIG. 45 is are diagrams illustrating how bars are allocated in different types of bar codes printed in the sixth embodiment.

The sixth embodiment prints bar codes of the type shown in FIG. 45, each consisting of four bars and representing 16 states. Namely, the absence of one bar indicates one state, and the presence thereof another state, whereby four bars indicate 16 states ($=2^4$).

The read-solomon encoding section 752 (FIG. 44) of the bar-code printing section 706 uses a Galois field, $GF(2^4)$, to carry out read-solomon encoding. Each of the data symbols the section 752 generates is represented by four bits in the case the bar code shown in FIG. 45 is used. In other words, two bars represent one data symbol. There are 16 different 4-bit patterns, "0000" to "1111." The bars of the bar code are allocated to 15 of these 16 4-bit patterns.

To generate the bar code shown in FIG. 45, the postal code is subjected to read-solomon encoding (13, 7, 7) by applying a code length of 13 and a minimum-hamming distance of 7, and the address number to read-solomon encoding (21, 13, 9) by applying a code length of 21 and a minimum-hamming distance of 9.

As in the fourth and fifth embodiments, both the postal code and the address number are converted into a post-office bar code, and the ID number is converted into an ID-number bar code. The bar code shown in FIG. 45 is a 4S2B code. The bar code printed in the sixth embodiment consists of at most 80 bars. The ID-number bar code is a string of data symbols which are numerals only, each ranging from "0" to "9."

Figure 46:
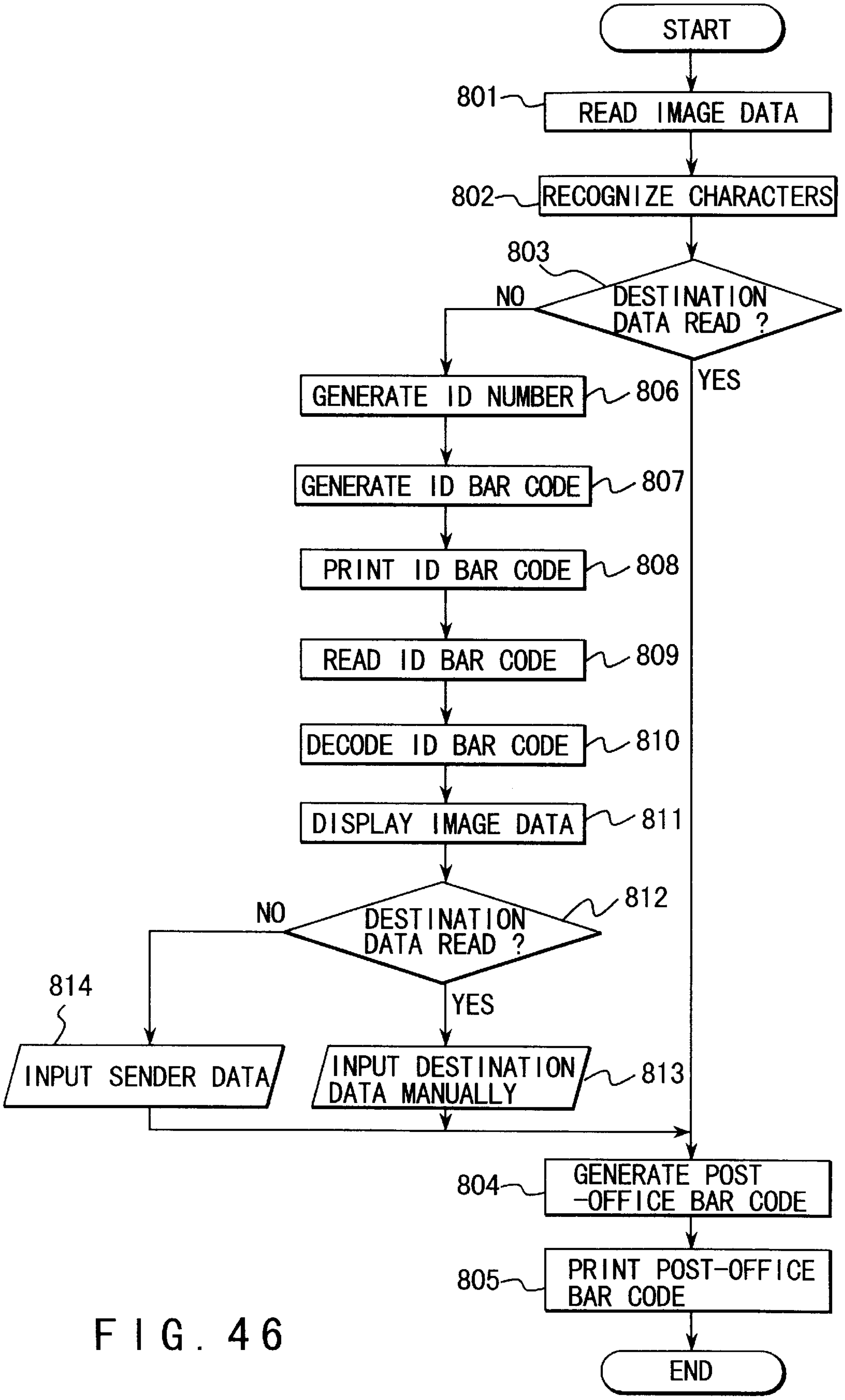
FIG. 46 is a flow chart explaining how bar codes are printed in the sixth embodiment.

How the bar-code printing section 706 (FIG. 42) prints bar codes on the mail piece 710 will be explained, with reference to the flow chart of FIG. 46.

First, in Step 801 the image-reading section 801 reads the data items written on the mail piece 610, in the form of image data. The image data is supplied to the character-recognizing section 702. In Step 802, the section 702 recognizes the characters constituting the destination data, generating character codes. Then, in Step 803 it is determined whether the section 701 has correctly read postal code and the address number, from the character codes generated by the character-recognizing section 702. If Yes, the process passes to Step 804, in which the bar-code encoding section 705 converts the character codes into a post-office bar code. Then in Step 805, the bar-code printing section 706 prints the post-office bar code (i.e., the postal-code bar code and the address-number bar code) in the postal-code region 613 and address-number region 614 of the mail piece 610.

If No in Step 803, that is, if the image-reading section 701 has failed to correctly read the destination data (i.e., the postal code and the address number), the process passes to Step 806. In Step 806, the ID-number generating section 703 generates an ID number assigned to the mail piece 610. The ID number is input to the bar-code encoding section 705. In Step 807, the section 705 generates ID bar code, which is supplied to the bar-code printing section 706. In Step 808, the section 706 prints the ID bar code in the ID-number bar-code region 619 of the mail piece 610. Then in Step 809, the ID-number bar-code reading section 707 reads the ID bar code and generates data representing the ID bar code. The ID bar code data is input to the bar-code decoding section 708. In Step 810, the section 708 decodes the data into the ID number.

Then in Step 811, the display section 710 displays the image the image-reading section 701 has read in Step 801. Then in Step 812, it is determined whether or not the operator can read the destination data (i.e., the postal code and the address number), by operating the input section 704 while seeing the image of the mail piece 610. If Yes, the process passes to Step 813. In Step 813, character codes representing the postal code and the address number, i.e., the destination data, are thereby input from the section 704 to the bar-code encoding section 705. Then in Step 804, the encoding section 705 converts the character codes into a post-office bar code. In Step 805, the bar-code printing section 706 prints the post-office bar code not only in the postal-code region 613 and address-number region 614, but also in the ID-number bar-code region 619 of the mail piece 610.

If No in Step 812, that is, if the operator cannot read the destination data, the process passes to Step 814. In Step 814, the mail piece 610 is regarded as an address-unknown one. The sender data, i.e., the sender's postal code and the sender's address number, are input and encoded into a bar code. To be more specific, the sender's postal code and address number read by the image-reading section 701 and stored in a memory are read and supplied to the encoding section 705. In Step S804, the section 705 converts the sender's postal code and address number into a sender's postal-code bar code 621 and a sender's address-number bar code 622. In Step 805, the bar-code printing section 706 prints these bar codes 621 and 622 on the mail piece 610 as is illustrated in FIG. 41.

Figure 47:
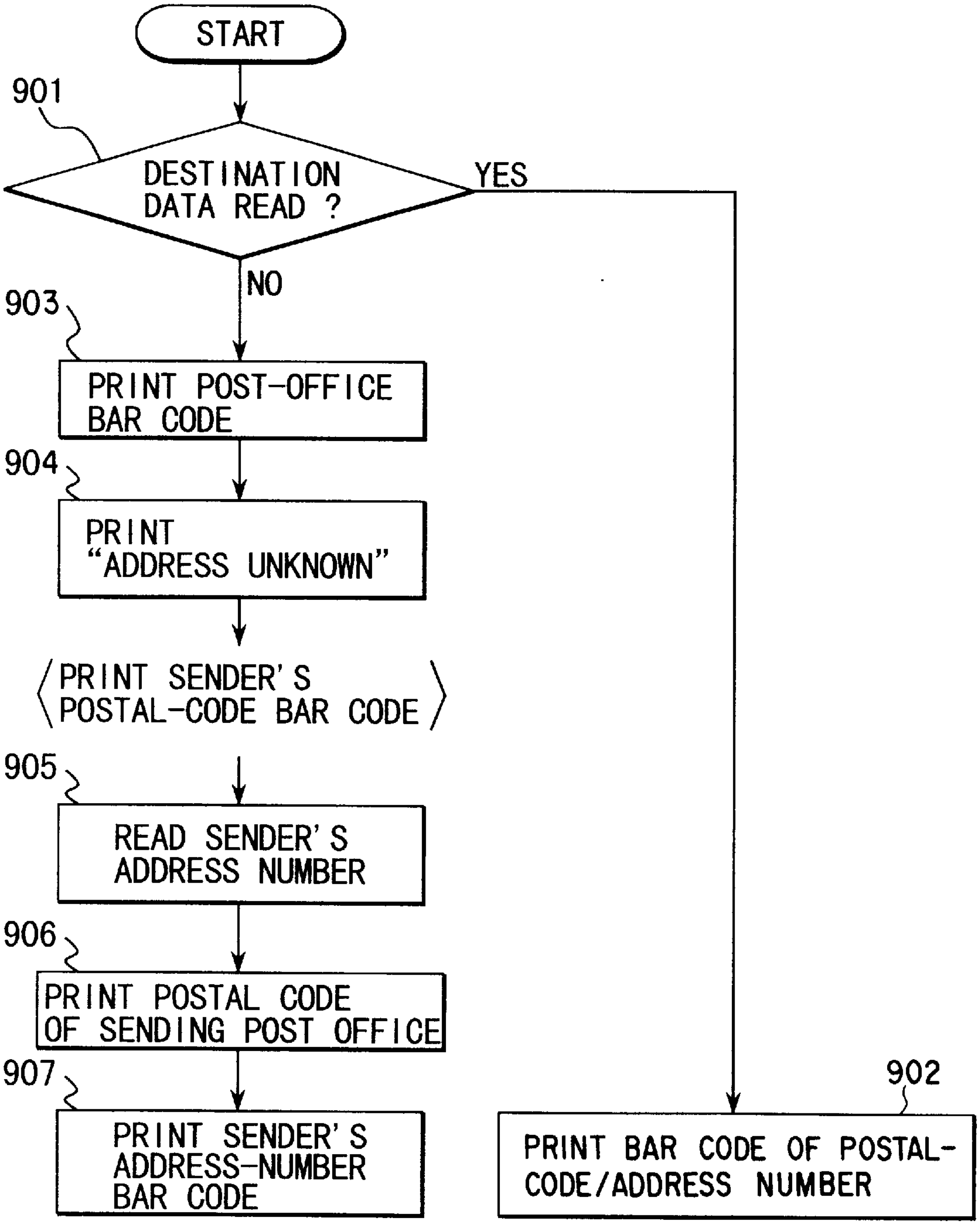
FIG. 47 is a flow chart explaining how an address-unknown mail piece is processed in the sixth embodiment so as to be returned to the sender.

FIG. 47 is a flow chart explaining how a mail piece which is found to be an address-unknown one in Step 812 (FIG. 46) is processed in the sixth embodiment so that the mail piece may be returned to the sender.

In Step 901 it is determined whether or not the operator has read the destination data on the mail piece 610. If Yes, the process passes to Step 902, in which the post-office bar code (i.e., the postal-code bar code and the address-number bar code) is printed on the mail piece 610. The mail piece 610 is then supplied to a mail-sorting apparatus.

If No in Step 901, that is, if the operator has failed to read the destination data, the process passes to Step 903. In Step 903, an address-unknown mark 620 is printed in the stamp region of the mail piece 610 as shown in, for example, FIG. 14A. Then in Step 904, the sender's postal code and address number, both read by the OCR, are read from the memory, and the postal code is converted into a sender's postal-code bar code 621, which is printed on the mail piece 610 as illustrated in FIG. 41A.

In the mail-sorting apparatus, the address-unknown mark 620 is detected, and the sender's postal-code bar code 621 is read from the mail piece 610, not the post-office bar code which represents the receiver's postal code and address number. The mail piece 610 is sorted and returned to the sender's nearest post office.

In Step 905, the address-unknown mark 630 on the mail piece 610 is detected in the sender's nearest post office, and the sender's address number is read by means of an OCR. In Step 906, the sender's address number is converted to the sender's postal-zone code 623 of the type CC4 shown in FIG. 45, and the postal-zone code 623 is printed on the mail piece 610. Next, in Step 907, the sender's address number is converted to a sender's address-number bar code 622, which is printed on the mail piece 610. In the mail-sorting apparatus, sender's address-number bar code 622 is read, and the mail piece 610 is automatically sorted on the basis of the bar code 622 read.

In the embodiments described above, the sender's postal-code bar code and address-number bar code are printed in different regions on the mail piece when the mail piece is regarded as an address-unknown one. Nonetheless, both bar codes may be printed in the same region, for example the post-office bar-code region, as will be explained with reference to FIGS. 48A and 48B.

Figure 48A:
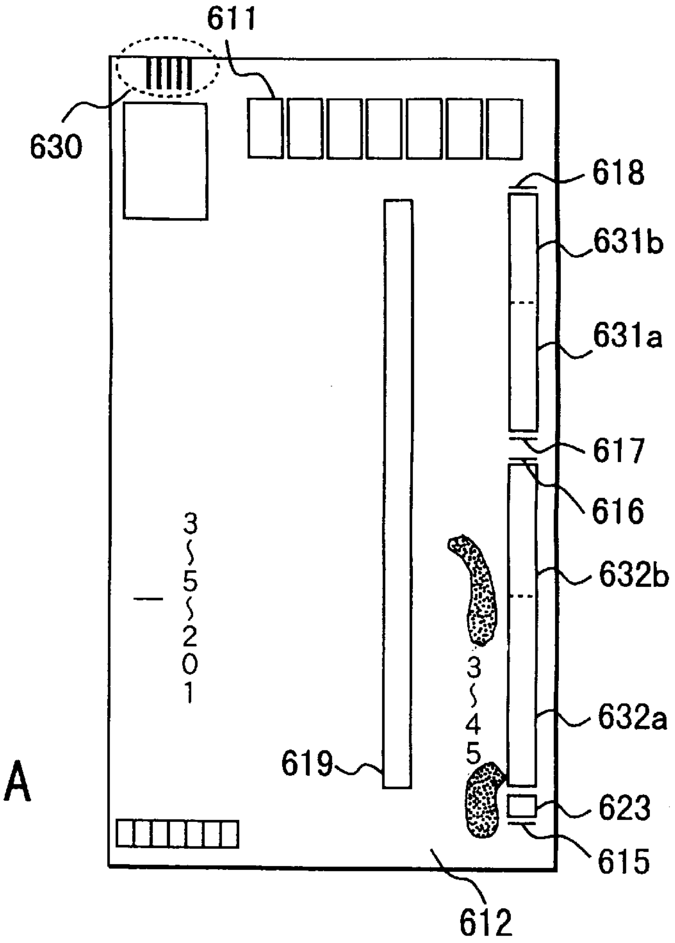
FIGS. 48A and 48B show two types of letter envelopes, on which an ID bar code is printed along with other bar codes in the bar-code encoding/decoding system according to a seventh embodiment of the invention.
Figure 48B:
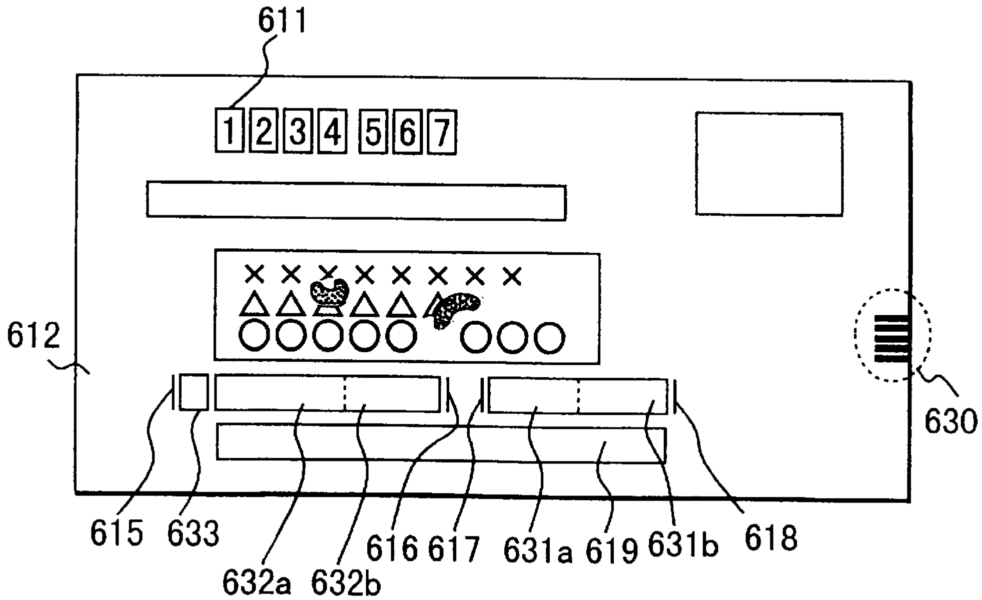

FIGS. 48A and 48B show two types of letter envelopes 611, on which an ID bar code is printed along with other bar codes in the bar-code encoding/decoding system according to a seventh embodiment of the invention. As shown in FIG. 48A, the sender's postal-code bar code 631*a* and postal-code parity bar code 631*b* are printed in a region which corresponds to the receiver's postal-code bar-code region, and the sender's address-number bar code 632*a* and address-number parity bar code 632*b* are printed in a region which corresponds to the receiver's address-number bar-code region. In the seventh embodiment, the address-unknown mark 630 and the sender's postal-zone code 633 of the type CC4 shown in FIG. 45 are detected, thereby to sort the mail piece 611 automatically.

When a mail piece is found to be an address-unknown one after the post-office bar code (i.e., the bar code representing the receiver's postal code and address number) is printed, the bar code representing the sender's postal code and address number cannot be printed in the regions shown in FIG. 41A or 48A. If this is the case, the post-office bar code and the sender's bar code may be printed in inks which differ in color and which therefore reflect light beams differing in wavelength (i.e., to be change the frequency range of the bar code).

The sender's bar code thus printed on the mail piece 611 may be read by a bar code reader and input into, for example, a word processor. It would help to prepare an address book by operating the word processor.

Described above are the embodiments of the present invention which are devised to achieve the first to third object of the invention and to print bar codes. Nonetheless, the invention is not limited to the embodiments described above. Rather, the invention can be applied to a system and method of encoding digital signals into any codes other than bar codes, such as dot-matrix code, and printing such codes.

As has been described in detail, the bar-code encoding/decoding system according to this invention can print a bar code representing the sender's postal code and address member, on the mail piece from which an operator cannot read the receiver's postal code or address number. The mail piece with the bar code printed on it can be automatically sorted by a mail-sorting apparatus. Hence, the system can serve to enhance the efficiency of delivering mail pieces.

In the present embodiment, a mail piece is an example of a delivery. But the delivery includes a parcel (a postal parcel, a package or a postal package), a goods (a cargo) or an article to be deliverd. In this case, the present inventions are adapted to the delivery.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of printing destination code on a delivery, comprising:

reading destination data and sender data provided on the delivery;

determining whether or not the destination data is recognizable;

printing on the delivery a destination code based on the read destination data when the destination data is recognizable; and printing on the delivery a sender code based on the sender data when the destination data is not recognizable.

2. The method according to claim 1, wherein the printing of the sender code is a bar code printing.

3. The method according to claim 1, further comprising printing in a predetermined region an ID code indicating that the destination data is not recognizable.

4. The method according to claim 1, in which the sender code is printed in a predetermined region and which further comprises printing an ID code in the predetermined region, said ID code being distinguishable from the sender code and identifying the delivery.

5. The method according to claim 1, in which the delivery includes first and second regions and the sender code is printed in the first region, and which further comprises printing an ID code in the second region, said ID code identifying the delivery.

6. The method according to claim 1, in which the delivery includes first to third regions and the sender code is printed in one of the first and the third regions, and which further comprises printing an ID code in the second region, said ID code identifying the delivery.

7. The method according to claim 1, in which the delivery includes first to third regions and the sender code is printed in the first region, and which further comprises:

printing an ID code in the second regions, said ID code identifying the delivery when the destination data is not recognizable.

8. The method according to claim 1, in which the delivery includes first to third regions and a part of the sender code is printed in the first region, and which further comprises:

printing an ID code in the second region, said ID code identifying the delivery when the destination data is not recognizable; and printing another part of the sender code in the third region.

9. The method according to claim 8, wherein the sender code is printed in a different color from a color used for printing the destination code.

10. The method according to claim 1, wherein said printing the sender code comprises printing a postal code/address number and an address of the sender so as to be distinguished from each other.

11. The method according to claim 1, wherein the sender data includes a postal number and an address number of the sender.

12. A system for printing destination code on a delivery, comprising:

a reader for reading destination data and sender data provided on the delivery;

a device configured to determine whether or not the destination data is recognizable from data supplied from said reader; and a printer for printing on the delivery a sender code based on the sender data when said device determines that the destination data is not recognizable.

13. The system according to claim 12, wherein the sender code is printed as a bar code.

14. The system according to claim 12, wherein said printer is configured to print in a predetermined region an ID code indicating that the destination data is not recognizable.

15. The system according to claim 12, wherein said printer is configured to print the sender code in a predetermined region and an ID code in the predetermined region, said ID code being distinguishable from the sender code and identifying the delivery.

16. The system according to claim 12, wherein the delivery includes first and second regions and said printer is configured to print the sender code in the first region and an ID code in the second region, said ID code identifying the delivery.

17. The system according to claim 12, wherein the delivery includes first to third regions and said printer is configured to print the sender code in one of the first and third regions and an ID code in the second region, said ID code identifying the delivery.

18. The system according to claim 12, wherein the delivery includes first to third regions and said printer is configured to print the sender code in the first region and an ID code in the second region, said ID code identifying the delivery when the destination code is not recognizable.

19. The system according to claim 12, wherein the delivery includes first to third regions and said printer is configured to print a part of the sender code in the first region, an ID code in the second region and another part of the sender code in the third region, said ID code identifying the delivery when the destination code is not recognizable.

20. The system according to claim 12, wherein said printer is configured to print the sender code to include a postal code/address number and an address of the sender so as to be distinguished from each other.

21. The system according to claim 12, wherein said printer is configured to print the sender code in a different color from a color in which the destination code is printed.

22. The system according to claim 12, wherein the sender data includes a postal number and an address number of the sender.

23. A method of printing bar codes, comprising:

reading destination data and sender data from a delivery including at least first to third regions;

determining whether or not the destination data is recognizable;

printing a first bar code representing the destination data in the first region when the destination data is recognizable;

printing a second bar code identifying the delivery in the second region when the destination data is not recognizable; and printing a third bar code representing the destination data in the second region when the destination data is recognizable.

24. The method according to claim 23, wherein the first bar code is obtained by reading a postal code and an address number from the delivery, by error correction encoding the postal code and the address number, thus read, and by converting the postal code and the address number, thus encoded, into a bar code.

25. The method according to claim 23, wherein the third bar code is a parity-symbol bar code which is obtained by error correction encoding a postal code and an address number read from the first bar code.

26. The method according to claim 23, wherein the third bar code is a postal-code bar code read from the first bar code and a parity-symbol bar code obtained by error correction encoding a postal code and an address number read from the first bar code.

27. The method according to claim 23, wherein the third bar code is an address-number bar code read from the first bar code and a parity-symbol bar code obtained by error correction encoding a postal code and an address number read from the first bar code.

28. The method according to claim 23, wherein the third bar code is a parity-symbol bar code obtained by error correction encoding a postal code read from the first bar code, the third bar code being a different kind of bar code from the first bar code.

29. The method according to claim 23, wherein the third bar code is a parity-symbol bar code obtained by error correction and encoding an address number read from the first bar code, the third bar code being a different kind of bar code from the first bar code.

30. The method according to claim 23, wherein the third bar code is a bar code representing an address number read from the first bar code, the third bar code being a different kind of bar code from the first bar code.

31. The method according to claim 23, wherein said second bar code represents an ID number and the destination data.

32. The method according to claim 23, where the second region includes a black region, and the second bar code is printed in the blank region.

33. The method according to claim 23, wherein the second region includes a blank region, the second bar code is read and decoded, and a bar code representing an ID number is printed in the blank region when the bar code is not correctly decoded.

34. The method according to claim 23, wherein the second region includes a blank region, the second bar code is read and decoded, a bar code representing an ID number is printed in the blank region when the bar code is not correctly decoded, and a bar code representing the destination data is printed in the blank region when the bar code representing the ID number is correctly decoded.

35. The method according to claim 23, further comprising identifying the data represented by the second bar code.

36. A method of encoding a bar code comprising:

error correction encoding first and second data-symbol trains indicating same data in at least two encoding schemes, thereby generating first and second parity-symbol trains with regard to each of the first and second data-symbol trains; and converting the first and second data-symbol trains and the first and second parity-symbol trains into bar codes.

37. The method according to claim 36, further comprising producing the first parity-symbol trains with respect to a first data-symbol train and producing said second parity-symbol trains with respect to a combination of the first data-symbol train and a first one of the first parity-symbol trains and a combination of the second data-symbol train and another one of the first parity-symbol trains.

38. The method according to claim 36, further comprising producing the first parity-symbol trains with respect to the first and second data-symbol trains and producing the second parity-symbol trains with respect to the first parity-symbol trains.

39. The method according to claim 36, further comprising producing the first parity-symbol trains with respect to the first and second data-symbol trains and producing the second parity-symbol trains with respect to the first and second data-symbol trains.

40. A method of decoding a bar code, in which, first and second data-symbol trains indicating same original data are error correction encoded in at least two encoding schemes, thereby generating first and second parity-symbol trains with regard to each of the first and second data-symbol trains and the first and second data-symbol trains and the first and second parity-symbol trains are converted into bar codes, said method comprising:

decoding the bar codes indicating the first and second data symbol trains using both of the first and second parity-symbol trains, thereby generating a plurality of candidates of the original data; and selecting one of data-symbol trains corresponding to the most reliable candidate of the original data.

41. A bar-code encoding system comprising:

an error correction encoder for error correction encoding first and second data-symbol trains indicating same data in at least two encoding schemes, thereby generating first and second parity-symbol trains with regard to each of the first and second data-symbol trains; and a converter for converting the first and second data symbol-trains and first and second parity-symbol trains into bar codes.

42. The system according to claim 41, wherein said error correction encoder comprises a first encoder producing first parity-symbol trains with respect to a first data-symbol train and a second encoder producing second parity-symbol trains with respect to a combination of the first data-symbol train and a first one of the first parity-symbol trains and a combination of the second-data-symbol train and another one of the first parity-symbol trains.

43. The system according to claim 41, wherein said error correction encoder comprises a first encoder producing the first parity-symbol trains with respect to the first and second data-symbol trains and a second encoder producing the second parity-symbol trains with respect to the first parity-symbol trains.

44. The system according to claim 41, wherein said error correction encoder comprises a first encoder producing the first parity-symbol trains with respect to the first and second data-symbol trains and a second encoder producing the second parity-symbol trains with respect to the first and second data-symbol trains.

45. A system for decoding a bar code, in which first and second data symbol-trains indicating same original data are error correction encoded in at least two encoding schemes, thereby generating first and second parity-symbol trains, and the first and second data-symbol trains and first and second parity-symbol trains are converted into bar codes, said system comprising:

a decoder for decoding the bar codes indicating the first and second data symbol-trains using both of the first and second parity-symbol trains, thereby generating a plurality of candidates of the original data; and a selector for selecting one of data-symbol trains which corresponds to the most reliable candidate of the original data.

46. A system for printing bar codes, comprising:

a reader configured to read destination data and sender data from a delivery including at least first to third regions;

a determiner configured to determine whether destination data is recognizable; and a printer configured to print a first bar code representing the destination data in the first region when the destination data is recognizable, configured to print a second bar code identifying the delivery in the second region when the destination data is not recognizable, and configured to print a third bar code representing the destination data in the second region when the destination data is recognizable.

47. The system according to claim 46, wherein the first bar code is obtained by reading a postal code and an address number from the delivery, by error correction encoding the postal code and the address number, thus read, and by converting the postal code and the address number, thus encoded, into a bar code.

48. The system according to claim 46, wherein the third bar code is a parity-symbol bar code which is obtained by error correction encoding a postal code and an address number read from the first bar code.

49. The system according to claim 46, wherein the third bar code is a postal-code bar code read from the first bar code and a parity-symbol bar code obtained by error correction encoding the postal code and an address number read from the first bar code.

50. The system according to claim 46, wherein the third bar code is an address-number bar code read from the first bar code and a parity-symbol bar code obtained by error correction encoding a postal code and address number read from the first bar code.

51. The system according to claim 46, wherein the third bar code is a parity-symbol bar code obtained by error correction encoding a postal code read from the first bar code, the third bar code being a different kind of bar code from the first bar code.

52. The system according to claim 46, wherein the third bar code is a parity-symbol bar code obtained by error correction and encoding an address number read from the first bar code, the third bar code being a different kind of bar code from the first bar code.

53. The method according to claim 46, wherein the third bar code is a bar code representing an address number read from the first bar code, the third bar code being a different kind of bar code from the first bar code.

54. The system according to claim 46, wherein said second bar code represents an ID number and the destination data.

55. The system according to claim 46, wherein the second region includes a blank region, and the second bar code is printed in the blank region.

56. The system according to claim 46, wherein the second region includes a blank region, the second bar code is read and decoded, and a bar code representing an ID number is printed in the blank region when the bar code is not correctly decoded.

57. The system according to claim 46, wherein the second region includes a blank region, the second bar code is read and decoded, a bar code representing an ID number is printed in the blank region when the bar code is not correctly decoded, and a bar code representing the destination data is printed in the blank region when the bar code representing the ID number is correctly decoded.

58. The system according to claim 46, further comprising an identifier configured to identify the data represented by the second bar code.

* * * * *